US008958490B2

(12) United States Patent
Limberg

(10) Patent No.: US 8,958,490 B2
(45) Date of Patent: Feb. 17, 2015

(54) COFDM BROADCASTING WITH SINGLE-TIME RETRANSMISSION OF COFDM SYMBOLS

(71) Applicant: Allen LeRoy Limberg, Port Charlotte, FL (US)

(72) Inventor: Allen LeRoy Limberg, Port Charlotte, FL (US)

( * ) Notice: Subject to any disclaimer, the term of this patent is extended or adjusted under 35 U.S.C. 154(b) by 0 days.

(21) Appl. No.: 14/183,264

(22) Filed: Feb. 18, 2014

(65) Prior Publication Data

US 2014/0161209 A1 Jun. 12, 2014

Related U.S. Application Data

(63) Continuation-in-part of application No. 14/048,421, filed on Oct. 8, 2013, now abandoned.

(60) Provisional application No. 61/291,556, filed on Dec. 31, 2009, provisional application No. 61/938,712, filed on Feb. 12, 2014, provisional application No. 61/711,269, filed on Oct. 9, 2012, provisional application No. 61/737,596, filed on Dec. 14, 2012, provisional application No. 61/751,726, filed on Jan. 11, 2013, provisional application No. 61/760,285, filed on Feb. 4, 2013, provisional application No. 61/770,273, filed on Feb. 27, 2013.

(51) Int. Cl.
| | |
|---|---|
| H04L 27/28 | (2006.01) |
| *H04L 1/02* | (2006.01) |
| *H04L 27/01* | (2006.01) |
| *H04L 5/00* | (2006.01) |
| *H04L 25/06* | (2006.01) |
| *H04L 27/36* | (2006.01) |
| *H04L 27/38* | (2006.01) |
| H04L 27/26 | (2006.01) |

(52) U.S. Cl.
CPC ...... *H04L 1/02* (2013.01); *H04L 27/01* (2013.01); *H04L 5/0016* (2013.01); *H04L 25/067* (2013.01); *H04L 27/36* (2013.01); *H04L 27/38* (2013.01); *H04L 27/2627* (2013.01); *H04L 27/2649* (2013.01)
USPC .......................................................... 375/260

(58) Field of Classification Search
CPC ......... H04L 1/02; H04L 1/005; H04L 1/0057; H04L 1/0071; H04L 25/00; H04L 27/0008; H04L 27/2666; H04L 27/2627; H04L 27/2647
USPC ......... 375/260, 262, 265, 267, 285, 295, 296, 375/316, 340–342, 346–349; 714/752, 758, 714/774–775, 786, 788, 789, 794–795
See application file for complete search history.

(56) References Cited

U.S. PATENT DOCUMENTS

| | | | |
|---|---|---|---|
| 2002/0097813 A1* | 7/2002 | Vaidyanathan | 375/326 |
| 2003/0026201 A1* | 2/2003 | Arnesen | 370/210 |

(Continued)

*Primary Examiner* — Khanh C Tran

(57) ABSTRACT

Transmitter apparatus to broadcast coded orthogonal frequency-division multiplexed (COFDM) radio-frequency carriers conveying digital television (DTV) signals encoded using Bose-Chaudhuri-Hocquenghem (BCH) coding concatenated with subsequent low-density parity-check coding (LPDC) transmits the same coded DTV signals twice some time apart. The coded DTV signals are mapped to quadrature amplitude modulation (QAM) of the COFDM carriers. Preferably, the circular Fourier transforms of COFDM symbols in the earlier transmissions are rotated one half revolution respective to the circular Fourier transforms of corresponding COFDM symbols in the later transmissions. Receiver apparatus combines the earlier and later transmissions of twice-transmitted COFDM signals as part of iterative procedures for de-mapping QAM and decoding the concatenated BCH-LDPC coding of the DTV signals.

33 Claims, 33 Drawing Sheets

(56) References Cited

U.S. PATENT DOCUMENTS

| | | | |
|---|---|---|---|
| 2004/0223449 A1* | 11/2004 | Tsuie et al. | 370/204 |
| 2004/0240379 A1* | 12/2004 | Tsuie | 370/210 |
| 2013/0028269 A1* | 1/2013 | Limberg | 370/474 |
| 2013/0028271 A1* | 1/2013 | Limberg | 370/479 |
| 2013/0028336 A1* | 1/2013 | Limberg | 375/240.27 |

* cited by examiner

PER PRIOR ART

70 = 36, 46 OR 56

Fig. 8 Boronka Non-Gray Mapping of 16QAM Symbol Constellation

Fig. 10 Number of Bits in COFDM Symbols

| DFT SIZE | NO. OF BITS IN DFT FOR QPSK | NO. OF BITS IN DFT FOR 16QAM | NO. OF BITS IN DFT FOR 32QAM | NO. OF BITS IN DFT FOR 64QAM | NO. OF BITS IN DFT FOR 128QAM | NO. OF BITS IN DFT FOR 256QAM | NO. OF BITS IN DFT FOR 512QAM |
|---|---|---|---|---|---|---|---|
| 2K | 3,200 | 6,400 | 8,000 | 9,600 | 11,200 | 12,800 | 14,400 |
| 4K | 6,400 | 12,800 | 16,000 | 19,200 | 22,400 | 25,600 | 28,800 |
| 8K | 12,800 | 25,600 | 32,000 | 38,400 | 44,800 | 51,200 | 57,600 |
| 16K | 25,600 | 51,200 | 64,000 | 76,800 | 89,600 | 102,400 | 115,200 |
| 32K | 51,200 | 102,400 | 128,000 | 153,600 | 179,200 | 204,800 | 230,400 |

Fig. 11 No. of COFDM Symbols in T2 Frames

| DFT SIZE | BETTER NO. OF COFDM SYMBOLS IN T2 FRAME FOR QPSK | BETTER NO. OF COFDM SYMBOLS IN T2 FRAME FOR 16QAM | BETTER NO. OF COFDM SYMBOLS IN T2 FRAME FOR 32QAM | BETTER NO. OF COFDM SYMBOLS IN T2 FRAME FOR 64QAM | BETTER NO. OF COFDM SYMBOLS IN T2 FRAME FOR 128QAM | BETTER NO. OF COFDM SYMBOLS IN T2 FRAME FOR 256QAM | BETTER NO. OF COFDM SYMBOLS IN T2 FRAME FOR 512QAM |
|---|---|---|---|---|---|---|---|
| 2K | 608 | 304 | 608 | 304 | 608 | 152 | 608 |
| 4K | 304 | 152 | 304 | 152 | 304 | 76 | 304 |
| 8K | 152 | 76 | 152 | 76 | 152 | 38 | 152 |
| 16K | 76 | 38 | 76 | 38 | 76 | 38 | 76 |
| 32K | 38 | 38 | 38 | 38 | 38 | 38 | 38 |

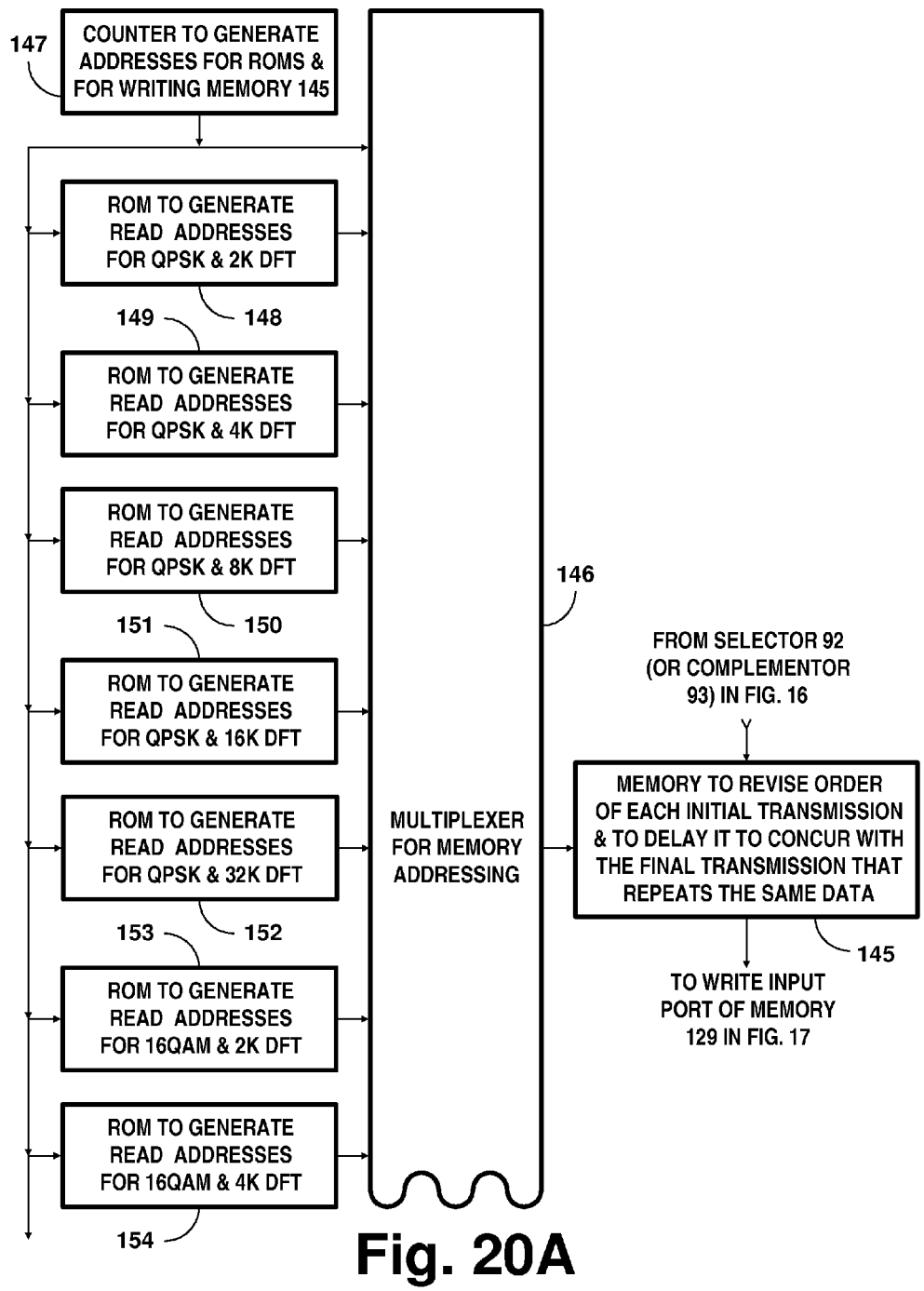

COFDM BROADCASTING WITH SINGLE-TIME RETRANSMISSION OF COFDM SYMBOLS

This application is a continuation-in-part of U.S. patent application Ser. No. 14/048,421 titled "COFDM broadcasting with single-time retransmission of COFDM symbols" filed by A. L. R. Limberg on 8 Oct. 2013 claiming the benefit of the filing dates of provisional U.S. Pat. App. Ser. No. 61/711,268 filed 9 Oct. 2012, of provisional U.S. Pat. App. Ser. No. 61/737,596 filed 14 Dec. 2012, of provisional U.S. Pat. App. Ser. No. 61/751,726 filed 11 Jan. 2013, of provisional U.S. Pat. App. Ser. No. 61/760,285 filed on 4 Feb. 2013 and of U.S. Pat. App. Ser. No. 61/770,273 filed 27 Feb. 2013. This application further claims the benefits of the filing dates of provisional U.S. Pat. App. Ser. No. 61/775,303 titled "Receiver apparatus for COFDM broadcasting of LDPC coding with single-time retransmission" filed by A. L. R. Limberg on 8 Mar. 2013, of provisional U.S. Pat. App. Ser. No. 61/803,132 titled "Receiver apparatus for COFDM broadcasting of LDPC coding with single-time retransmission" filed by A. L. R. Limberg on 19 Mar. 2013, of provisional U.S. Pat. App. Ser. No. 61/921,556 titled "Receivers for retransmitted COFDM symbols in digital television broadcasting" filed by A. L. R. Limberg on 30 Dec. 2013 and of provisional U.S. Pat. App. Ser. No. 61/938,712 titled "COFDM broadcasting with single-time retransmission of COFDM symbols" filed by A. L. R. Limberg on 12 Feb. 2014.

FIELD OF THE INVENTION

Various aspects of the invention relate to systems of over-the-air broadcasting of orthogonal frequency-division modulation (OFDM) digital television (DTV) signals for iterative-diversity reception and particularly to receiver apparatus for such systems.

BACKGROUND OF THE INVENTION

DTV broadcasting in the United States of America has been done in accordance with broadcasting standards formulated by an industry consortium called the Advanced Television Systems Committee (ATSC), which standards have prescribed the use of a vestigial-sideband amplitude-modulated single carrier in each radio-frequency (RF) channel allocated for broadcasting DTV signals. Consideration is being given to replacing those DTV broadcasting standards with new standards that may prescribe coded orthogonal frequency-division multiplexed (COFDM) plural carriers in each RF channel allocated for broadcasting DTV signals. These new standards may, for example, resemble the DVB-T2 broadcasting standard developed for use in Europe.

COFDM is typically generated beginning with randomizing digital data to insure that subsequent encoding of forward-error-correction (FEC) coding receives sufficient density of logic ONEs to operate efficiently. Then, the resulting FEC coding is subjected to some form of bit interleaving, and the bits of the interleaved FEC coding are mapped to quadrature-amplitude-modulation (QAM) symbol constellations. The real-axis and imaginary-axis spatial coordinates of the QAM symbol constellations are parsed into orthogonal frequency-division multiplex (OFDM) symbols, which modulate a single carrier wave at high rate using quadrature-amplitude-modulation (QAM). The resulting modulated carrier wave is then transformed in a fast inverse discrete Fourier transform (I-DFT) procedure to generate a multiplicity of RF carrier waves uniformly distributed within the frequency spectrum of the RF channel, each of which RF carriers is modulated at low symbol rate. (In this specification and the accompanying drawing and claims the general term "QAM" is to be considered to include QPSK, QPSK being an alternative term for 4QAM.)

Reception of COFDM generated as described in the foregoing paragraph will fail if there is severe flat-spectrum fading of substantial duration. Such flat-spectrum fading is sometimes referred to as a "drop-out" in received signal strength. Such drop-out occurs when the receiving site is changed such that a sole effective signal transmission path is blocked by an intervening hill or structure, for example. Because the signaling rate in the individual OFDM carriers is very low, COFDM receivers are capable of maintaining reception despite drop-outs that are only a fraction of a second in duration. However, drop-outs that last as long as a few seconds disrupt television reception perceptibly. Automatic gain control of the front-end tuner stages of a DTV receiver will increase their gain, amplifying noise to introduce burst noise into the FEC coding. Such protracted drop-outs are encountered in a vehicular receiver when the vehicle passes through a tunnel, for example. By way of further example of a protracted drop-out in reception, a stationary receiver may briefly discontinue COFDM reception when receiver synchronization is momentarily lost during dynamic multipath reception conditions, such as caused by an aircraft flying over the reception site. Electric motors can generate radio-frequency noise strong enough to overload the front-end tuner stages of a DTV receiver, acting as a jamming signal that obliterates COFDM reception and generates burst noise too long to be corrected by FEC coding.

The DVB-T2 standard for DTV broadcasting prescribes Bose-Chaudhuri-Hocquenghem (BCH) coding concatenated with subsequent low-density parity-check coding (LPDC) as FEC coding. The concatenated BCH-LDPC coding prescribed in the DVB-T2 standard is reported to allow better performance in the presence of AWGN to be achieved using 256QAM symbol constellations than could be achieved with DVB-T using 16QAM symbol constellations. The bits of the LDPC coding are block interleaved using a modification of matrix type of interleaving in which successive bits of LDPC coding are arranged in columns for subsequent row-by-row utilization for mapping to lattice points within successive QAM symbol constellations, which medication introduces "column twist". The DVB-T2 standard authorizes an alternative to parsing the real-axis and imaginary-axis spatial coordinates of 16QAM or 64QAM symbol constellations directly into orthogonal frequency-division multiplex (OFDM) symbols. In this alternative these QAM symbol constellations are in effect rotated relative to the real and imaginary axes of coordinate space so that every one of the lattice points of successive QAM symbols has unique coordinates along both the real axis and the imaginary axis. The unique coordinates of each QAM symbol constellation along the imaginary axis are then delayed for transmission respective to the unique coordinates of that QAM symbol constellation along the real axis. Accordingly, two unique coordinates of each QAM symbol constellation are transmitted, the second transmission being delayed respective to the first transmission for a time longer than the duration of a QAM symbol of an individual carrier. This facilitates iterative-diversity reception that can often avoid complete loss of reception of a portion of DTV signal owing to flat-spectrum fading, despite signal drop-outs that last up to a second or so.

An alternative way to facilitate iterative-diversity reception that can avoid complete loss of reception of a DTV signal owing to flat-spectrum fading, despite signal drop-outs that last up to a few seconds, is single-time retransmission of complete QAM symbol constellations after a suitable interval. Obviously, ignoring effects of signal corruption arising from noise in the transmission channel, twice transmitting complete QAM symbol constellations halves digital payload compared to transmitting them once.

When superficially considered, rotation of the QAM symbol constellations respective to the real and imaginary axes of modulation signal space appears not to reduce digital payload compared to a single-time transmission. Also, the respective times at which the initial transmission of a mapping of a set of data bits occur and at which the subsequent retransmission of a mapping of that same set of data bits occur are automatically referenced respective to each other.

However, the sizes of the data-slicing bins of the I-axis coordinates are reduced from what they would be for the square QAM symbol constellation without rotation. Also, the sizes of the data-slicing bins of the Q-axis coordinates are reduced from what they would be for the square QAM symbol constellation without rotation. E.g., the sizes of the data-slicing bins would be reduced by a factor of four when 16QAM symbol constellations are rotated. Reduction in the size of the data-slicing bins results in more bit errors being caused by AWGN corrupting the QAM. It is here pointed out that the reduced-size data bins are substantially the same size as those for non-rotated 256QAM symbol constellations. The number of bit errors in data slicing that are caused by AWGN corrupting the non-rotated 256QAM symbol constellations is substantially the same as the number of bit errors in data slicing that are caused by AWGN corrupting the rotated 16QAM symbol constellations. The number of data bits that can be mapped by each of the rotated 16QAM symbol constellations is four. The number of data bits that can be mapped by each of the non-rotated 256QAM symbol constellations is eight, and single-time retransmission of the non-rotated 256QAM symbol constellations results in the same eight data bits being conveyed over two COFDM symbol block intervals. Whichever of the two methods is used to transmit data twice, two COFDM symbol block intervals convey on average eight data bits times the number of QAM symbol constellations in each COFDM symbol block interval. I.e., for given size of data-slicing bins and given number of bit errors in data slicing that are caused by similar AWGN, single-time retransmission of 256QAM symbol constellations results in similar code rate as rotated 16QAM symbol constellations do. It appears that the developers of the DVB-T2 standard were unaware of this surprising result arising from more careful analysis.

When the Q-axis coordinates of rotated 16QAM symbol constellations are delayed respective to the their I-axis coordinates, the OFDM carriers are no longer each modulated in accordance with a respective rotated 16QAM constellation. Instead, each OFDM carrier is modulated in accordance with a respective 256QAM constellation. Presuming the 16QAM symbol constellations each used Gray mapping, the 256QAM symbol constellations are not Gray-mapped. The coordinates for the two orthogonal axes in which data-slicing is done are not Gray-coded, nor are they independent of each other. So, de-mapping rotated 16QAM constellations in a DTV receiver involves two-dimensional metrics for estimating errors in each of the four de-mapped bits to support subsequent soft decoding procedures for the FEC coding. This is a much more challenging task than de-mapping 256QAM symbol constellations that are Gray-mapped and have independent coordinates for the two orthogonal axes in which data-slicing is done. These independent coordinates are Gray-coded and de-mapping involves two sets of one-dimensional metrics for estimating errors in each of the eight de-mapped bits to support subsequent soft decoding procedures for the FEC coding. Errors can be estimated quite simply, proceeding from the departures of data-slicing results from values associated with lattice points in a 256QAM symbol constellation uncorrupted by noise.

Initial and final transmissions of the same coded data often allows a DTV receiver to replace burst noise in one of those transmissions with coded data from the other one of those transmissions. So, single-time retransmission of the same coded data facilitates the receiver being provided with substantial capability for overcoming peaks in noise of additive white Gaussian noise (AWGN) character, such as Johnson noise, as well as exceptionally effective capability for overcoming burst noise of substantial duration. This capability for overcoming burst noise facilitates the use of concatenated BCH-LDPC coding being used as FEC coding. LDPC coding is effective for overcoming AWGN, doing so at code rates almost three times those of concatenated convolutional coding (CCC) similarly effective for overcoming AWGN. LDPC coding does not have the tendency to extend burst errors that CCC has. However, LDPC coding is not very effective for correcting burst noise. While BCH coding can correct burst errors, using the BCH coding to correct a good amount of burst error distributed through each lengthy LDPC codeword requires many parity bits being associated with the systematic bits of the LDPC codeword. This undesirably reduces overall code rate of the concatenated BCH-LDPC coding. The DVB-T2 standard prescribes BCH coding capable of correcting only 10 or 12 bits in a block of 7,200 to 541,000 bits, keeping the number of parity bits per block less than 200. Accordingly, the retransmission provided by dissecting rotated symbol constellations is the principal mechanism allowing a receiver to correct burst noise in its reception of transmissions from a single COFDM transmitter.

If a reception site is not more than a few kilometers distant from the COFDM transmitter or transmitters, multipath reception can cause severe frequency-selective fading of a large group of OFDM carriers in a particular portion of the RF channel. Frequency-selective fading has been observed that extends over three MHz in a 6-MHz-wide RF channel and reduces the amplitude of a central few of the selectively faded OFDM carriers as much as 35 dB respective to less affected OFDM carriers. Such frequency-selective fading corrupts so many of the QAM symbols used for modulating respective OFDM carriers that de-interleaving of the results of de-mapping the QAM symbols is unable to reduce the density of bit errors in the recovered bit-wise FEC coding to permit successful decoding thereof. In some circumstances a directional reception antenna may be able to mitigate this problem. However, the antenna of a hand-held receiver is not apt to have appreciable capability for rejecting co-channel interference.

SUMMARY OF THE INVENTION

An aspect of the invention is embodied in transmitter apparatus for broadcasting coded orthogonal frequency-division multiplexed (COFDM) radio-frequency carriers conveying digital television (DTV) signals encoded using Bose-Chaudhuri-Hocquenghem (BCH) coding concatenated with subsequent low-density parity-check coding (LPDC), which transmitter transmits the same coded DTV signals twice. In transmitter apparatus embodying one aspect of the invention, the final transmissions of those coded DTV signals are delayed up to few seconds respective to the initial transmissions of them, allowing receivers of suitable design to overcome protracted drop-outs in received signal strength. In transmitter apparatus embodying another aspect of the invention, COFDM symbols are retransmitted without intervening delay or with intervening delay of only a few OFDM symbol intervals, enabling receivers of suitable design better to overcome randomly occurring burst noise of short duration.

Further aspects of the invention are embodied in receiver apparatuses for iterative-diversity reception of these twice-transmitted DTV signals. Such receiver apparatuses delay the earlier transmissions of the twice-transmitted COFDM signals to concur with the later transmissions of them, then combine the later transmissions of the COFDM signals with the delayed earlier transmissions of them. Some of these receiver apparatuses combine the later transmissions of the COFDM signals with the delayed earlier transmissions of them after demodulation and subsequent decoding of the concatenated BCH-LDPC coding of the DTV signals, the combining being done by selection of correct data packets from the decoded earlier and later transmissions of them. Others of these receiver apparatuses combine the later transmissions of the COFDM signals with the delayed earlier transmissions of them using plural-input/single-output detectors similar to those used in COFDM receivers for spatial-diversity reception using a plurality of reception antennas. Still others of these receiver apparatuses combine the later transmissions of the COFDM signals with the delayed earlier transmissions of them before demodulation and subsequent decoding of the concatenated BCH-LDPC coding of the DTV signals. These receiver apparatuses use a maximal-ratio code combining procedure to combine the complex coordinates of modulation symbol constellations in the delayed initial transmissions with the complex coordinates of modulation symbol constellations in the final transmissions.

COFDM symbols of initial transmissions of the coded DTV data are arranged in accordance with a further aspect of the invention such that their circular discrete Fourier transforms are rotated one-half revolution (or pi radians) respective to the circular DFTs of corresponding COFDM symbols in time-slices of subsequent transmissions of that same DTV data. DTV receivers that embody further aspects of the invention can then de-rotate the COFDM symbols of initial transmissions of the DTV data and after delaying the resulting COFDM symbols combine them with COFDM symbols of subsequent transmissions of that same DTV data. Such DTV receivers are capable of overcoming severe frequency-selective fading that is apt to be caused by multipath reception from nearby DTV transmitters, as well as overcoming protracted severe flat-spectral fading of one of the initial and subsequent transmissions of the same DTV data.

BRIEF DESCRIPTION OF THE DRAWINGS

FIG. 10 is a table showing the number of bits in each of various COFDM symbols with different types of modulation of the active carriers that convey FEC-coded data.

FIG. 11 is a table showing the number of COFDM symbols in a T2 frame, taking into account different numbers of OFDM carriers in the those symbols and different types of modulation of those carriers.

FIGS. 20A, 20B, 20C and 20D together form FIG. 20, which is a detailed schematic diagram showing an arrangement for addressing memory within the FIG. 19 portion of COFDM receiver apparatus.

DETAILED DESCRIPTION

Figure 1:
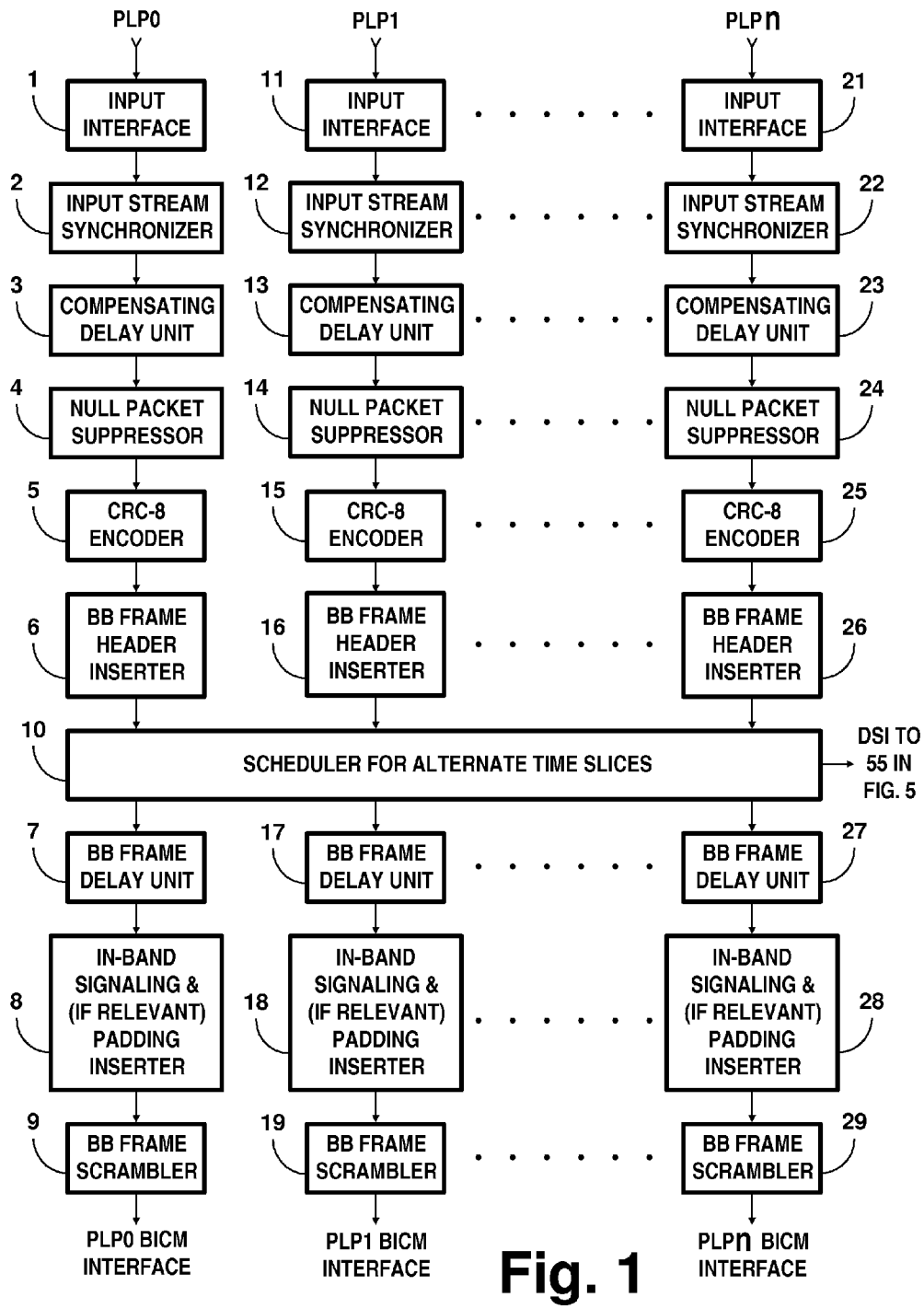
FIGS. 1, 2, 3 and 4 together form a schematic diagram of COFDM transmitter apparatus embodying aspects of the invention, which transmitter apparatus twice transmits the same coded DTV signal.
Figure 2:
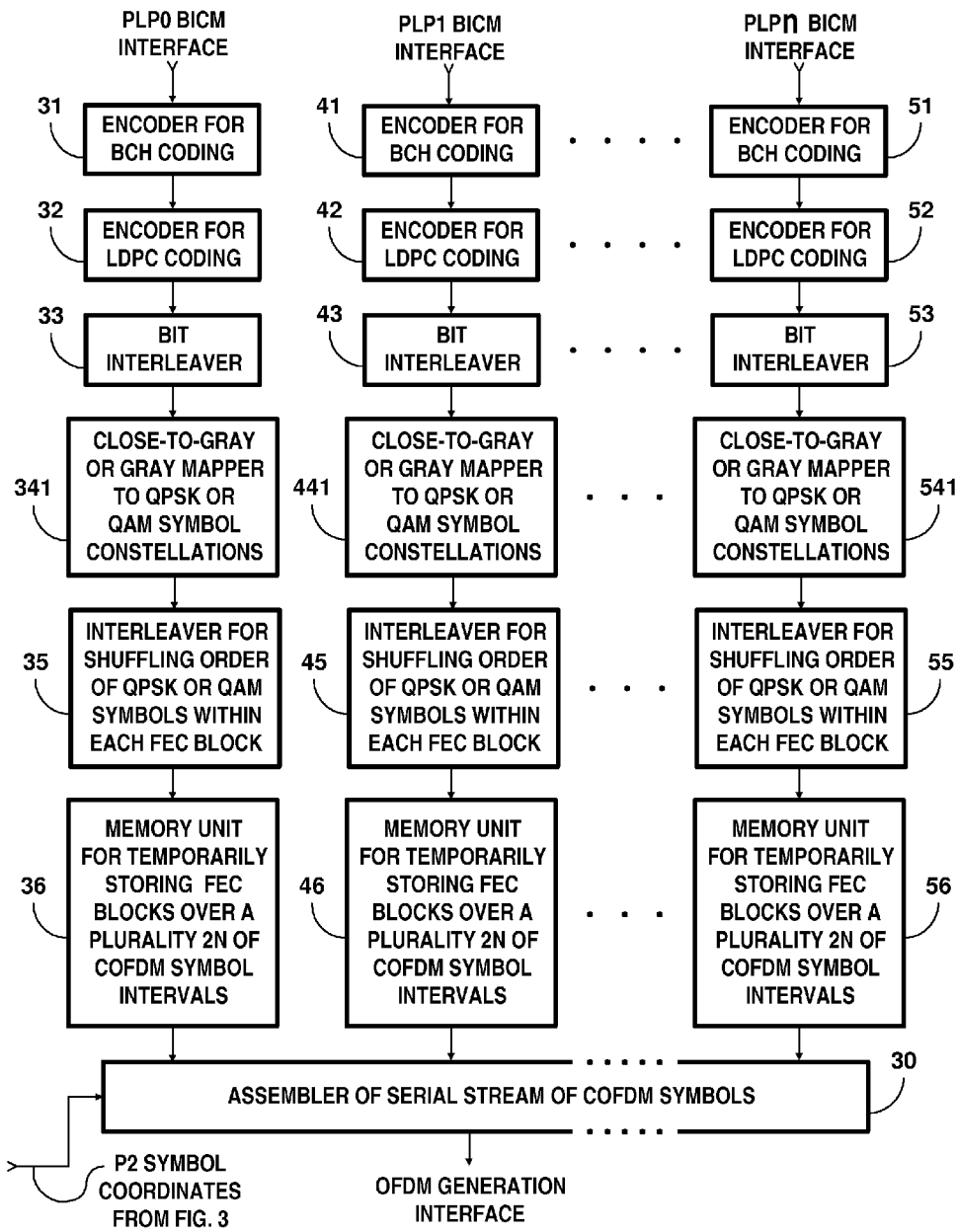
Figure 3:
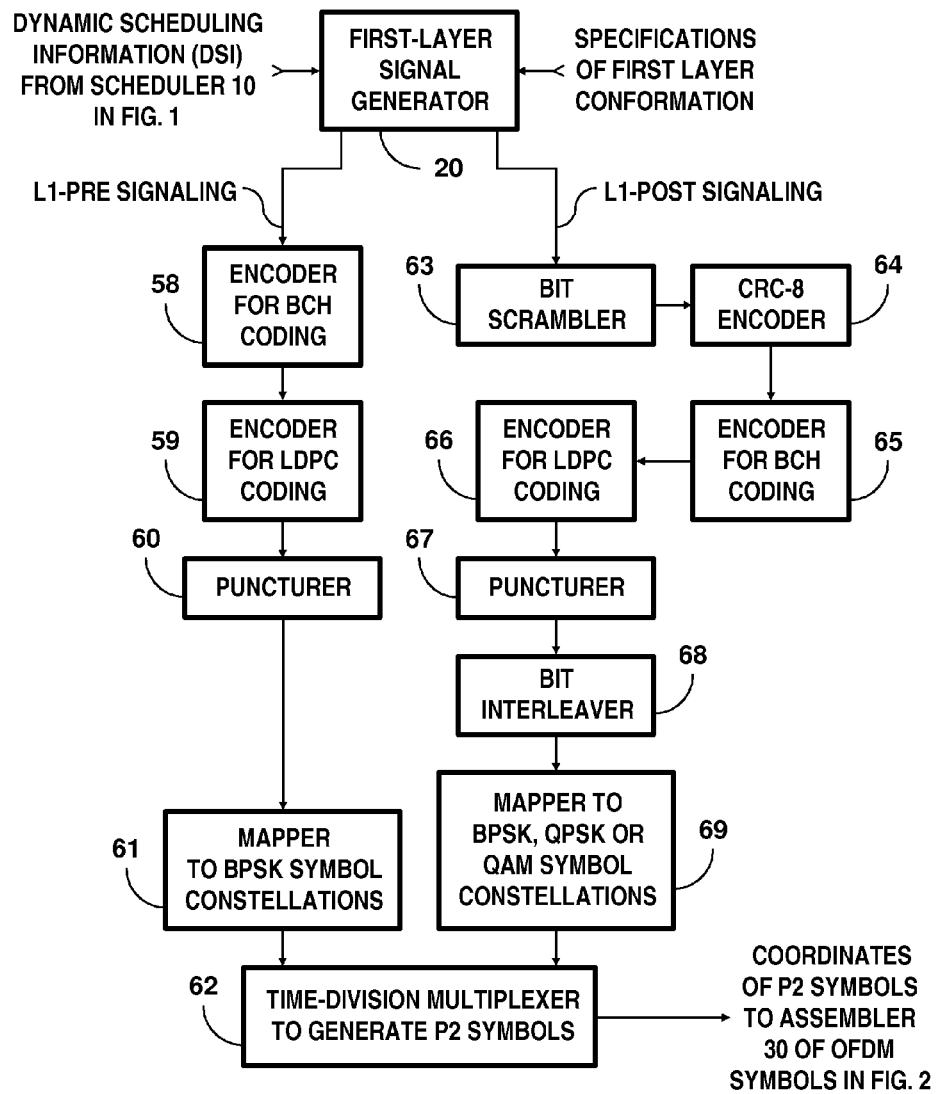
Figure 4:
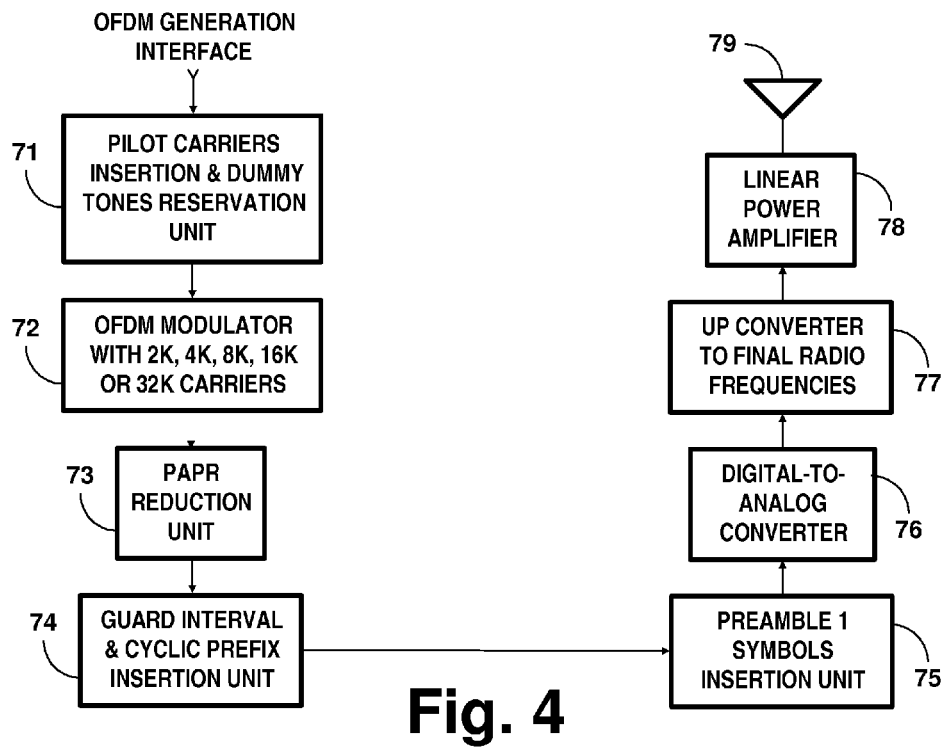

FIGS. 1, 2, 3 and 4 depict a DTV transmitter apparatus generating COFDM signals designed for reception by DTV receivers. FIG. 1 depicts apparatus for generating baseband frames (BBFRAMES) at a Bit-Interleaved Coding and Modulation (BICM) interface. FIG. 2 depicts apparatus for generating bit-wise forward-error-correction (FEC) coding and subsequent COFDM symbol blocks responsive to the BBFRAMEs supplied at the BICM interface. FIG. 3 depicts apparatus for generating bit-wise forward-error-correction (FEC) coding and subsequent COFDM symbol blocks responsive to first layer (L1) conformation specifications and to dynamic scheduling information (DSI). FIG. 4 depicts apparatus for generating and transmitting radio-frequency COFDM signals. Except for the processing of QAM symbol constellations into COFDM symbols, the DTV transmitter apparatus depicted in FIGS. 1, 2, 3 and 4 is essentially the same as specified in European Telecommunications Standards Institute (ETSI) standard EN 302 755 V1.3.1 published in April 2012, titled "Digital Video Broadcasting (DVB); Frame structure channel coding and modulation for a second generation digital terrestrial television broadcasting system (DVB-T2)", and incorporated herein by reference.

A scheduler 10 for interleaving time-slices of services to be broadcast to stationary DTV receivers is depicted in the middle of FIG. 1. The scheduler 10 schedules transmissions of time slices for a number (n+1) of physical layer pipes (PLPs), n being a positive integer at least zero. FIGS. 1 and 2 identify these PLPs by the letters "PLP" followed respectively by consecutive positive integers of a modulo-n numbering system. The scheduler 10 also generates and schedules dynamic scheduling information (DSI) for application to an additional PLP depicted in FIG. 3, which additional PLP generates OFDM symbol blocks that convey the DSI and first layer confirmation specifications. Recommended practice is that at least the physical layer pipe PLP0 is a so-called "common" PLP used for transmitting data, such as a program guide, relating to the other "data" PLPs. The common PLP or PLPs are transmitted in each T2 frame following the P1 and P2 symbols, but before the data PLP or PLPs. A data PLP may be of a first type transmitted as a single slice per T2 frame, or a data PLP may be of a second type transmitted as a plurality of sub-slices disposed in non-contiguous portions of each T2 frame to achieve greater time diversity.

FIG. 1 depicts the (n+1)th physical layer pipe PLP0 comprising elements 1-6 in cascade connection before the scheduler 10 and further comprising elements 7-9 in cascade connection after the scheduler 10, but before a PLP0 bit-interleaved coding and modulation (BICM) interface. More specifically, FIG. 1 indicates that a PLP0 stream of logical digital data is supplied to the input port of an input interface 1, the output port of which connects to the input port of an input stream synchronizer 2. The output port of the input stream synchronizer 2 connects to the input port of a compensating delay unit 3, the output port of which connects to the input port of a null-packet suppressor 4. The output port of the null-packet suppressor 4 connects to the input port of a CRC-8 encoder 5 operative at user packet level, the output port of which connects to the input port of an inserter 6 of headers for baseband (BB) frames. The output port of the BBFRAME header inserter 6 connects to a respective input port of the scheduler 10. The physical layer pipe PLP0 continues following the scheduler 10, with FIG. 1 showing a respective output port of the scheduler 10 connecting to the input port of a delay unit 7 for delaying baseband (BB) frames. FIG. 1 shows the output port of the BBFRAME delay unit 7 connecting to the input port of an inserter 8 for inserting in-band signaling into BBFRAMEs, which in-band signaling essentially consists of dynamic scheduling information (DSI) generated by the scheduler 10, and/or for inserting padding into the BBFRAME. Padding is inserted in circumstances when the user data available for transmission is not sufficient to completely fill a BBFRAME, or when an integer number of user packets is required to be allocated to a BBFRAME. FIG. 1 shows the output port of the inserter 8 connecting to the input port of a BBFRAME scrambler 9, which data randomizes bits of the BBFRAME supplied from the output port of the BBFRAME scrambler 9 as the PLP0 BICM interface. In practice the delay unit 7, the inserter 8 and the BBFRAME scrambler 9 are realized by suitable configuration of a random-access memory.

FIG. 1 depicts the first physical layer pipe PLP1 comprising elements 11-16 in cascade connection before the scheduler 10 and further comprising elements 17-19 in cascade connection after the scheduler 10, but before a PLP1 bit-interleaved coding and modulation (BICM) interface. More specifically, FIG. 1 indicates that a PLP1 stream of logical digital data is supplied to the input port of an input interface 11, the output port of which connects to the input port of an input stream synchronizer 12. The output port of the input stream synchronizer 12 connects to the input port of a compensating delay unit 13, the output port of which connects to the input port of a null-packet suppressor 14. The output port of the null-packet suppressor 14 connects to the input port of a CRC-8 encoder 15 operative at user packet level, the output port of which connects to the input port of an inserter 16 of headers for BBFRAMEs. The output port of the BBFRAME header inserter 16 connects to a respective input port of the scheduler 10. The physical layer pipe PLP1 continues following the scheduler 10, with FIG. 1 showing a respective output port of the scheduler 10 connecting to the input port of a delay unit 17 for delaying BBFRAMEs. FIG. 1 shows the output port of the BBFRAME delay unit 17 connecting to the input port of an inserter 18 for inserting in-band signaling into BBFRAMEs, which in-band signaling essentially consists of DSI generated by the scheduler 10, and/or for inserting padding into the BBFRAME. FIG. 1 shows the output port of the inserter 18 connecting to the input port of a BBFRAME scrambler 19, which data randomizes bits of the BBFRAME supplied from the output port of the BBFRAME scrambler 19 as the PLP1 BICM interface. In practice the delay unit 17, the inserter 18 and the BBFRAME scrambler 19 are realized by suitable operation of a random-access memory.

FIG. 1 depicts the (n)th physical layer pipe PLPn comprising elements 21-26 in cascade connection before the scheduler 10 and further comprising elements 27-29 in cascade connection after the scheduler 10, but before a PLPn bit-interleaved coding and modulation (BICM) interface. More specifically, FIG. 1 indicates that a PLPn stream of logical digital data is supplied to the input port of an input interface 21, the output port of which connects to the input port of an input stream synchronizer 22. The output port of the input stream synchronizer 22 connects to the input port of a compensating delay unit 23, the output port of which connects to the input port of a null-packet suppressor 24. The output port of the null-packet suppressor 24 connects to the input port of a CRC-8 encoder 25 operative at user packet level, the output port of which connects to the input port of an inserter 26 of headers for BBFRAMEs. The output port of the BBFRAME header inserter 26 connects to a respective input port of the scheduler 10. The physical layer pipe PLPn continues following the scheduler 10, with FIG. 1 showing a respective output port of the scheduler 10 connecting to the input port of a delay unit 27 for delaying BBFRAMEs. FIG. 1 shows the output port of the BBFRAME delay unit 27 connecting to the input port of an inserter 28 for inserting in-band signaling into BBFRAMEs, which in-band signaling essentially consists of dynamic scheduling information (DSI) generated by the scheduler 10, and/or for inserting padding into the BBFRAME. FIG. 1 shows the output port of the inserter 28 connecting to the input port of a BBFRAME scrambler 29, which data randomizes bits of the BBFRAME supplied from the output port of the BBFRAME scrambler 29 as the PLPn BICM interface. In practice the delay unit 27, the inserter 28 and the BBFRAME scrambler 29 are realized by suitable operation of a random-access memory.

The input stream synchronizers 2, 12, 22 etc. are operable to guarantee Constant Bit Rate (CBR) and constant end-to-end transmission delay for any input data format when there is more than one input data format. Some transmitters may not include ones of the input stream synchronizers 2, 12, 22 etc. or ones of the compensating delay units 3, 13, 23 etc. For some Transport-Stream (TS) input signals, a large percentage of null-packets may be present in order to accommodate variable bit-rate services in a constant bit-rate TS. In such a case, to avoid unnecessary transmission overhead, the null-packet suppressors 4, 14, 24 etc. identify TS null-packets from the packet-identification (PID) sequences in their packet headers and remove those TS null-packets from the data streams to be scrambled by the BBFRAME scramblers 9, 19, 29 etc. This removal is done in a way such that the removed null-packets can be re-inserted in the receiver in the exact positions they originally were in, thus guaranteeing constant bit-rate and avoiding the need for updating the Programme Clock Reference (PCR) or time-stamp. Further details of the operation of the input stream synchronizers 2, 12, 22 etc.; the compensating delay units 3, 13, 23 etc.; and the null-packet suppressors 4, 14, 24 etc. can be gleaned from ETSI standard EN 302 755 V1.3.1 for DVB-T2.

FIG. 2 depicts the (n+1)th physical layer pipe PLP0 further comprising elements 31-36 in cascade connection after the PLP0 BICM interface, but before a respective input port of an assembler 30 for assembling a serial stream of OFDM symbols. More specifically, FIG. 2 depicts an encoder 31 for BCH coding with its input port connected to receive the PLP0 BICM interface signal from the output port of the BBFRAME scrambler 9 and with its output port connected to the input port of an encoder 32 for LDPC coding. FIG. 2 depicts the output port of the encoder 32 for LDPC coding connected to the input port of a bit interleaver 33, the output port of which is connected for applying bit-interleaved bit-wise FEC coding to the input port of a mapper 341 for mapping successive bits of the bit-interleaved bit-wise FEC coding to successive QAM symbol constellations. In the case of transmissions broadcast for reception by stationary DTV receivers, these QAM symbol constellations are apt to be square 256QAM symbol constellations or cruciform 512QAM symbol constellations, by way of specific examples. In the case of transmissions broadcast for reception by mobile DTV receivers, these QAM symbol constellations are apt to be square 16QAM symbol constellations, square 64 QAM symbol constellations or cruciform 128QAM symbol constellations, by way of specific examples.

The mapper 341 parses the successive bits of the bit-interleaved bit-wise FEC coding supplied to its input port into consecutive segment or "cells", each having as many bits as in the labeling of each of the lattice points in the particular QPSK or QAM constellations to which the FEC coding is mapped in the physical layer pipe PLP0. The complex coordinates of the QPSK or QAM symbol constellations are supplied from the output port of the mapper 341 to an interleaver 35 that shuffles the order of the QPSK or QAM symbols in each successive time-interleaver (TI) block. This shuffling implements cyclic delay diversity (CDD) that helps the FEC coding to overcome frequency-selective fading. The output port of the interleaver 35 connects to write input port of a memory unit 36, the read output port of which memory unit 36 connects to a respective input port of the assembler 30 for assembling a stream of OFDM symbols. The memory unit 36 is capable of temporarily storing the FEC blocks for a number N of OFDM symbols. The memory unit 36 is operable for temporarily storing each FEC block for 2N OFDM symbol intervals to implement the single-time retransmission of FEC blocks from the (n+1)th physical layer pipe PLP0, as explained with reference to FIG. 5 further on in this specification.

FIG. 2 depicts the first physical layer pipe PLP1 further comprising elements 41-46 in cascade connection after the PLP1 BICM interface, but before a respective input port of the assembler 30 for assembling a serial stream of OFDM symbols. More specifically, FIG. 2 depicts an encoder 41 for BCH coding with its input port connected to receive the PLP1 BICM interface signal from the output port of the BBFRAME scrambler 19 and with its output port connected to the input port of an encoder 42 for LDPC coding. FIG. 2 depicts the output port of the encoder 42 for LDPC coding connected to the input port of a bit interleaver 43, the output port of which is connected for applying bit-interleaved LDPC coding to the input port of a mapper 441 for mapping successive bits of the bit-interleaved LDPC coding to successive QPSK or QAM symbol constellations. In the case of transmissions broadcast for reception by stationary DTV receivers, the QAM symbol constellations are apt to be square 256QAM symbol constellations or cruciform 512QAM symbol constellations, by way of specific examples. In the case of transmissions broadcast for reception by mobile DTV receivers, the QAM symbol constellations are apt to be square 16QAM symbol constellations, square 64 QAM symbol constellations or cruciform 128QAM symbol constellations, by way of specific examples. The complex coordinates of the QPSK or QAM symbol constellations are supplied from the output port of the mapper 441 to the input port of an interleaver 45 that shuffles the order of the QPSK or QAM symbols in each successive TI block to implement cyclic delay diversity (CDD) that helps the FEC coding to overcome frequency-selective fading. The output port of the interleaver 45 connects to the write input port of a memory unit 46, the read output port of which memory unit 46 connects to a respective input port of the assembler 30 for assembling a stream of OFDM symbols. The memory unit 46 is capable of temporarily storing the FEC blocks for a number N of OFDM symbols. The memory unit 46 is operable for temporarily storing each FEC block for 2N OFDM symbol intervals to implement the single-time retransmission of COFDM symbols from the first physical layer pipe PLP1, as explained with reference to FIG. 5 further on in this specification.

FIG. 2 depicts the (n)th physical layer pipe PLPn further comprising elements 51-56 in cascade connection after the PLPn BICM interface, but before a respective input port of the assembler 30 for assembling a serial stream of OFDM symbols. More specifically, FIG. 2 depicts an encoder 51 for BCH coding with its input port connected to receive the PLPn BICM interface signal from the output port of the BBFRAME scrambler 29 and with its output port connected the input port of an encoder 52 for LDPC coding. FIG. 2 depicts the output port of the encoder 52 for LDPC coding connected to the input port of a bit interleaver 53, the output port of which is connected for applying bit-interleaved bit-wise FEC coding to the input port of a mapper 541 for mapping successive bits of the bit-interleaved bit-wise FEC coding to successive QPSK or QAM symbol constellations. In the case of transmissions broadcast for reception by stationary DTV receivers, these QAM symbol constellations are apt to be square 256QAM symbol constellations or cruciform 512QAM symbol constellations, by way of specific examples. In the case of transmissions broadcast for reception by mobile DTV receivers, these QAM symbol constellations are apt to be square 16QAM symbol constellations, square 64 QAM symbol constellations or cruciform 128QAM symbol constellations, by way of specific examples. The complex coordinates of the QPSK or QAM symbol constellations are supplied from the output port of the mapper 541 to the input port of an interleaver 55 that shuffles the order of the QPSK or QAM symbols in each successive TI block to implement cyclic delay diversity (CDD) that helps the FEC coding to overcome frequency-selective fading. The output port of the interleaver 55 connects to the write input port of a memory unit 56, the read output port of which memory unit 56 connects to a respective input port of the assembler 30 for assembling a stream of OFDM symbols. The memory unit 56 is capable of temporarily storing the FEC blocks for a number N of OFDM symbols. The memory unit 56 is operable for temporarily storing each FEC block for 2N OFDM symbol intervals to implement the single-time retransmission of COFDM symbols from the (n)th physical layer pipe PLPn, as explained with reference to FIG. 5 further on in this specification.

There is usually a number of other physical layer pipes besides PLP1, PLP2 and PLPn, which other physical pipes are identified by the prefix PLP followed by respective ones of consecutive numbers three through (n−1). Each of the PLPs, n in number, may differ from the others in at least one aspect. One possible difference between these n PLPs concerns the natures of the concatenated BCH-LDPC coding these PLPs respectively employ. ETSI standard EN 302 755 V1.3.1 for DVB-T2 specifies a block size of 64,800 bits for normal FEC frames as a first alternative, and a block size of 16,200 bits is specified for short FEC frames as a second alternative. Also, a variety of different LDPC code rates are authorized. PLPs may differ in the number of OFDM carriers involved in each of their spectral samples, which affects the size of the DFT used for demodulating those OFDM carriers. Another possible difference between PLPs concerns the natures of the QAM symbol constellations (or possibly other modulation symbol constellations) they respectively employ.

Each of the interleavers 35, 45, 55 etc. in the data PLPs can by way of specific example, be composed of a cell interleaver (as specified in §§6.4 of ETSI standard EN 302 755 V1.3.1) followed in cascade connection by a time interleaver (as specified in §§6.4 of ETSI standard EN 302 755 V1.3.1). ETSI standard EN 302 755 V1.3.1 defines the OFDM cell as being the modulation value for one OFDM carrier during one OFDM symbol, e.g. a single modulation constellation point. The pseudo-random cell interleaving spreads the cells uniformly in each FEC codeword to ensure an uncorrelated distribution of channel distortions and interference along the FEC codewords in the receiver. Furthermore the cell interleaving "rotates" the interleaving sequence differently in each of the FEC blocks of one time interleaver (TI) block. If used, time interleaving operates at PLP level, and the parameters of the time interleaving may differ for different PLPs within a T2 system.

The function of the OFDM frames assembler 30 is to assemble the complex coordinates of QAM symbol constellations read from the memory units 36, 46, 56 etc. for each of the PLPs and the complex coordinates of QAM symbol constellations of the modulated L1 signaling data into arrays of OFDM symbols to be conveyed within respective ones of T2-frames, as prescribed for DVB-T2 in ETSI standard EN 302 755 V1.3.1. Successive ones of these T2-frames, possibly with Future Extension Frame (FEF) parts interspersed among them, make up super-frames in the overall frame structure. The OFDM frames assembler 30 comprises respective buffer memories for the n PLPs and means for time-division multiplexing T2-frames from the various PLPs into an OFDM generation interface signal to be supplied to the FIG. 4 portion of the transmitter apparatus for broadcasting DTV signals. The buffer memories included in the OFDM frames assembler 30 are usually dual-ported random-access memories (RAMs). The time interleaving procedures described in §§6.5 of ETSI standard EN 302 755 V1.3.1 are subsumed into the addressing of these RAMs. Designs are possible in which the buffer memories for the OFDM frames assembler 30 are subsumed within the memory units 36, 46, 56 etc. The operation of the assembler 30 for assembling a serial stream of OFDM symbols takes into account the configuration of the frame structure and is further controlled responsive to the dynamic scheduling information produced by the scheduler 10. FIG. 2 does not explicitly show the connections for applying these control signals to the assembler 30. FIG. 2 shows the assembler 30 connected for receiving at an input port thereof coordinates of P2 modulation symbols supplied from apparatus depicted in FIG. 3.

The coordinates of P2 modulation symbol constellations supplied from the FIG. 3 apparatus convey the conformation of the frame structure and also convey the dynamic scheduling information (DSI) produced by the scheduler 10. FIG. 3 depicts a first-layer signal generator 20 with two input ports and two output ports. The first of the two input ports is connected for receiving DSI from the scheduler 10, and the second of the two input ports is connected for receiving digital indications specifying the conformation of the frame structure. Responsive to these control signals received at its first and second input ports, the first-layer (L1) signal generator 20 generates L1-pre signaling at its first output port and L1-post signaling at its second output port.

FIG. 3 depicts an encoder 58 for BCH coding having its input port connected for receiving L1-pre signaling supplied from the first output port of the first-layer (L1) signal generator 20. The output port of the encoder 58 for BCH coding connects to the input port of an encoder 59 for LDPC coding. The output port of the encoder 59 connects to the input port of a puncturer 60, the output port of which connects to the input port of a mapper 61 for mapping the coded L1-pre signaling to BPSK symbol constellations. The output port of the mapper 61 connects to a first of two input ports of a time-division multiplexer 62. Details of the processing of L1-pre signaling are essentially as described in §§7.3.1.1 of ETSI standard EN 302 755 V1.3.1 for DVB-T2.

FIG. 3 depicts a bit scrambler 63 having its input port connected for receiving L1-post signaling supplied from the second output port of the first-layer (L1) signal generator 20. The bit scrambler 63 provides data bit randomization similar to that provided by the BBFRAME scramblers 9, 19 and 29. The output port of the bit scrambler 63 connects to the input port of an encoder 64 for CRC-8 coding, the output port of which connects to the input port of an encoder 65 for BCH coding. The output port of the encoder 65 for BCH coding connects to the input port of an encoder 66 for LDPC coding. FIG. 3 shows the output port of the encoder 66 connected to the input port of a puncturer 67, the output port of which connects to the input port of a bit interleaver 68 similar to the bit interleavers 33, 43 and 54. The output port of the bit interleaver 68 connects to the input port of a mapper 69 for mapping the coded L1-post signaling to BPSK, QPSK, 16QAM or 64QAM symbol constellations. The output port of the mapper 69 connects to the second input port of the time-division multiplexer 62. The puncturer 67 is optional and can be replaced by a direct connection from the output port of the encoder 66 for LDPC coding to the input port of the bit interleaver 68. Details of the processing of L1-post signaling are essentially as described in §§7.3.2 and §§7.3.3 of ETSI standard EN 302 755 V1.3.1 for DVB-T2.

The time-division multiplexer 62 is configured for generating a response therefrom that time-interleaves complex coordinates of the BPSK symbol constellations mapping respective segments of coded L1-pre signaling supplied to its first input port from the mapper 61 with the complex coordinates of the BPSK, QPSK or QAM symbol constellations mapping respective segments of coded L1-post signaling supplied to its second input port from the mapper 69. FIG. 3 indicates that the time-division multiplexer 62 supplies the complex coordinates of P2 symbols in its response to a respective input port of the assembler 30 of OFDM symbols depicted in FIG. 2.

A transmission signal in an OFDM broadcast system is transmitted in successive segments called OFDM symbol blocks. Each OFDM symbol block includes an interval during which an effective symbol is supplied for inverse discrete Fourier transformation (I-DFT), and further includes a guard interval into which the waveform of a concluding portion of the latter half of this effective symbol will be directly copied. This guard interval is provided at the beginning of the initial half of the OFDM symbol block. In an OFDM system, such a guard interval is provided to improve performance during multi-path reception. A plurality of OFDM symbol blocks are collected to form one OFDM transmission frame, which DVB-T2 denominates a T2 frame.

FIG. 4 depicts apparatus that generates and transmits radio-frequency COFDM signals responsive to the stream of OFDM symbols supplied via an OFDM generation interface from the output port of the assembler 30 for assembling a serial stream of OFDM symbols, which assembler 30 is depicted in FIG. 2. The output port of the assembler 30 connects to the input port of a pilot carriers insertion and dummy tones reservation unit 71, the output port of which unit 71 connects to the input port of an OFDM modulator 72. The unit 71 inserts pilot carriers as described in §9.2 of ETSI standard EN 302 755 V1.3.1 for DVB-T2. The unit 71 may also insert zero-valued carriers to reserve spectrum for the subsequent insertion of dummy tones by a peak-to-average-power-ratio (PAPR) reduction unit 73.

The OFDM modulator 72 includes a serial-to-parallel converter for converting the serially generated complex digital samples of the effective OFDM symbols to parallel complex digital samples for inverse discrete Fourier transformation (I-DFT). The OFDM modulator 72 further includes a parallel-to-serial converter for converting the parallel complex digital samples of the I-DFT results to serial complex digital samples of the I-DFT results. The OFDM modulator 72 has 1 K, 2K, 4K, 8K, 16K or 32K carriers capability. That is, DFT size can be 1 K, 2K, 4K, 8K, 16K or 32K. The 8K, 16K and 32K sizes of DFT are suitable for transmissions to stationary DTV receivers. Transmissions to mobile receivers are apt to employ smaller DFT size, 4K generally being preferred. The 1K DFT size is employed when sending indications of the beginnings of T2 frames. FIG. 4 shows a connection for applying digital samples supplied from the output port of the OFDM modulator 72 to the input port of a peak-to-average-power-ratio (PAPR) reduction unit 73.

ETSI standard EN 302 755 V1.3.1 includes two methods for reducing PAPR in DVB-T2 that allow about a 58% reduction in peak amplifier power rating, which can save electricity costs for a broadcasting station significantly. In the first method, called "tone reservation", 1% of the OFDM carriers are reserved and do not carry any data, but instead may be used for inserting values that will counteract the peaks in the signal. In the second method, called "active constellation extension", the values of certain of the edge constellation points are moved "outwards" in such way as to reduce the signal peaks. Since only edge constellation points are ever moved outwards, their movement has no significant impact on the ability of the DTV receiver to decode the data.

The output port of the PAPR reduction unit 73 is connected to the input port of a guard-interval-and-cyclic-prefix-insertion unit 74. The output port of the guard-interval-and-cyclic-prefix insertion unit 74 is connected to the input port of a unit 75 for inserting preamble-1 (P1) symbols into the digital data stream. The output port of the P1 symbols insertion unit 75 connects to the input port of a digital-to-analog converter 76, the output port of which is connected for supplying analog COFDM carriers to the input port of an up converter 77. The up converter 77 converts the analog COFDM carriers in the DAC 76 response to final radio frequencies and is connected for supplying them from its output port to the input port of a linear power amplifier 78. FIG. 4 shows the output port of the linear power amplifier 78 connected for driving RF analog COFDM signal power to a transmission antenna 79. FIG. 4 omits showing some details of the DTV transmitter, such as band-shaping filters for the RF signals.

Figure 5:
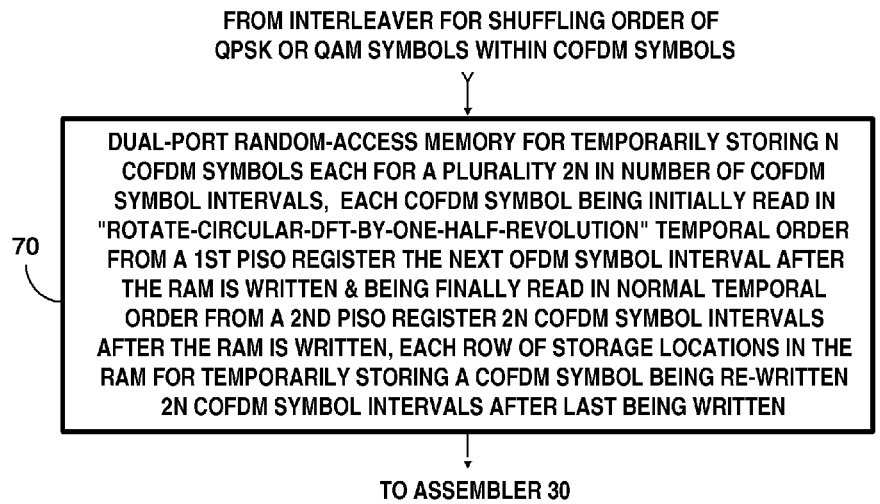
FIG. 5 provides greater detail as to possible structure of each of the memory units depicted in FIG. 2, in FIG. 7 and in FIG. 9.
Figure 7:
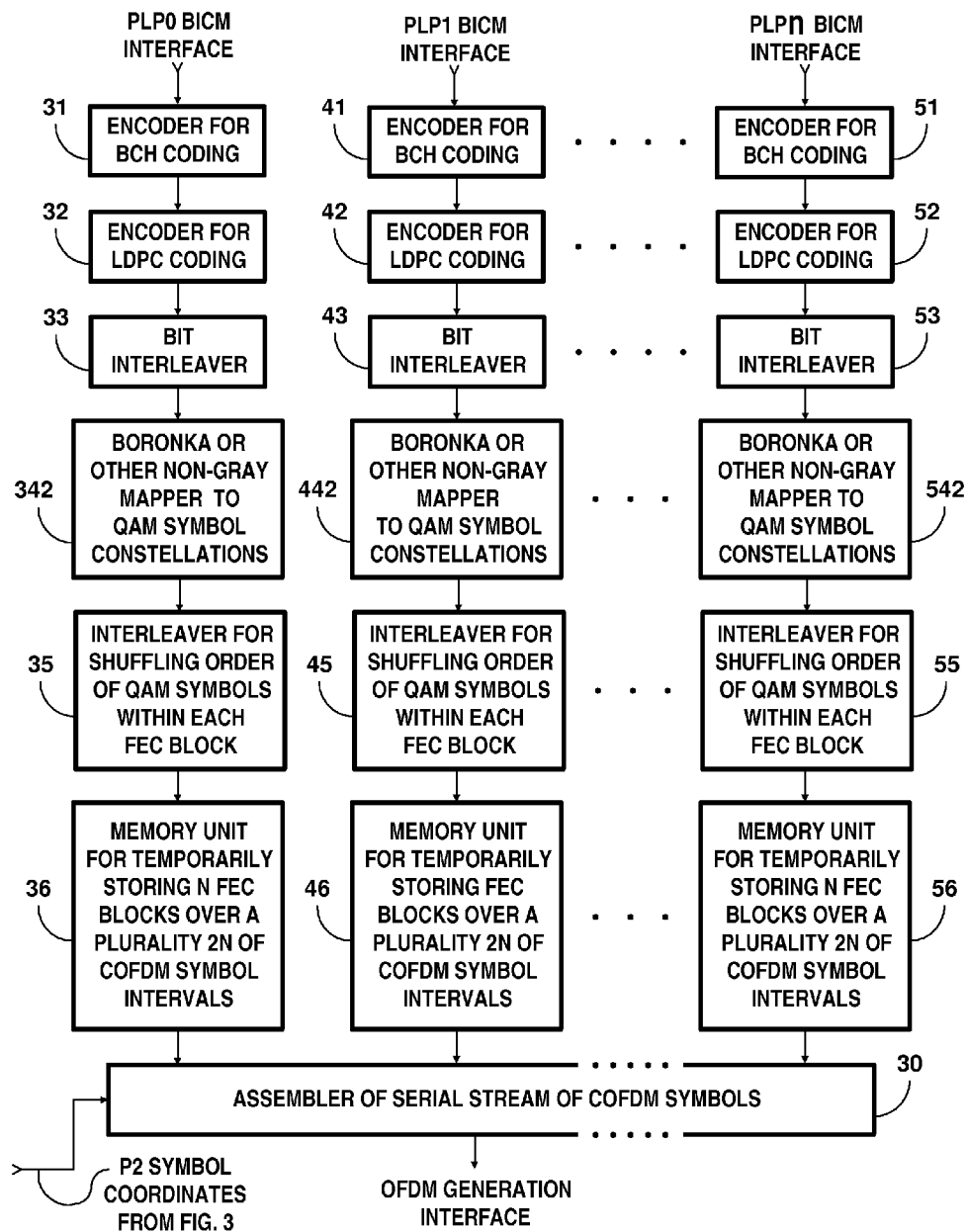
FIG. 7 is a schematic diagram depicting a replacement for the FIG. 2 portion of the COFDM transmitter apparatus depicted in FIGS. 1, 2, 3 and 4.
Figure 9:
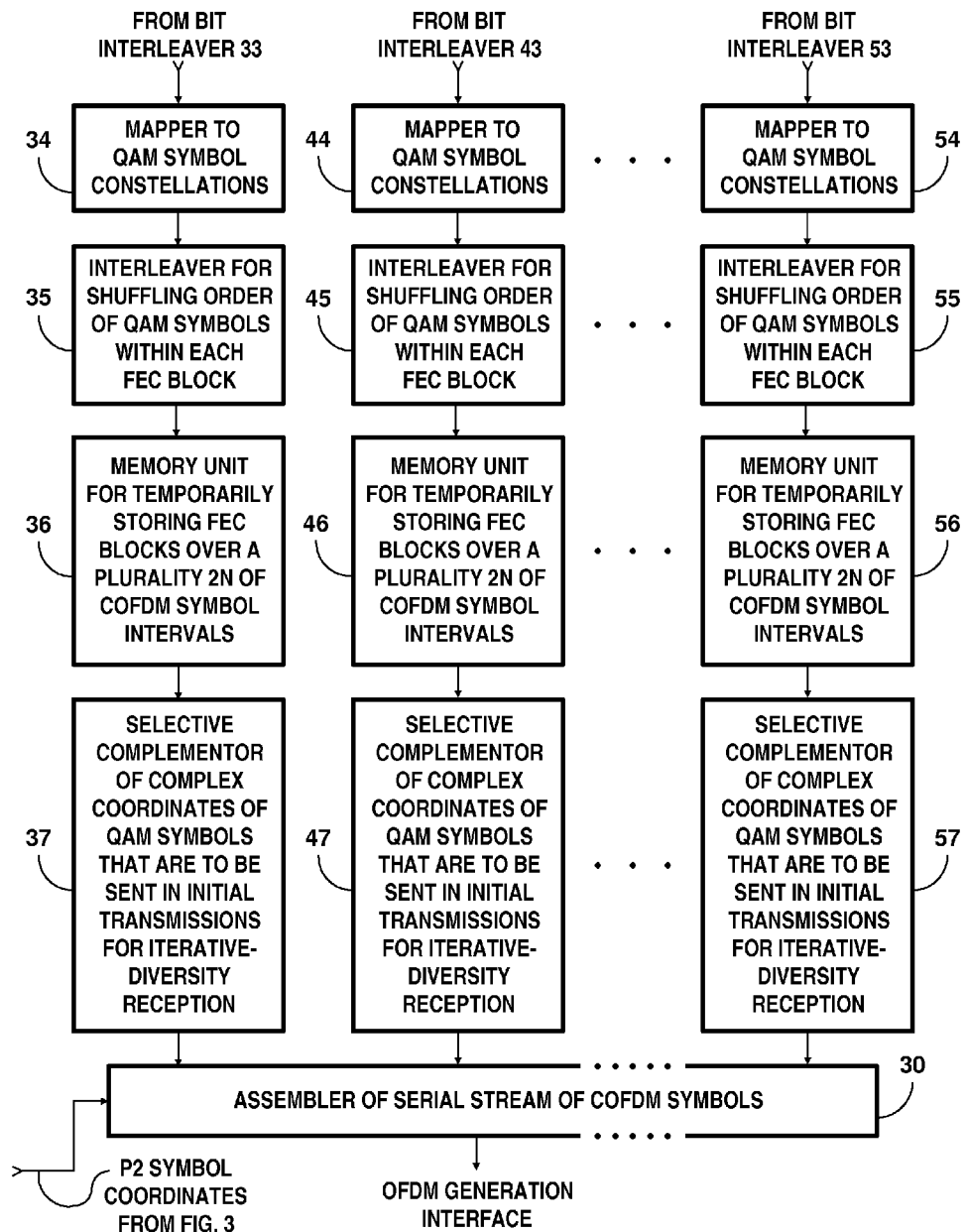
FIG. 9 is a schematic diagram depicting modifications of the FIG. 2 portion or FIG. 7 portion of COFDM transmitter apparatus.

FIG. 5 provides greater detail as to possible structure and operation of each of the memory units 36, 46 and 56 depicted in FIG. 2, in FIG. 7 and in FIG. 9. FIG. 5 depicts such a memory unit as essentially consisting of a triple-port random-access memory 70 capable of storing a plurality N in number of COFDM symbols that is operable in the following way. The write addressing of the RAM 70 scrolls through N rows of storage locations, each of which rows of storage locations provides temporary storage for a respective COFDM symbol. Each successive COFDM symbol in a PLP is written in normal temporal order into the FIG. 5 RAM 70 via its write-input port and thereafter is immediately loaded in parallel into a first parallel-in/serial-out (PISO) register from its row of storage locations in the random-access memory. That first PISO register is then read to supply the assembler 30 a first serial read output signal from a first serial output port of the triple-port RAM 70, with the final halves of COFDM symbols as written into RAM 70 in normal temporal order being read out before their respective initial halves. That is, the COFDM symbols are initially read out from the first serial output port of the RAM 70 in "rotate-circular-DFT-by-one-half-revolution" temporal order. 2N coded-OFDM symbol intervals after each of the COFDM symbols is written, it is loaded in parallel into a second PISO register from its row of storage locations in the random-access memory, just before that row of storage locations is re-written by a new COFDM symbol. That second PISO register is then read to supply the assembler 30 a second serial read output signal from a second serial output port of the triple-port RAM 70. That is, the COFDM symbols are finally read out from the second serial output port of the RAM 70, and this final read-out is in the same normal temporal order as the COFDM symbols supplied to the RAM 70 for being written into respective rows of storage locations therein.

In some COFDM transmitter apparatuses one or more of the PLPs provides only single-time transmission of data. If such a PLP includes a memory unit for temporarily storing FEC blocks, the memory unit need not be configured for rotating COFDM symbols in the single-time transmission of data. The memory unit simply provides temporary storage to assist time-division multiplexing of COFDM symbols carried out by the assembler 30 of a serial stream of COFDM symbols.

In accordance with well-known practice, the mappers 341, 441, 541 etc. for the PLPs provide Gray mapping of bit-interleaved LDPC coding to square QAM symbol constellations. Cruciform QAM symbol constellations cannot be Gray mapped exactly, but the mappers 341, 441, 541 etc. for the PLPs provide close-to-Gray mapping. By way of example, the cruciform QAM symbol constellations can be 512QAM symbol constellations provided close-to-Gray mapping as described in U.S. patent application Ser. No. 13/555,117 filed 6 Aug. 2012 for A. L. R. Limberg with the title "COFDM broadcast systems employing turbo coding". Cruciform 32QAM symbol constellations and cruciform 128QAM symbol constellations with close-to-Gray mapping are also possible. Cruciform QAM symbol constellations are advantageous in that they tend to have smaller PAPRs than square QAM symbol constellations have. Accordingly, the PAPR reduction unit 73 depicted in FIG. 4 can be omitted, with the output port of the of the OFDM modulator 72 connecting directly to the input port of the guard-interval-and-cyclic-prefix-insertion unit 74. Transmitter apparatus is possible in which at least one of the memories in mappers 341, 441, 551 etc. is written with cruciform QAM symbol constellations, but each other of those memories is written with square QAM symbol constellations. In such case, the PAPR reduction unit 73 is retained.

Figure 6:
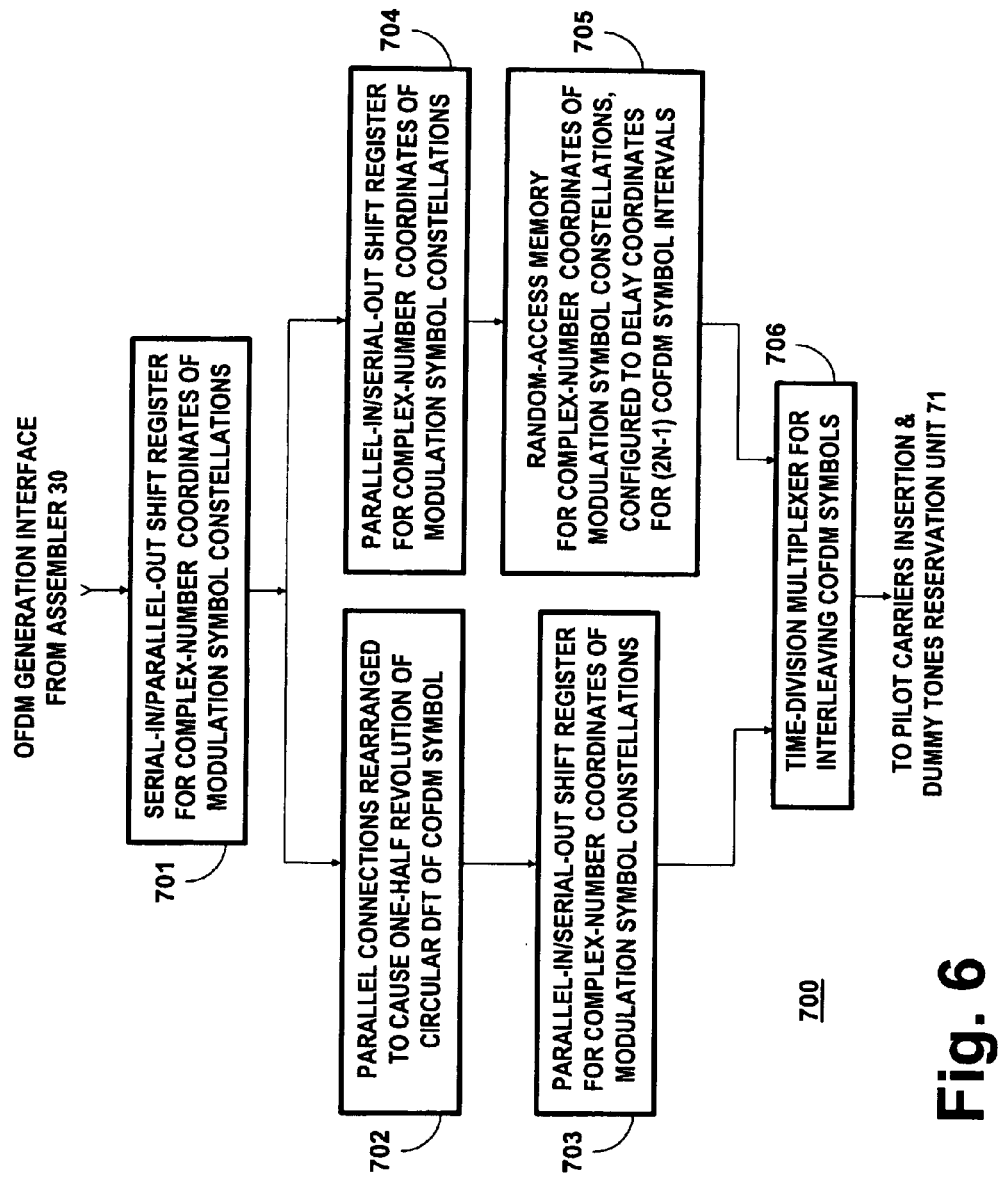
FIG. 6 is a detailed schematic diagram of novel alternative structure for the plural-port random-access memory depicted in FIG. 4.

FIG. 6 is a schematic diagram of a memory structure 700 that can replace the RAM 70 depicted in FIG. 4. The output port of the FIG. 2 assembler 30 is connected for supplying a serial stream of COFDM symbols to the input port of a serial-in/parallel-out (SIPO) shift register 701 in the FIG. 6 memory structure 700. The number of parallel bit streams from the multiple-connection output port of the SIPO shift register 701 is such as to comprehend all the bits in a complex COFDM symbol. Parallel connections 702 rearrange these parallel bit streams for application to the multiple-connection input port of a parallel-in/serial-out (PISO) shift register 703. The rearrangement is such as to rotate the circular DFT of the COFDM symbol by one-half revolution. That is, the PISO shift register 703 supplies a serial bitstream from its output port that reproduces the final half of each COFDM symbol supplied to the input port of the SIPO shift register 701 before reproducing the initial half of each COFDM symbol supplied to the input port of the SIPO shift register 701. This bitstream is subsequently used in the initial transmissions conveying FEC-coded data for iterative-diversity reception.

The bitstream to be used in the final transmissions conveying FEC-coded data for iterative-diversity reception is generated by the memory structure 700, using a further parallel-in/serial-out (PISO) shift register 704 and a random-access memory (RAM) 705. The multiple-connection output port of the SIPO shift register 701 connects to the multiple-connection input port of the SIPO shift register 704. The SIPO shift register 704 supplies a serial bitstream from its output port that reproduces of each COFDM symbol supplied to the input port of the SIPO shift register 701, without altering the order of the bits therein. The total latent delay of COFDM symbols processed through the shift registers 701 and 704 compensates for latent delay of COFDM symbols processed through the shift registers 701 and 703, except for the half-revolution of DFT of COFDM symbols introduced by rearrangement of bit streams in the parallel connections 702. The RAM 705 is configured to delay the COFDM symbols reproduced at the output port of the PISO shift register 704 further, delaying them by the number (2N−1) of COFDM symbol intervals.

FIG. 6 depicts a time-division multiplexer 706 for interleaving COFDM symbols for inclusion in the initial transmissions for iterative-diversity reception with COFDM symbols for inclusion in the final transmissions for iterative-diversity reception. The output port of the PISO shift register 703 is connected for supplying COFDM symbols in rotated temporal order to a first of two input ports of the time-division multiplexer 706, for inclusion in the initial transmissions for iterative-diversity reception. A read-output port of the RAM 705 is connected for supplying the second input port of the time-division multiplexer 706 with delayed COFDM symbols in normal temporal order, for inclusion in the final transmissions for iterative-diversity reception. The output port of the time-division multiplexer 706 connects to the input port of the pilot carriers insertion and dummy tones reservation unit 71. In the time-interleaving introduced by time-division multiplexer 706, the COFDM symbols with non-rotated circular DFT are delayed (2N−1) COFDM symbol intervals compared to the COFDM symbols with rotated circular DFT.

Consecutive COFDM symbol time intervals can be considered to be consecutively numbered. The serial clocking of PISO shift register 703 arranges for supplying the time-division multiplexer 706 COFDM symbols in rotated temporal order during odd-numbered COFDM symbol time intervals. The RAM 705 is operated to read the COFDM symbols with non-rotated circular DFT to the time-division multiplexer 706 during even-numbered COFDM symbol time intervals, so as to interleave those COFDM symbols with non-rotated circular DFT properly with the COFDM symbols with rotated circular DFT supplied from the PISO shift register 703. In a modification of what is depicted in FIG. 6, the time-division multiplexer 706 is replaced by respective tri-state buffering at the output ports of the PISO shift register 703 and the RAM 705.

FIG. 7 depicts a replacement for the FIG. 2 portion of COFDM transmitter apparatus. The FIG. 7 replacement differs from the FIG. 2 portion of the COFDM transmitter apparatus in that the Gray or close-to-Gray mappers 341, 441, 541 etc. for mapping to QPSK or QAM symbol constellations are respectively replaced by non-Gray mappers 342, 442, 542 etc. From work done in formulating the DVB-T standard for terrestrial DTV broadcasting, it is known that Gray mapping of QAM symbol constellations of COFDM carriers secures best possible reception for a quasi-static fading transmission channel with limited (or no) antenna diversity and for a plurality of quasi-static fading channels not having independent noise statistics. It is here pointed out that the noise statistics for signals that are transmitted at different times via a quasi-static fading transmission channel with limited (or no) antenna diversity are independent of each other.

Commentary in the technical literature indicates that while Gray mapping of QAM is preferred for non-iterative de-mapping and decoding, some other types of mapping offer significantly better AWGN performance for iterative de-mapping and decoding with many iterations. For an initial few iterations Gray mapping achieves lower BER for an AWGN channel than other sorts of QAM mapping, but it also soon exhibits a higher bit-error-rate (BER) floor than other sorts of mapping. Gray mapping of QAM symbol constellations is well-suited for concatenated Reed-Solomon/turbo coding for which the number of decoding iterations is small, typically ranging up to seven or so. Because of its high BER floor, Gray mapping of QAM symbol constellations constrains the AWGN-channel performance of low-density parity-check (LDPC) coding for which the number of decoding iterations typically ranges up to fifty or so. The non-Gray 16QAM mapping with the lowest BER floor was disclosed by A. Boronka and J. Speidel in their paper, "A low complexity MIMO system based on BLAST and iterative anti-Gray-demapping," *International Symposium on Personal, Indoor and Mobile Radio Communications (PIMRC)* 2003, vol. 2, pp. 1400-1404, Beijing, China, September 2003.

Figure 8:
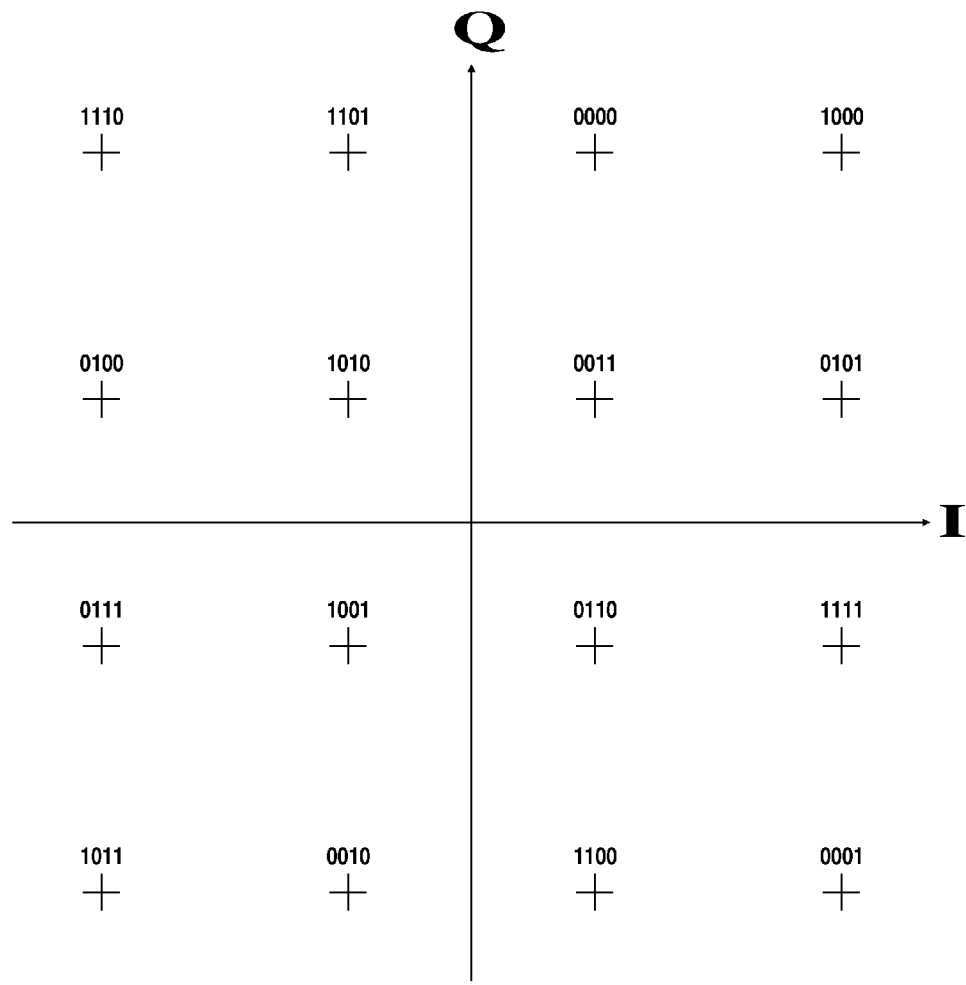
FIG. 8 is a plot of a non-Gray mapping for 16QAM symbol constellations.

FIG. 8 is a plot of a non-Gray mapping that A. Boronka and J. Speidel found had the lowest BER floor for 16QAM symbol constellations. Computer search of non-Gray mapping of larger QAM constellations can find those with the lowest BER floors.

FIG. 9 is a schematic diagram depicting modifications of the FIG. 2 portion or FIG. 7 portion of COFDM transmitter apparatus. The mappers 34, 44, 54 etc. depicted in FIG. 9 correspond to the mappers 341, 441, 541 etc. of FIG. 2 and to the mappers 342, 442, 542 etc. of FIG. 7, respectively. In FIG. 9 the output ports of the memory units 36, 46, 56 etc. are not directly connected to respective input ports of the assembler 30 as shown in both FIG. 2 and FIG. 7. Instead, a selective complementor 37 connects the output port of the memory unit 36 to an input port of the assembler 30; a selective complementor 47 connects the output port of the memory unit 46 to an input port of the assembler 30; a selective complementor 57 connects the output port of the memory unit 56 to an input port of the assembler 30 etc. The selective complementors 37, 47, 57 etc. complement the complex coordinates of QAM symbols that are to be sent in the initial transmissions for iterative-diversity reception, but do not complement the complex coordinates of QAM symbols that are to be sent in the final transmissions. This selective complementing reduces the direct component of modulating signal, simplifying capacitive coupling in some designs of transmitter apparatus and in some designs of receiver apparatus.

In other COFDM transmitter apparatus embodying aspects of the invention, arrangement for repeated transmission of COFDM symbols succeeds rather than precedes the assembler 30 of a serial stream of COFDM symbols. In this other COFDM transmitter apparatus, the FIG. 4 portion of COFDM transmitter apparatus is modified to connect the output port of the assembler 30 to the write input port of the plural-ported RAM 70 and to connect the read output port of the RAM 70 to the input port of the pilot carriers insertion and dummy tones reservation unit 71. This other COFDM apparatus does not allow for the different PLPs using a variety of delays between initial and final transmissions of the same COFDM symbols.

FIG. 10 is a table showing the approximate number of bits of information in the various 2K, 4K, 8K, 16K and 32K DFT sizes available from active COFDM carriers that use modulation symbol constellations for QPSK, 16QAM, 32QAM, 64QAM, 128 QAM, 256QAM or 512QAM. The number of bits of information conveyed by each COFDM symbol transmitted twice to provide for iterative-diversity reception is a design consideration that has not been specifically addressed thusfar in this specification. This number is determined by the number of terms in the DFT mapped to respective OFDM carriers, times the number of bits in each PSK or QAM symbol constellation mapped to a respective "active" OFDM carrier. Typically, around 15% of the OFDM carriers are pilot carriers, rather than active carriers.

FIG. 11 is a table showing better numbers of COFDM symbols of the various 2K, 4K, 8K, 16K and 32K sizes to use as data symbols in a T2 frame when modulation symbol constellations for QPSK, 16QAM, 32QAM, 64QAM, 128 QAM, 256QAM or 512QAM are used. The data symbols in a T2 frame include an integral number of blocks of FEC coding, and any COFDM symbols or portions thereof beyond those needed to convey that integral number of blocks of FEC coding are padding with bits that usually are null bits that convey no useful information. When there are two transmissions of the same coded data, with the DFT of the retransmission rotated one-half revolution respective to the DFT of the initial transmission, having as little over an even number of OFDM symbols or DFT spectra to convey each T2 frame is the desideratum. This facilitates the delay between initial and final transmissions of the same data being just one COFDM symbol interval, without having to spill over into a subsequent T2 frame. This also facilitates the alternative of the delay between initial and final transmissions of the same data being an integral number of T2 frames in duration without having to use many null bits.

A way to make the numbers fit together even better is to decrease the size of the normal FEC frame by a small percentage. One way to do this is to prescribe the values of certain bits in the 16,200-bit and 64,800-bit blocks of FEC coding, so those bits need not be transmitted but can be supplied from memory at the receiver.

A multiple of any of the better numbers of COFDM symbols for conveying FEC-coded data in a T2 frame will also be a good number of COFDM symbols for conveying FEC-coded data in a T2 frame. The trend in COFDM broadcasting of DTV is to use 8K, 16K or 32K FFT sizes rather than a smaller-size FFT. This suggests the use of 152 COFDM symbols in T2 frames, so long as FEC-coded data is available to fill the T2 frames.

The number (2N−1) of COFDM symbol intervals of delay between the initial transmission of a rotated COFDM symbol and the final transmission of a corresponding non-rotated COFDM symbol is a design consideration that has been addressed only incidentally thusfar in this specification. The number 2N need not be the same for each PLP.

As a first alternative, the number (2N−1) can be large, a multiple of the number of COFDM symbols in a time slice of the PLP response, in order to accommodate the design of receivers able to overcome drop-outs in received signal strength that last up to a second or more. Receivers used in moving vehicles are apt to experience such protracted drop-outs in received signal strength. Each unit increase in the multiple of the number of COFDM symbols in a time slice of the PLP increases the delay between initial and final transmissions of related COFDM symbols by a T2 frame interval that can be up to 250 milliseconds in duration. This presumes that the PLP is a type 1 PLP. When final transmissions are delayed for a prescribed number of T2 frame intervals respective to initial transmission of the same data, the delay is subject to variation. This is because T2 frames can vary in size. Furthermore, future extension frames (FEFs) of indeterminate size may be interspersed among T2 frames. Also, if the PLP is a type 2 PLP, sub-slices of the PLP are apt to be unevenly spaced in time.

Also, when the delay between initial and final transmissions of related COFDM symbols is increased to a number of T2 frame intervals extending over a second or more, the receiver is apt to experience less correlation between deep frequency-selective fading of the COFDM symbols in the final transmissions and deep frequency-selective fading of the rotated COFDM symbols in the initial transmissions. So, code-combining final transmissions with initial transmissions delayed to concur with corresponding final transmissions, which code-combining is done either before or after de-mapping of QPSK or QAM symbols, will be less likely able to suppress the effects of frequency-selective fading. This is the reason that interleavers 35, 45, 55 etc. for shuffling the order of QPSK or QAM symbols within COFDM symbols are included in the FIG. 2, FIG. 7 and FIG. 9 portions of DTV transmitters. De-shuffling the QPSK or QAM symbols within COFDM symbols received by a DTV receiver disperses the effects of the frequency-selective fading, so that decoding of the concatenated BCH coding and LDPC coding is more likely to succeed in faithfully reproducing data that was transmitted.

As a second alternative, the odd number (2N−1) of COFDM symbol intervals between initial and final transmissions of related COFDM symbols can be very small—e.g., nine or less, even only a single COFDM interval. This makes it much more likely that the receiver will experience strong correlation between deep frequency-selective fading of the COFDM symbols in the final transmissions and deep frequency-selective fading of the rotated COFDM symbols in the initial transmissions. Accordingly, code-combining final transmissions with initial transmissions delayed to concur with corresponding final transmissions, which code-combining is done either before or after de-mapping of QPSK or QAM symbols, will be quite likely able to suppress the effects of frequency-selective fading. This is of particular benefit to stationary DTV receivers receiving transmissions from two or more transmitters in a single-frequency network (SFN). De-shuffling the QPSK or QAM symbols within COFDM symbols received by a DTV receiver disperses the effects of the frequency-selective fading, so that decoding of the concatenated BCH coding and LDPC coding is more likely to succeed in faithfully reproducing data that were transmitted.

If DTV transmitters are permitted to make initial and final transmissions of the same data in more than one way, a DTV transmitter has to signal DTV receivers which way or ways it makes initial and final transmissions of the same data. This signaling can be done utilizing the L1-post signaling extension fields provided for in the DVB-T2 standard. However, signaling can also be done by modifying indications in the fields in L1-pre signaling or L1-post signaling, which fields are already specified in the DVB-T2 standard. Preferably, the modifications are such that initial and final transmissions of the same data can be made differently in individual PLPs with the same T2 frames. This affords a broadcaster flexibility in tailoring some PLPs for services designed particularly for reception by stationary DTV receivers and other PLPS for services designed particularly for reception by DTV receivers in moving vehicles. The beginning of each T2 frame begins with a P1 symbol applicable to the entire T2 slice. This P1 symbol is followed by a number of P2 symbols, one for each PLP in the T2 frame, facilitating specifying the delay between initial and final transmissions of the same data individually for each data PLP having a time slice in the T2 frame.

The single-bit PLP_ROTATION field in the respective configurable L1-post signaling portion of each P2 symbol can be modified to indicate by ZERO that a PLP does not convey both initial and final transmissions of the same data and to indicate by ONE that the PLP does convey both those initial and final transmissions. If the modified single-bit PLP_ROTATION field is ZERO, this signals receivers that a single-time transmission is being made of data that will not be repeated. If the modified single-bit PLP_ROTATION field is ONE to signal that the PLP conveys both those initial and final transmissions of the same data, the receiver then needs to know how many COFDM symbol intervals are in the delay between initial and final transmissions of the same data.

The 3-bit PLP_TYPE field in L1-post signaling per DVB-T2 can be modified to allow any one of four additional indications. A first of the four additional indications, such as 110, identifies a type 1 data PLP that conveys both initial transmissions of data in rotated temporal order and final transmissions of the same data in normal temporal order after a delay of fewer COFDM symbol intervals than in a slice of the PLP response within a T2 frame. A second of the four additional indications in the PLP_TYPE field, such as 100, identifies a type 1 data PLP that conveys both initial transmissions of data in rotated temporal order and final transmissions of the same data in normal temporal order after a delay of more COFDM symbol intervals than in a slice of the PLP response within a T2 frame. These first and second additional indications both contrast with the 001 indication of a type 1 data PLP, which 001 indication is thenceforth interpreted as a confirmation that the type 1 data PLP conveys single-time transmission of data that is not repeated.

A third of the four additional indications in the PLP_TYPE field, such as 101, identifies a type 2 data PLP that conveys both initial transmissions of data in rotated temporal order and final transmissions of the same data in normal temporal order after a delay of fewer COFDM symbol intervals than in a sub-slice of the PLP response within a T2 frame. A fourth of the four additional indications, such as 111, identifies a type 2 data PLP that conveys both initial transmissions of data in rotated temporal order and final transmissions of the same data in normal temporal order after a delay of more COFDM symbol intervals than in a sub-slice of the PLP response within a T2 frame. These first and second additional indications both contrast with the 010 indication of a type 2 data PLP, which 010 indication is thenceforth interpreted as a confirmation that the type 2 data PLP conveys single-time transmission of data that is not repeated.

If either of the first and third additional indications is transmitted in the PLP_TYPE field, the number of full COFDM symbol intervals delay between the initial and final transmissions of the same data is specified in the 11-bit RESERVED_1 field in configurable L1-post signaling. DTV receivers are designed to respond to either of the first and third additional indications being received in the PLP_TYPE field as a key for interpreting the indications received specified in that RESERVED_1 field as specifying the number of full COFDM symbol intervals delay between the initial and final transmissions of the same data.

If the second additional indication is transmitted in the PLP_TYPE field, the number of full T2 slices delay between the initial and final transmissions of the same data is specified in the 11-bit RESERVED_1 field in configurable L1-post signaling. DTV receivers are designed to respond to the second additional indication being received in the PLP_TYPE field as a key for interpreting the indications received specified in that RESERVED_1 field as specifying the number of full T2 slice intervals delay between the initial and final transmissions of the same data.

If the fourth additional indication is transmitted in the PLP_TYPE field, the number of full T2 slices delay between the initial and final transmissions of the same data is specified in the 11-bit RESERVED_1 field in configurable L1-post signaling. DTV receivers are designed to respond to the fourth additional indication being received in the PLP_TYPE field as a key for interpreting the indications received specified in that RESERVED_1 field as specifying the number of partial T2 slice intervals delay between the initial and final transmissions of the same data.

DTV receivers must further decide what the proper phasing is of final transmissions of data respective to initial transmissions conveying the same data. A DTV receiver can assign alternate COFDM symbols as belonging to respective ones of initial and final transmissions of the same data by counting COFDM symbols from the start of a PLP slice or sub-slice, signaling of such starts being included in the L1-post signaling specified in the DVB-T2 standard. A DTV receiver can further include apparatus to detect substantial correlation between initial and final transmissions of the same data within a PLP, thereby to confirm correctness of an assignment of alternate COFDM symbols to respective ones of those initial and final transmissions of the same data.

Figure 12:
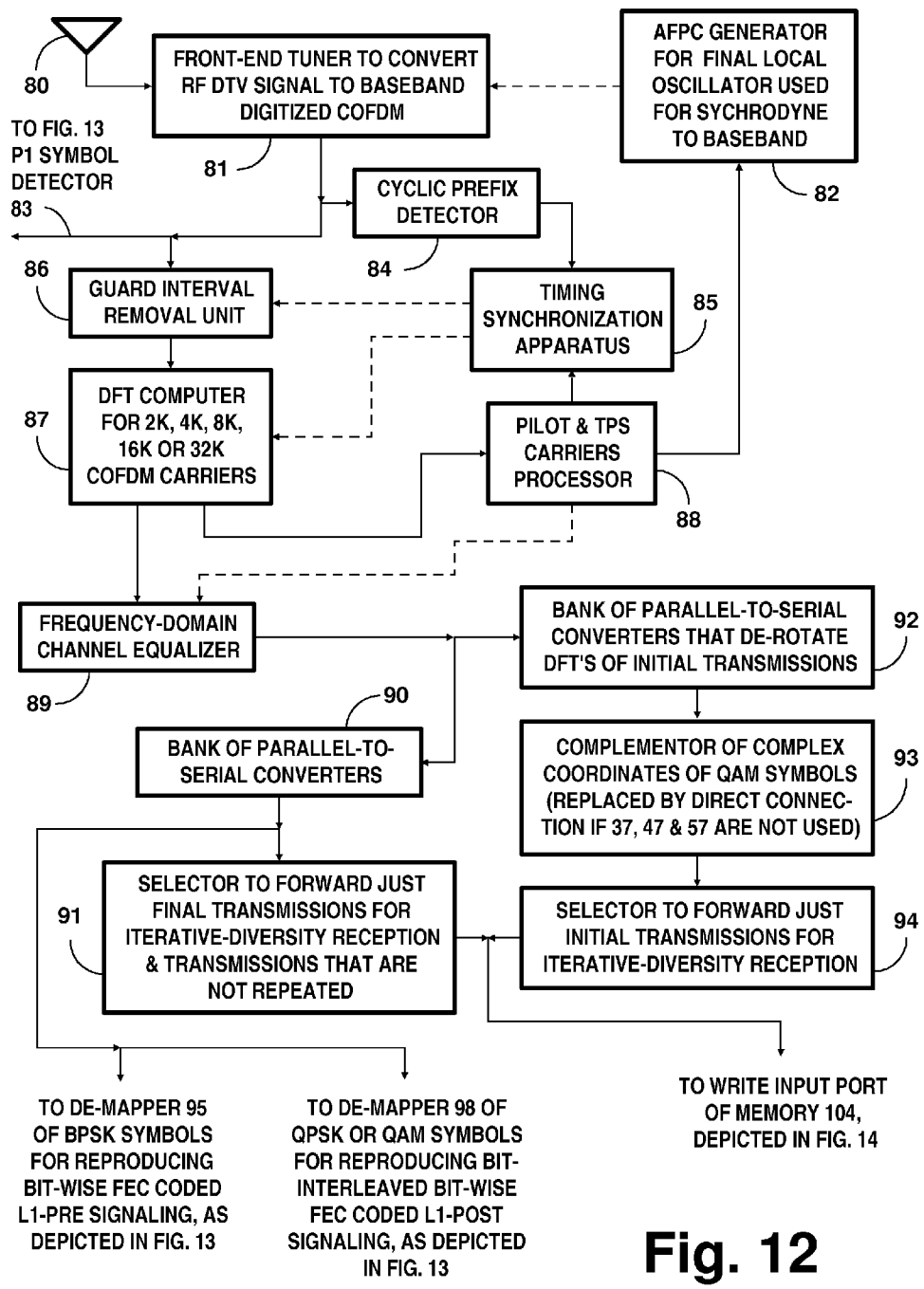
FIGS. 12, 13 and 14 together form a schematic diagram of COFDM receiver apparatus configured for iterative-diversity reception of COFDM signals, which COFDM receiver apparatus embodies aspects of the invention and selects correct internet-protocol packets from LDPC coding that is transmitted twofold.

FIG. 12 shows the initial portion of a DTV receiver designed for iterative-diversity reception of COFDM signals as transmitted at VHF or UHF by a DTV transmitter, such as the one depicted in FIGS. 1, 2, 3 and 4. A reception antenna 80 captures the radio-frequency COFDM signal for application as input signal to a front-end tuner 81 of the receiver. The front-end tuner 81 can be of a double-conversion type composed of initial single-conversion super-heterodyne receiver circuitry for converting radio-frequency (RF) COFDM signal to intermediate-frequency (IF) COFDM signal followed by circuitry for performing a final conversion of the IF COFDM signal to baseband COFDM signal. The initial single-conversion receiver circuitry typically comprises a tunable RF amplifier for RF COFDM signal incoming from the reception antenna, a tunable first local oscillator, a first mixer for heterodyning amplified RF COFDM signal with local oscillations from the first local oscillator to obtain the IF COFDM signal, and an intermediate-frequency (IF) amplifier for the IF COFDM signal. Typically, the front-end tuner 81 further includes a synchronous demodulator for performing the final conversion from IF COFDM signal to baseband COFDM signal and an analog-to-digital converter for digitizing the baseband COFDM signal. Synchronous demodulation circuitry typically comprises a final local oscillator with automatic frequency and phase control (AFPC) of its oscillations, a second mixer for synchrodyning amplified IF COFDM signal with local oscillations from the final local oscillator to obtain the baseband COFDM signal, and a low-pass filter for suppressing image signal accompanying the baseband COFDM signal. In some designs of the front-end tuner 81, synchronous demodulation is performed in the analog regime before subsequent analog-to-digital conversion of the resulting complex baseband COFDM signal. In other designs of the front-end tuner 81, analog-to-digital conversion is performed before synchronous demodulation is performed in the digital regime.

Simply stated, the front-end tuner 81 converts radio-frequency COFDM signal received at its input port to digitized samples of baseband COFDM signal supplied from its output port. Typically, the digitized samples of the real component of the baseband COFDM signal are alternated with digitized samples of the imaginary component of the baseband COFDM signal for arranging the complex baseband COFDM signal in a single stream of digital samples. FIG. 12 shows an AFPC generator 82 for generating the automatic frequency and phase control (AFPC) signal for controlling the final local oscillator within the front-end tuner 81.

Figure 13:
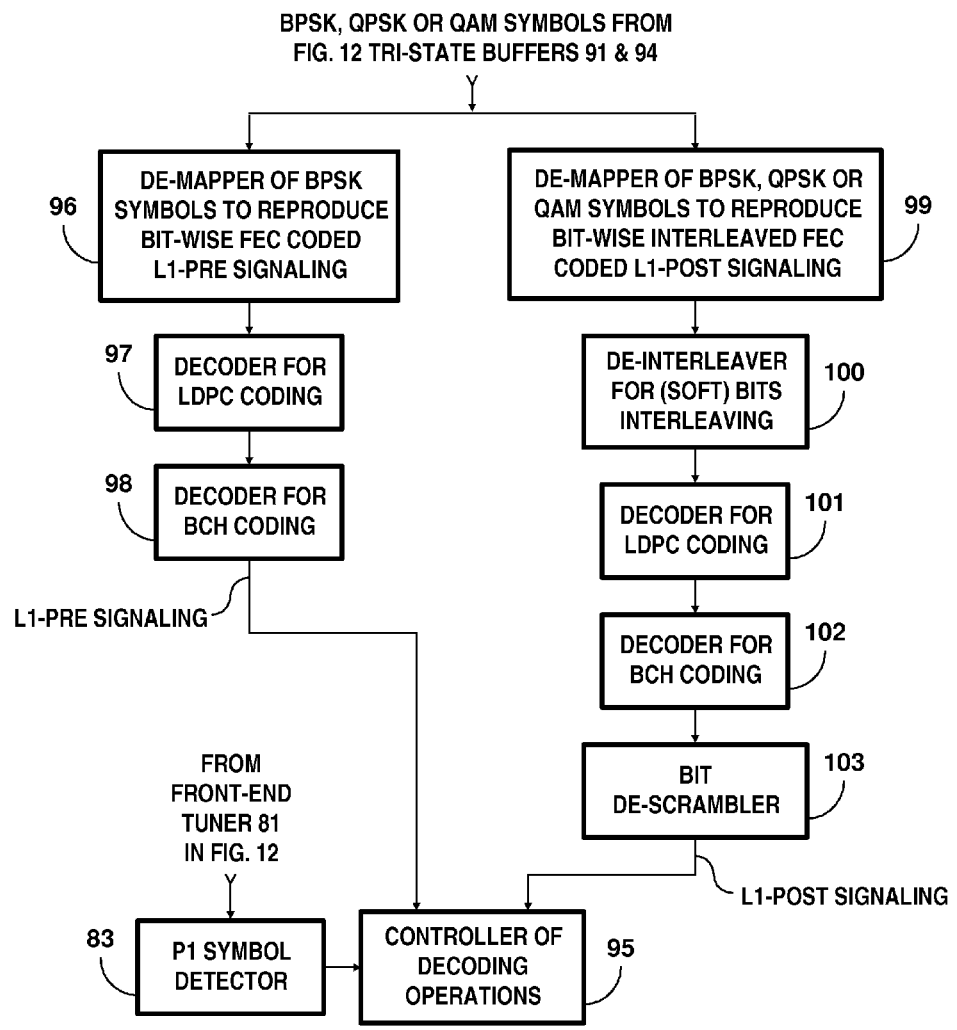

The output port of the front-end tuner 81 is connected for supplying digitized samples of baseband COFDM signal to the respective input ports of a P1 symbol detector 83 depicted in FIG. 13 and a cyclic prefix detector 84 depicted in FIG. 12. The cyclic prefix detector 84 differentially combines the digitized samples of baseband COFDM signal with those samples as delayed by the duration of an effective COFDM symbol. Nulls in the difference signal so generated should occur, marking the guard intervals of the baseband COFDM signal. The nulls are processed to reduce any corruption caused by noise and to generate better-defined indications of the phasing of COFDM symbols. The output port of the cyclic prefix detector 84 is connected to supply these indications to a first of two input ports of timing synchronization apparatus 85.

A first of two output ports of the timing synchronization apparatus 85 is connected for supplying gating control signal to the control input port of a guard-interval-removal unit 86, the signal input port of which is connected for receiving digitized samples of baseband COFDM signal from the output port of the front-end tuner 81. The output port of the guard-interval-removal unit 86 is connected for supplying the input port of discrete-Fourier-transform computer 87 with windowed portions of the baseband COFDM signal that contain effective COFDM samples. A second of the output ports of the timing synchronization apparatus 85 is connected for supplying the DFT computer 87 with synchronizing information concerning the effective COFDM samples.

The indications concerning the phasing of COFDM symbols that the cyclic prefix detector 84 supplies to the timing synchronization apparatus 85 is sufficiently accurate for initial windowing of a baseband COFDM signal that the guard-interval-removal unit 86 supplies to the DFT computer 87. A first output port of the DFT computer 87 is connected for supplying demodulation results for at least all of the pilot carriers in parallel to the input port of a pilot carriers processor 88, and a second output port of the DFT computer 87 is connected for supplying demodulation results for each of the COFDM carriers to the input port of a frequency-domain channel equalizer 89. The processor 88 selects the demodulation results concerning pilot carriers for processing, part of which processing generates weighting coefficients for channel equalization filtering in the frequency domain. A first of three output ports of the processor 88 that are explicitly shown in FIG. 12 is connected for supplying these weighting coefficients (via wiring depicted as a dashed-line connection) to the frequency-domain channel equalizer 89, which uses those weighting coefficients for adjusting its responses to the demodulation results for each of the COFDM carriers.

A second of the output ports of the pilot carriers processor 88 that are explicitly shown in FIG. 12 is connected for supplying more accurate window-positioning information to the second input port of the timing synchronization apparatus 85. This window-positioning information is an adjustment generated by a feedback loop that seeks to minimize the noise accompanying pilot carriers, which noise increases owing to intercarrier interference from adjoining modulated carriers when window positioning is not optimal.

A third of the output ports of the pilot carriers processor 88 explicitly shown in FIG. 12 is connected for forwarding unmodulated pilot carriers to the input port of the AFPC generator 82. The real components of the unmodulated pilot carriers are multiplied by their respective imaginary components in the AFPC generator 82. The resulting products are summed and low-pass filtered to develop the AFPC signal that the AFPC generator 82 supplies to the front-end tuner 81 for controlling the final local oscillator therein. Other methods to develop AFPC signals for the final local oscillator in the front-end tuner 81 are also known, which can replace or supplement the method described above. One such other method is described in U.S. Pat. No. 5,687,165 titled "Transmission system and receiver for orthogonal frequency-division multiplexing signals, having a frequency-synchronization circuit", which was granted to Flavio Daffara and Ottavio Adami on 11 Nov. 1997. In that method complex digital samples from the tail of each OFDM symbol are multiplied by the conjugates of corresponding digital samples from the cyclic prefix of the OFDM symbol. The resulting products are summed and low-pass filtered to develop the AFPC signal that the AFPC generator 82 supplies to the front-end tuner 81 for controlling the final local oscillator therein.

The DFT computer 87 is customarily constructed so it can demodulate any one of the 2K, 4 k, 8K, 16K and 32K options as to the number of OFDM carriers. If this be the case, the correct option is chosen responsive to information from the P1 symbol detector 83 depicted in FIG. 13. As noted supra, the second output port of the DFT computer 87 is connected to supply demodulated complex digital samples of the complex coordinates of QPSK or QAM symbol constellations in parallel to the input port of the frequency-domain channel equalizer 89. To implement a simple form of frequency-domain channel equalization, the pilot carriers processor 88 measures the amplitudes of the demodulated pilot carriers to determine basic weighting coefficients for various portions of the frequency spectrum. The pilot carriers processor 88 then interpolates among the basic weighting coefficients to generate respective weighting coefficients supplied to the frequency-domain channel equalizer 89 with which to multiply the complex coordinates of QPSK or QAM symbol constellations supplied from the DFT computer 87. Various alternative types of frequency-domain channel equalizer are also known.

The output port of the DFT computer 87 involves a plurality of connections for supplying respective sets of complex coordinates for QPSK or QAM symbol constellations of respective OFDM carriers. The frequency-domain channel equalizer 89 weights each of these respective sets of complex coordinates for QPSK or QAM symbol constellations of respective OFDM carriers received in parallel at its input port and supplies the weighted responses in parallel from its output port to the respective input ports of a bank 90 of parallel-to-series converters. The response of the one of the parallel-to-series converters in this bank 90 of them that is appropriate for the number of OFDM carriers in the DFT and the sort of modulation symbol constellations for those carriers is selected as the response supplied from the bank 90 of parallel-to-series converters for de-mapping of the modulation symbol constellations in that response. FIGS. 12 and 13 indicate that the response of the bank 90 of parallel-to-series converters is supplied directly to a de-mapper 95 of FEC-coded L1-pre signaling and to a de-mapper 98 of FEC-coded L1-post signaling.

As thusfar described, the FIG. 12 initial portion of a COFDM receiver is similar to the initial portions of COFDM receivers used for DVB in Europe. However, in a departure from customary practice, the response of the bank 90 of parallel-to-series converters is not supplied directly to a de-mapper for the successive QPSK or QAM constellations in data PLPs. Instead, that response is supplied to an input port of a selector 91 that is conditioned to forward to that de-mapper just the final transmissions for diversity reception and single-time transmissions that are not later repeated.

In another departure from customary practice, the connections to the input ports of another bank 92 of parallel-to-series converters are arranged so as in effect to de-rotate the circular DFT components computed by the DFT computer 87. The one of the parallel-to-series converters in this bank 92 of them that is appropriate for the number of OFDM carriers in the DFT and the sort of modulation symbol constellations for those carriers is selected to be loaded with the rotated circular DFT components computed by the DFT computer 87 responsive to initial transmissions of data that are later transmitted again. The response of this selected parallel-to-series converter is supplied from the bank 92 of parallel-to-series converters. Presuming that the transmitter apparatus of FIGS. 1, 2 (or 7), 3 and 4 is modified per FIG. 8, the output port of the bank 92 of parallel-to-series converters is connected for supplying complex QPSK or QAM symbol map coordinates to the input port of a complementor 93 for those coordinates. The output port of the complementor 93 connects to an input port of a selector 94 that is conditioned to forward for de-mapping just the complemented complex QPSK or QAM symbol map coordinates in the initial transmissions for diversity reception. If the transmitter apparatus is not modified per FIG. 8, the complementor 93 is omitted, being replaced by a direct connection from the output port of the bank 92 of parallel-to-series converters to the input port of the selector 94.

Figure 14:
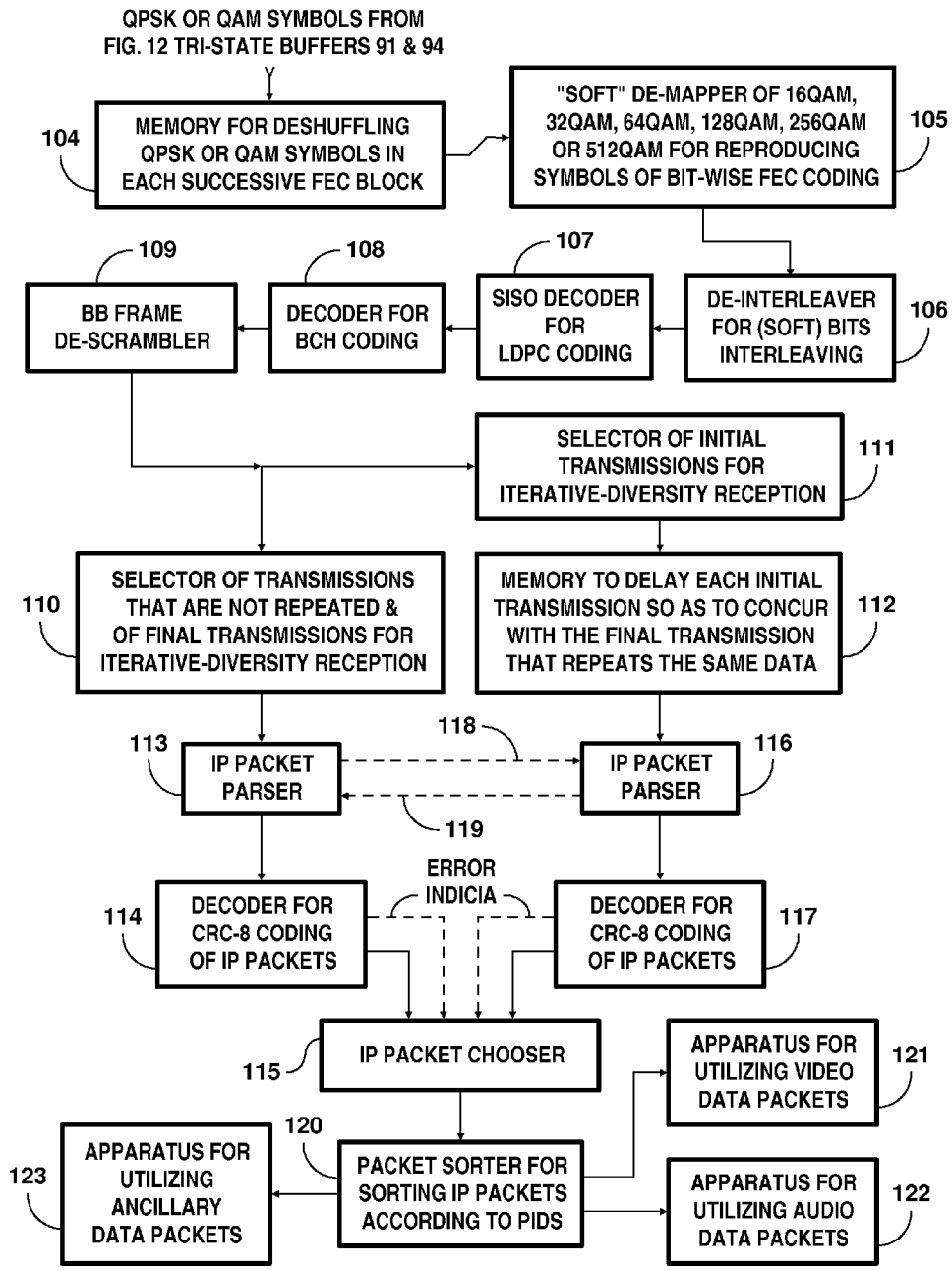

The output ports of the selectors 93 and 94 connect to a common junction point and thence to the write-input port of a memory 104 depicted in FIG. 14. Accordingly, the selectors 93 and 94 can be respective tri-state buffer amplifiers that together operate as a time-division multiplexer for supplying the write-input port of the memory 104 with respective complex QPSK or QAM symbol map coordinates from each of the initial and final transmissions for diversity reception, as time-interleaved with each other.

FIG. 13 depicts a controller 95 of decoding operations in the DTV receiver, but does not explicitly show the connections to elements of the receiver through which those elements are controlled. FIG. 13 shows the output port of the P1 symbol detector 83 connected to a respective input port of the controller 95. FIG. 13 further indicates that the input port of the P1 symbol detector 83 is connected for receiving baseband digitized COFDM signal from the front-end tuner 81 depicted in FIG. 14. The P1 symbol detector 83 detects each occurrence of a P1 symbol, which is based on a 1K OFDM symbol with frequency-shifted repeats at its beginning and its conclusion. A P1 symbol signals the beginning of a T2 frame, and the P1 symbol detector 83 supplies this important timing information to the controller 95. The structure of the P1 symbol facilitates easy detection thereof, as well as forestalling any possibility of its being imitated by any part of the signal within the ensuing T2 frame. Only a fraction of the 1K OFDM carrier positions convey energy, and these carry one of a set of carefully chosen data patterns to provide some capability for signaling the controller 95 for decoding operations in the DTV receiver. This format of P1 symbol provides (a) a simple and robust mechanism for rapid detection of T2 signals when a receiver scans through the appropriate spectrum band, (b) a fast frequency lock mechanism for the receiver and (c) 6-bits of signaling. E.g., these bits may be used for signaling the FFT size used for symbols in the T2 frame. If the DTV standard prescribes inverting the polarity of T2 frames of OFDM signals during initial transmissions, one of these bits can be reserved to signal such inversion.

FIG. 13 depicts a de-mapper 96 for successive coordinates of BPSK symbol constellations as supplied to its input port from the output port of the bank 90 of parallel-to-serial converters in FIG. 14. The controller 95 of decoding operations activates the de-mapper 96 when L1-pre signaling is received, the time for such activation being determined so as to follow the P1 symbol detector 83 indicating to the controller 95 that P1 symbols have just been detected in full. Responsive to the respective parities of the COFDM carriers, the de-mapper 96 generates "soft" bits in logarithmic-likelihood ratio (LLR) format that convey bit-wise FEC coded L1-pre signaling.

These soft bits are supplied from the output port of the de-mapper 96 to the input port of a decoder 97 for LDPC coding. The output port of the decoder 97 for LDPC coding is connected for supplying reproduced BCH coding to the input port of a decoder 98 for BCH coding, the output port of which is connected for supplying reproduced L1-pre signaling to a respective input port of the controller 95 of decoding operations within the DTV receiver.

FIG. 13 depicts a de-mapper 99 for successive complex coordinates of QPSK or QAM symbol constellations as supplied to its input port from the output port of the bank 90 of parallel-to-serial converters in FIG. 14. ETSI standard EN 702 755 V1.3.1 prescribes BPSK, QPSK, 16QAM, or 64QAM symbol constellations be used for L1-post signaling in DVB-T2. The controller 95 of decoding operations activates an appropriate section of the de-mapper 99 when L1-post signaling is received, the time for such activation being determined so as to follow the P1 symbol detector 83 indicating to the controller 95 that P1 symbols have just been detected and further to follow the ensuing L1-pre signaling interval. The de-mapper 99 responds to the complex coordinates descriptive of successive BPSK symbol constellations to recover a single soft bit of FEC coding from each constellation. The de-mapper 99 responds to the complex coordinates descriptive of successive QPSK symbol constellations to recover two soft bits of FEC coding from each constellation. The de-mapper 99 responds to the complex coordinates descriptive of successive 16QAM symbol constellations to recover four soft bits of FEC coding from each constellation. The de-mapper 99 responds to the complex coordinates descriptive of successive 64QAM symbol constellations to recover six soft bits of FEC coding from each constellation. In any one of these four cases, the de-mapper 99 generates the soft bits of FEC coding in LLR format. The de-mapper 99 is connected to supply these soft bits from its output port to the input port of a de-interleaver 100 of the interleaving of those soft bits, attributable to the bit interleaver 68 in the FIG. 3 portion of the DTV transmitter. The design of the de-interleaver 100 is different for different ones of these four cases. The output port of the de-interleaver 100 connects to the input port of a soft-input/soft-output decoder 101 for decoding LDPC coding. The output port of the SISO decoder 101 is connected for supplying soft bits of BCH coding to the input port of a soft-input decoder 102 for decoding BCH coding.

FIG. 13 shows the output port of the BCH decoder 102 connected to the input port of a bits de-scrambler 103. The output port of the bits de-scrambler 103 is connected for supplying L1-post signaling to a respective input port of the controller 95 of decoding operations within the DTV receiver. The L1-post signaling has CRC-8 coding, which coding can be decoded within the controller 95 to verify whether or not the L1-post signaling received by the controller 95 is correct or not.

FIG. 14 depicts a memory 104 for deshuffling the QAM constellations shuffled by the interleavers 351, 451, 551 etc. in the FIG. 2 portion of a DTV transmitter or by the interleavers 352, 452, 552 etc. in the FIG. 7 portion of a DTV transmitter. The controller 95 of decoding operations supplies the memory 104 instructions as to how to deshuffle the successive complex coordinates of 16QAM, 32QAM, 64QAM, 128QAM, 256QAM or 512QAM symbol constellations supplied to its input port from the output port of one of the selectors 91 and 94 shown in FIG. 14. E.g., the controller 95 generates these instructions responsive to the contents of the 3-bit PLP_MOD field in the L1-post signaling prescribed in the DVB-T2 standard. The instructions that the controller 95 supplies to the memory 104 determine the write addressing and read addressing thereof.

FIG. 14 further depicts a de-mapper 105 for successive complex coordinates of 16QAM, 32QAM, 64QAM, 128QAM, 256QAM or 512QAM symbol constellations as supplied to its input port from the output port of the de-interleaver 94. Responsive to the contents of the 3-bit PLP_MOD field in the L1-post signaling prescribed in the DVB-T2 standard, the controller 95 of decoding operations activates an appropriate section of the de-mapper 105 when L1-post signaling and any extension thereof are determined to have been completed. The de-mapper 105 responds to the complex QAM coordinates descriptive of successive 16QAM symbol constellations to recover four soft bits of FEC coding from each constellation. Alternatively, the de-mapper 105 responds to the soft complex QAM coordinates descriptive of successive 32QAM symbol constellations to recover five soft bits of FEC coding from each constellation. Alternatively, the de-mapper 105 responds to the soft complex QAM coordinates descriptive of successive 64QAM symbol constellations to recover six soft bits of FEC coding from each constellation. Alternatively, the de-mapper 105 responds to the soft complex QAM coordinates descriptive of successive 128QAM symbol constellations to recover seven soft bits of FEC coding from each constellation, to the soft complex QAM coordinates descriptive of successive 256QAM symbol constellations to recover eight soft bits of FEC coding from each constellation, or to the soft complex QAM coordinates descriptive of successive 512QAM symbol constellations to recover nine soft bits of FEC coding from each constellation. In any one of these six cases, the de-mapper 105 generates the soft bits of FEC coding in LLR format and supplies them from its output port to the input port of a de-interleaver 106 of the interleaving of those soft bits, attributable to the bit interleavers 33, 43, 53 etc. in the FIG. 2, FIG. 7 or FIG. 9 portion of the DTV transmitter. The output port of the de-interleaver 106 connects to the input port of a soft-input/soft-output decoder 107 for decoding LDPC coding. The output port of the SISO decoder 107 is connected for supplying soft bits of BCH coding to the input port of a soft-input decoder 108 for decoding BCH coding. FIG. 14 shows the output port of the BCH decoder 108 connected to the input port of a baseband-frame (BBFRAME) descrambler 109, the output port of which connects to the respective input ports of selectors 110 and 111.

The selector 110 is configured for selectively reproducing from its output port the BBFRAMEs from the final transmissions for iterative-diversity reception and from single-time transmissions, which are supplied to its input port from the output port of the BBFRAME descrambler 109. The selector 111 is configured for selectively reproducing from its output port the BBFRAMEs from the initial transmissions for iterative-diversity reception, which are supplied to its input port from the output port of the BBFRAME descrambler 109. The output port of the selector 111 connects to the write-input port of a delay memory 112. The delay memory 112 is configured for supplying from its read-output port a response composed of delayed BBFRAMEs from the initial transmissions for iterative-diversity reception, which delayed BBFRAMEs are concurrent with BBFRAMEs from the final transmissions for iterative-diversity reception supplied from the output port of the selector 110.

The BBFRAMEs from single-time transmissions and from the final transmissions for iterative-diversity reception supplied from the output port of the selector 110 are applied to the input port of a first parser 113 for internet-protocol (IP) packets, the output port of which connects to the input port of a decoder 114 for the CRC-8 coding of the IP packets supplied from the output port of the parser 113. After a delay for as much time as to complete decoding of the CRC-8 coding of the longest permissible IP packet in the BBFRAMEs, the CRC-8 decoder 114 reproduces from a first output port thereof those BBFRAMEs for application to a first of two IP-packet-input ports of an IP packet chooser 115. FIG. 14 also shows a connection from a second output port of the CRC-8 decoder 114 to a first of two error-indicia-input ports of the IP packet chooser 115. This connection conveys an indication as to whether CRC-8 decoding determined that the IP packet currently supplied from the first output port of the CRC-8 decoder 114 is correct or is in error.

The delayed BBFRAMEs from the initial transmissions for iterative-diversity reception, supplied from the read-output port of the delay memory 112 are supplied to the input port of a second parser 116 for internet-protocol (IP) packets, the output port of which connects to the input port of a decoder 117 for the CRC-8 coding of the IP packets supplied from the output port of the parser 116. After further delay for as much time as needed to complete decoding of the CRC-8 coding of the longest permissible IP packet in the delayed BBFRAMEs, the CRC-8 decoder 117 reproduces from a first output port thereof those delayed BBFRAMEs for application to the second IP-packet-input port of the IP packet chooser 115. FIG. 14 also shows a connection from a second output port of the CRC-8 decoder 117 to the second of the error-indicia-input ports of the IP packet chooser 115. This connection conveys an indication as to whether CRC-8 decoding determined that the IP packet currently supplied from the first output port of the CRC-8 decoder 117 is correct or is in error.

If the error indicia that the CRC-8 decoders 114 and 117 supply the IP packet chooser 115 indicate that only one of the IP packets that the CRC-8 decoders 114 and 117 concurrently supply to the IP packet chooser 115 has been determined to be correct, the IP packet chooser 115 is conditioned by these error indicia inputs to reproduce from its output port that IP packet determined to be correct. If the error indicia that the CRC-8 decoders 114 and 117 supply the IP packet chooser 113 indicate that both of the IP packets that the CRC-8 decoders 114 and 117 concurrently supply to the IP packet chooser 115 have been determined to be correct, the IP packet chooser 115 is conditioned by these error indicia inputs to reproduce from its output port an arbitrarily selected one of the IP packets determined to be correct. If the error indicia that the CRC-8 decoders 114 and 117 supply the IP packet chooser 115 indicate that neither of the IP packets that the CRC-8 decoders 114 and 117 concurrently supply to the IP packet chooser 115 has been determined to be correct, the IP packet chooser 115 is conditioned by these error indicia inputs to reproduce from its output port one of the IP packets. This IP packet can be arbitrarily selected.

Alternatively, one or more other conditions is taken into account by the IP packet chooser 115 for determining the choice between the two incorrect IP packets. Pilot carriers energy information in regard to the two incorrect IP packets is apt to be helpful in deciding which of the two incorrect IP packets the IP packet chooser 115 is to forward to a packet sorter 120. I.e., an incorrect IP packet associated with an apparently normal level of energy of pilot carriers is chosen, rather than an incorrect IP packet associated with an abnormally low level of energy of pilot carriers. The pilot carriers processor 88 can supply this information from a pilot energy assessment arrangement included therein and shown in detail in FIG. 26.

The contemporaneous operation of the two IP packet parsers 113 and 116 facilitates exchange of information between them concerning when IP packets start. FIG. 14 shows a connection 118 from the IP packet parser 113 to the IP packet parser 116 through which connection 118 the parser 113 can transmit to the parser 116 information concerning when IP packets start. This information is useful to the IP packet parser 116 if a BBFRAME header read thereto from the delay memory 112 has been corrupted so as to destroy indication of the start of the initial IP packet in that BBFRAME, presuming that such indication remains intact in the BBFRAME header supplied to the IP packet parser 113 from the selector 110. Information from the IP packet parser 113 concerning the start of subsequent IP packets in an BBFRAME is useful to the IP packet parser 116 when its daisy-chain computation of the start of a subsequent IP packet in the BBFRAME is disrupted by the header of the preceding IP packet read thereto from the delay memory 112 having been corrupted so as to destroy indication of the start.

FIG. 14 further shows a connection 119 from the IP packet parser 116 to the IP packet parser 113 through which connection 119 the parser 116 can transmit to the parser 113 information concerning when IP packets start. This information is useful to the IP packet parser 113 if a BBFRAME header supplied thereto via the selector 110 has been corrupted so as to destroy indication of the start of the initial IP packet in that BBFRAME, presuming that such indication remains intact in the BBFRAME header read to the IP packet parser 116 from the delay memory 112. Information from the IP packet parser 116 concerning the start of subsequent IP packets in an BBFRAME is useful to the IP packet parser 113 when its daisy-chain computation of the start of a subsequent IP packet in the BBFRAME is disrupted by the header of the preceding IP packet supplied thereto via the selector 110 having been corrupted so as to destroy indication of the start.

FIG. 14 shows the output port of an internet-protocol packet chooser 113 connected for supplying IP packets to the input port of the packet sorter 120 for sorting them according to their PIDs. FIG. 14 shows a first output port of the IP packet sorter 120 connected for supplying video data packets to the input port of apparatus 121 for utilizing video data packets, a second output port of the IP packet sorter 120 connected for supplying audio data packets to the input port of apparatus 122 for utilizing audio data packets, and a third output port of the IP packet sorter 120 connected for supplying ancillary data packets to the input port of apparatus 123 for utilizing ancillary data packets. In actual practice the IP packet sorter 120 is apt not to appear as a separate element, with packets being sorted by each of the apparatuses 121, 122 and 123 selecting appropriate data packets for it to process.

Figure 15:
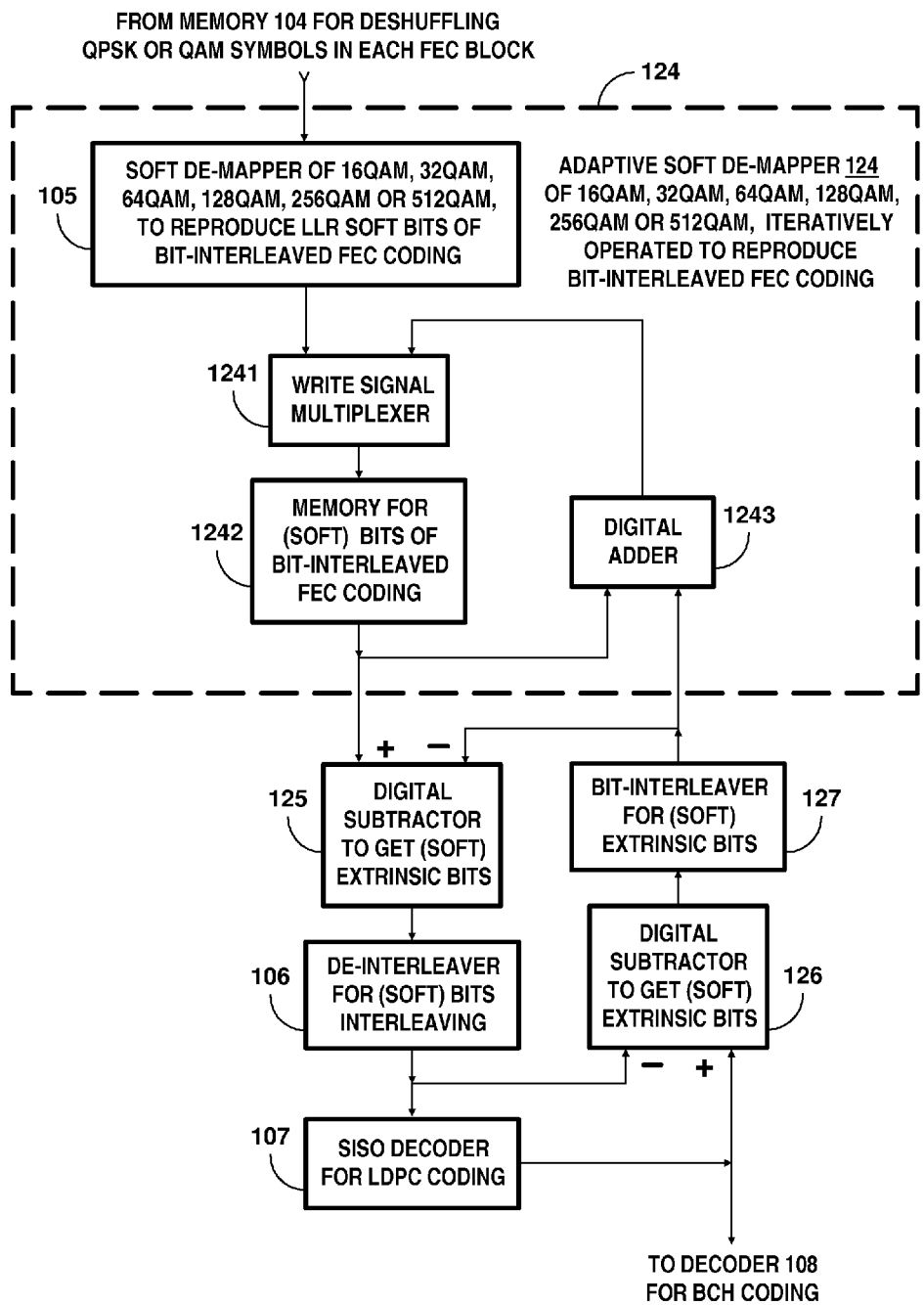
FIG. 15 is a schematic diagram of a modification that is advantageously made to the portions of COFDM receiver apparatus depicted in FIGS. 14 and 25, which modification employs iterative QAM de-mapping together with iterative decoding of LDPC coding.
Figure 25:
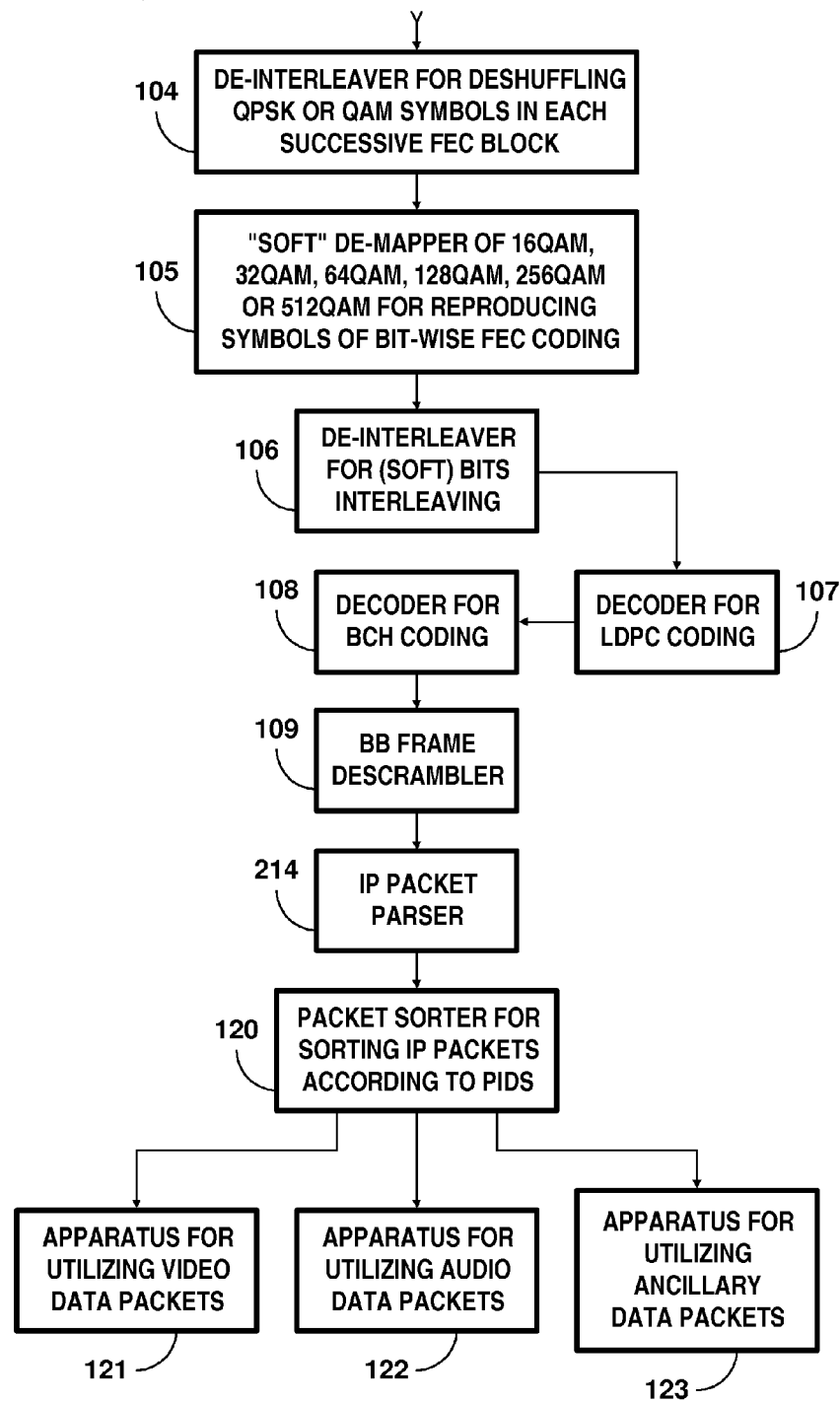

FIG. 15 shows a modification that is advantageously made to the portions of COFDM receiver apparatus depicted in FIGS. 14 and 25, which modification employs iterative QAM de-mapping together with iterative decoding of LDPC coding. The soft de-mapper 105 shown in FIG. 14 or 20 is incorporated within an adaptive soft de-mapper 124 for iterative de-mapping of successive complex coordinates of 16QAM, 32QAM, 64QAM, 128QAM, 256QAM or 512QAM symbol constellations. The adaptive soft de-mapper 124 is configured to accept updating of a posteriori information it supplies, such configuration being described in U.S. Pat. No. 6,353,911 issued 5 Mar. 2002 to Stephan Ten Brink and titled "Iterative demapping". FIG. 15 shows the read-output port of the memory 104 connected for supplying de-shuffled QPSK or QAM symbols for each FEC block to an input port of the adaptive soft de-mapper 124 for application to the input port of the soft de-mapper 105 therein. The soft de-mapper 105 responds to the de-shuffled QPSK or QAM symbols to supply soft bits of FEC coding in log-likelihoodratio (LRR) format at its output port. Besides the soft de-mapper 105, the adaptive soft de-mapper 124 further includes a write signal multiplexer 1241, a memory 1242 for soft bits of FEC coding, and a digital adder 1243. The output port of the soft de-mapper 105 connects to a first of two input ports of the write signal multiplexer 1241, and the sum output port of the digital adder 1243 connects to the second input port of the write signal multiplexer 1241. The output port of the write signal multiplexer 1241 connects to the write input port of the memory 1242. The memory 1242 is capable of temporarily storing the LLRs descriptive of an entire block of FEC coding, as initially de-mapped and as subsequently updated by being additively combined with extrinsic information fed back from the SISO decoder 107 for LDPC coding. The read-output port of the memory 1242 is connected to a first of two input ports of the digital adder 1243 and is further connected via the output port of the de-mapper 124 for supplying a posteriori soft de-mapping results to the minuend input port of a digital subtractor 125. The difference output port of the digital subtractor 125 connects to the input port of the de-interleaver 106 for bit-interleaved soft bits.

FIG. 15 shows the output port of the de-interleaver 106 connecting to the subtrahend input port of a digital subtractor 126, as well as to the input port of the SISO decoder 107. The minuend input port of the subtractor 126 is connected to receive the soft bits of decoding results from the output port of the SISO decoder 107. The subtractor 126 generates soft extrinsic data bits from the SISO decoder 107 by comparing the soft output bits from the SISO decoder 107 with soft input bits to the SISO decoder 107. The output port of the subtractor 126 is connected to supply these soft extrinsic data bits to the input port of a bit-interleaver 127 complementary to the de-interleaver 106. The output port of the bit-interleaver 127 is connected for feeding back bit-interleaved soft extrinsic data bits to the soft de-mapper 124 of QAM, there to be additively combined with previous a posteriori soft de-mapping results read from the memory 1242 to generate updated a priori soft de-mapping results to write over the previous ones read from that memory.

More specifically, the output port of the bit-interleaver 127 connects to the second input port of the digital adder 1243. The memory 1242 is read concurrently with memory within the bit-interleaver 127, and the soft bits read out in LLR form from the memory 1242 is supplied to the first input port of the digital adder 143. The adder 143 adds the interleaved soft extrinsic bits fed back from the SISO decoder 107 to respective ones of the soft bits of a posteriori soft de-mapping results read from the memory 1242 to generate updated a priori soft de-mapping results supplied from the sum output port of the adder 143 to the write input port of the memory 1242 via the write signal multiplexer 1241. The soft bits of previous a posteriori demapping results temporarily stored in the memory 1242 are each written over after its being read and before another soft bit is read.

The output port of the bit-interleaver 127 is also further connected for feeding back bit-interleaved soft extrinsic data bits to the subtrahend input port of the subtractor 125. The subtractor 125 differentially combines the bit-interleaved soft extrinsic data bits fed back to it with respective ones of soft bits of the a posteriori demapping results read from the memory 1242 to generate soft extrinsic data bits from the adaptive soft de-mapper 124 for application to the input port of the de-interleaver 106. As thusfar described the adaptive soft de-mapper 124 and the decoder 107 are a turbo loop connection with each other, and the turbo cycle of demapping QAM constellations and decoding LDPC can be iterated many times—perhaps up to fifty times—to reduce bit errors in the BCH coding the SISO decoder finally supplies to the decoder 108 of BCH coding. Successful correction of BCH codewords can be used for terminating iterative de-mapping and decoding of LDPC coding after fewer turbo cycles than the maximum number permitted.

The digital subtractor 126 and the bit interleaver 127 are positioned differently in a modification of the FIG. 15 structure that provides equivalent performance. The minuend port of the subtractor 126 is connected to receive the input signal to the input port of the de-interleaver 106 rather than to receive the output signal from the output port of the de-interleaver 106. The bit interleaver 127 is moved to a position between the output port of the SISO decoder 107 and the minuend port of the subtractor 126. The difference output port of the subtractor 126 connects directly to the subtrahend input port of the subtractor 125 and to the second input port of the digital adder 1243 in the adaptive soft de-mapper 124.

Figure 16:
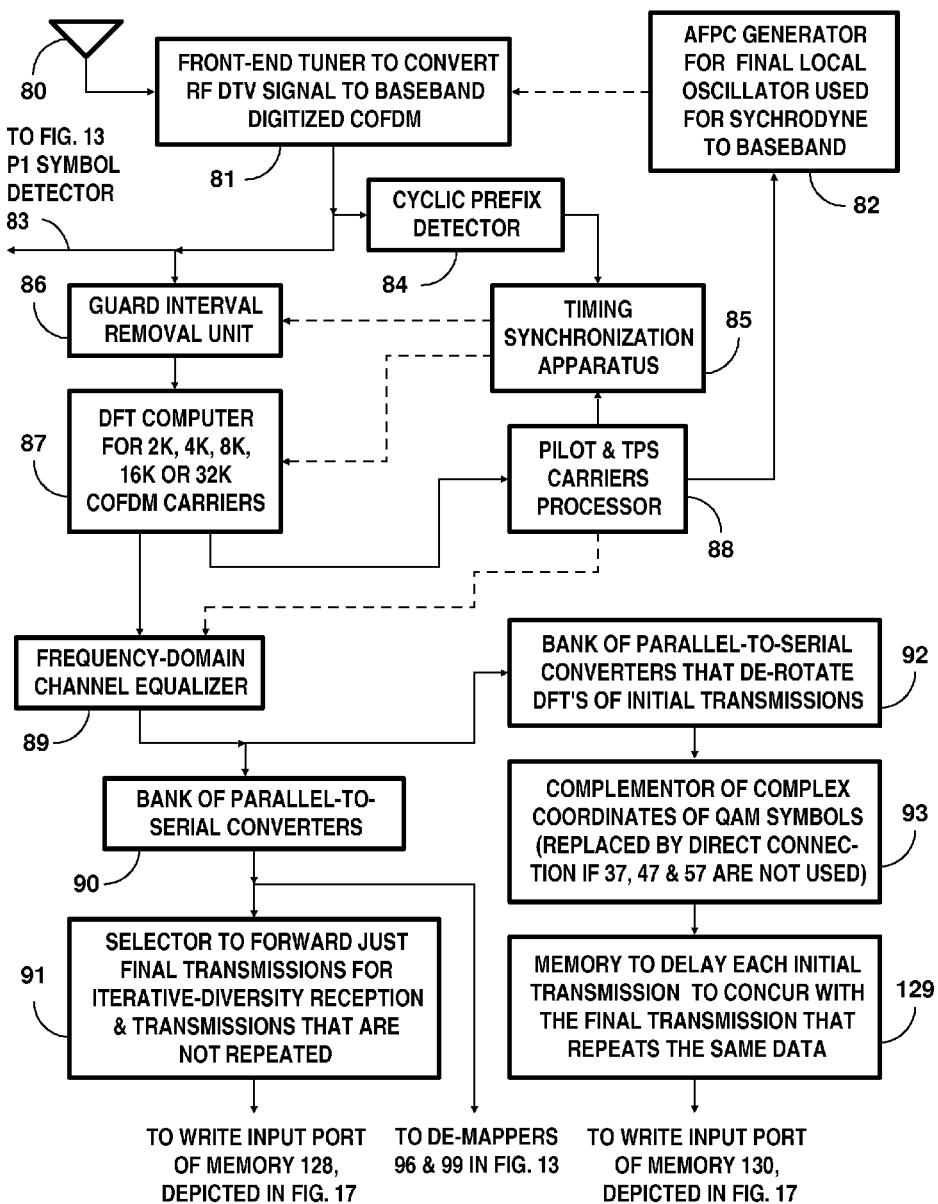
FIGS. 16 and 17 together with FIG. 13 form a schematic diagram of COFDM receiver apparatus configured for iterative-diversity reception of COFDM signals, which receiver apparatus embodies aspects of the invention and employs a plural-input/single-output detector to decode LDPC coding that is transmitted twofold.
Figure 17:
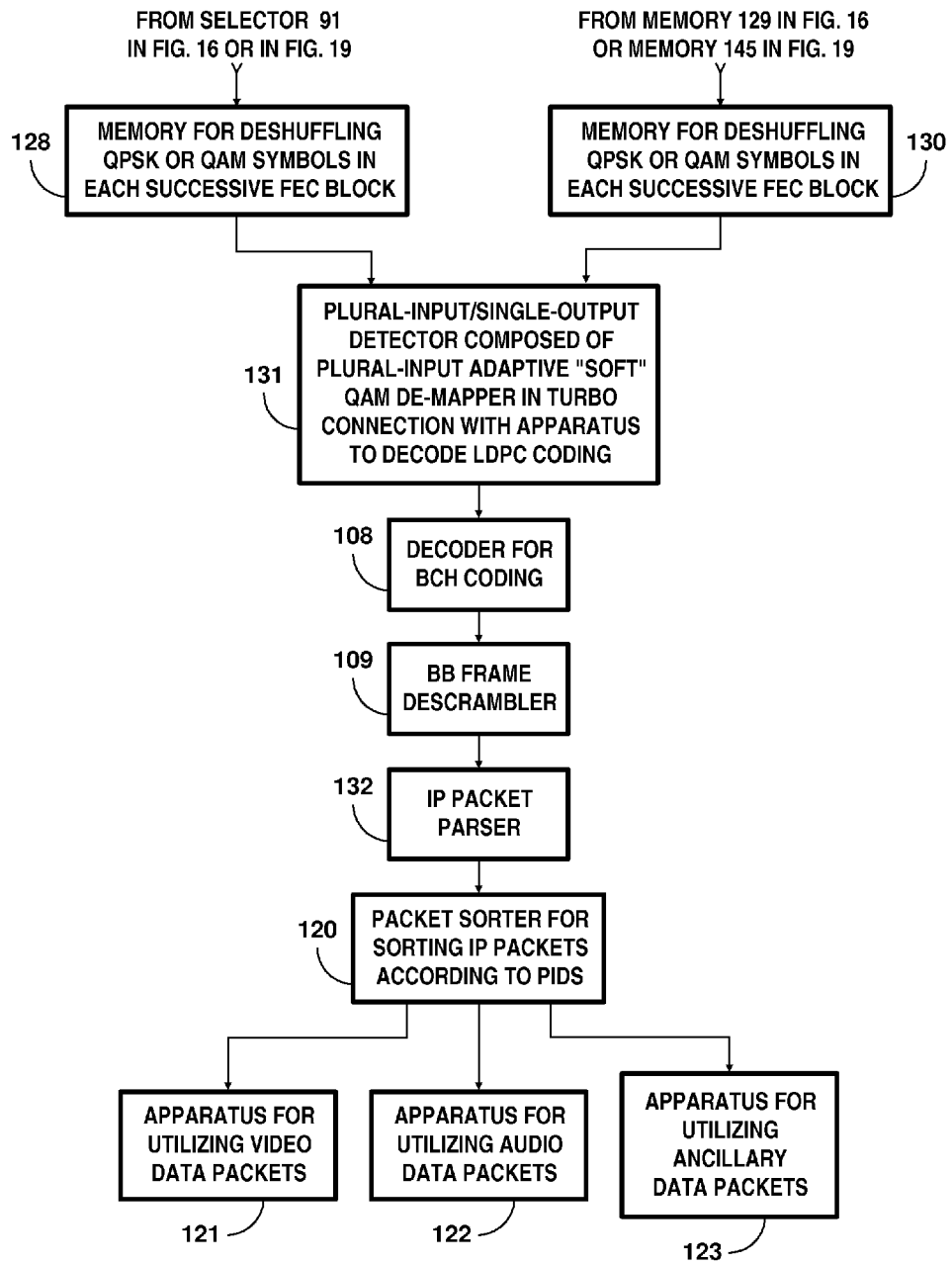

FIGS. 16 and 17 together with FIG. 13 form a schematic diagram of alternative COFDM receiver apparatus for iterative-diversity reception of COFDM signals. Elements 80-82 and 84-93 in FIG. 16 are similar in construction and interconnection to the similarly numbered elements shown in FIG. 12 except for the following differences. FIG. 16 indicates that the output port of the selector 91 connects to the write-input port of memory 128 depicted in FIG. 17, rather than being connected as shown in FIG. 12. The complex QPSK or QAM symbol map coordinates supplied from the bank 92 of parallel-to-series converters are complemented by the complementor 93 as in FIG. 12. However, in FIG. 16 the output port of the complementor 93 is connected to the write-input port of a delay memory 129 rather than to the input port of the selector 94, which is not included in the alternative COFDM receiver apparatus shown in FIGS. 16, 17 and 13. FIG. 16 indicates that the read-output port of the memory 129 connects to the write-input port of further memory 130 depicted in FIG. 17. The delay memory 129 is selectively written with just initial transmissions of successive COFDM symbols. The delay memory 129 is configured to provide delayed response to each initial transmission of a COFDM symbol, which response concurs in time with the response of the selector 91 to final transmission of that symbol.

FIG. 17 further depicts a plural-input/single output detector 131 with one of its two input ports connected for receiving read-out from the memory 128 and with the other of its input ports connected for receiving read-out from the memory 130. The memory 128 is configured so its response deshuffles the shuffled QPSK or QAM symbols in the response of the selector 91 to successive FEC blocks as finally transmitted. The memory 130 is configured so its response deshuffles the shuffled QPSK or QAM symbols in the read-out from the memory 129 responsive to each FEC block as initially transmitted. The plural-input/single output detector 131 is of a type similar to any one of known types used to decode duplicated LDPC coding in COFDM signals received either in frequency-division multiplex or via respective antennas for spatial diversity reception. The plural-input/single output detector 131 is composed of a plural-input "soft" de-mapper of QAM symbol constellations combined with apparatus to decode LDPC coding. The output port of the plural-input/single output detector 131 is connected for supplying the results of decoding LDPC coding to the input port of a decoder 108 for BCH coding.

The output port of the decoder 108 is connected for supplying the results of decoding BCH coding to the input port of a BB Frame descrambler 109, which has its output port connected to the input port of a parser 132 for internet-protocol (IP) packets. The output port of the IP packet parser 132 is connected to supply IP packets to the input port of the packet sorter 120 for sorting them according to their PIDs. FIG. 17 shows a first output port of the IP packet sorter 120 connected for supplying video data packets to the input port of apparatus 121 for utilizing video data packets, a second output port of the IP packet sorter 120 connected for supplying audio data packets to the input port of apparatus 122 for utilizing audio data packets, and a third output port of the IP packet sorter 120 connected for supplying ancillary data packets to the input port of apparatus 123 for utilizing ancillary data packets.

Figure 18:
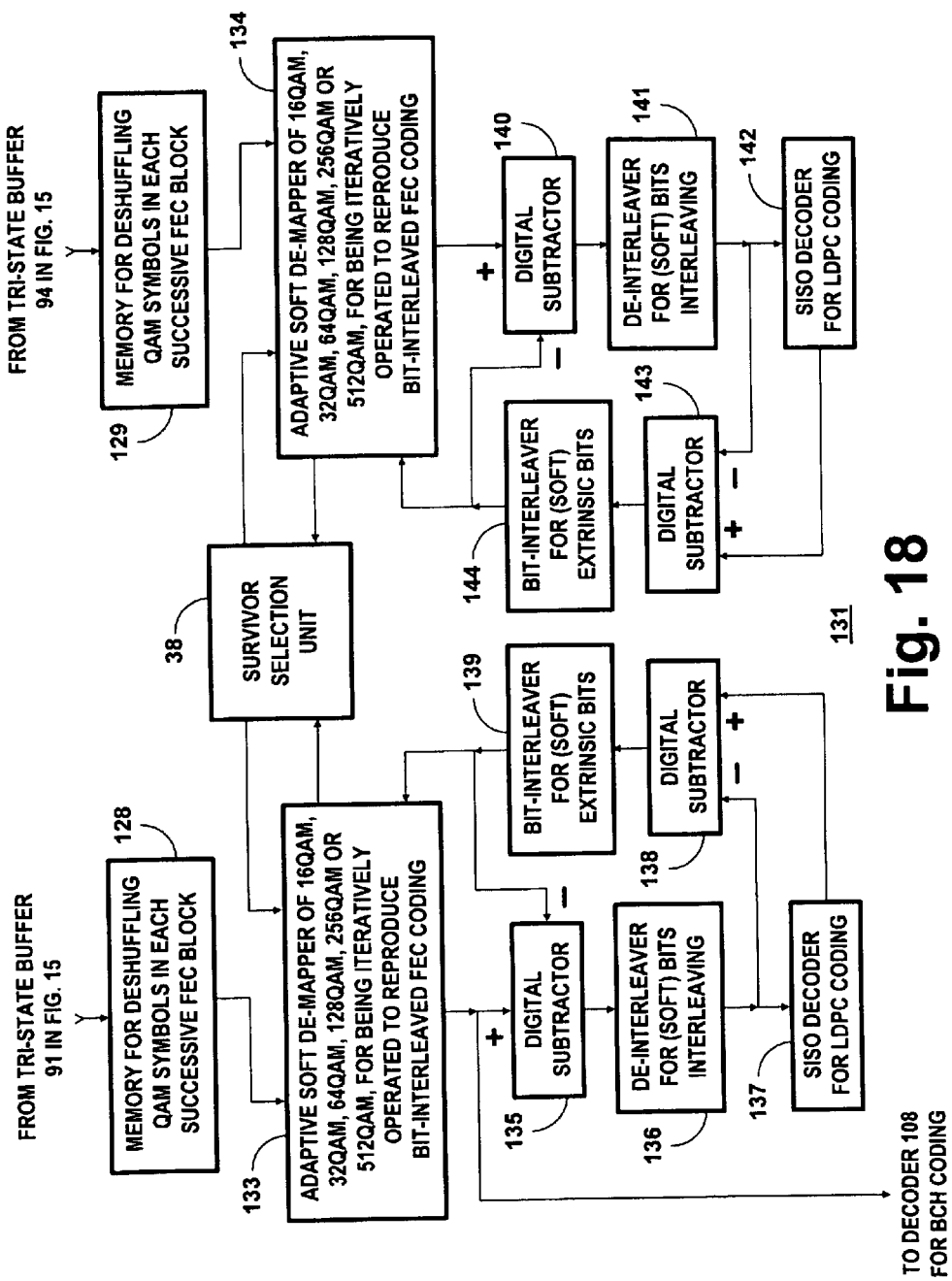
FIG. 18 is a detailed schematic diagram of a representative structure for the plural-input/single-output detector in FIG. 17.

FIG. 18 depicts a representative structure for the plural-input/single-output detector 131 in FIG. 17. FIG. 18 shows the read output port of the memory 128 for deshuffling QAM symbols in final transmissions of them connected to the input port of an adaptive soft de-mapper 133 for iterative de-mapping of successive complex coordinates of 16QAM, 32QAM, 64QAM, 128QAM, 256QAM or 512QAM symbol constellations. FIG. 18 shows the read output port of the memory 130 for deshuffling QAM symbols of the initial transmissions of them connected to the input port of an adaptive soft de-mapper 134 for iterative de-mapping of successive complex coordinates of 16QAM, 32QAM, 64QAM, 128QAM, 256QAM or 512QAM symbol constellations.

FIG. 18 shows the adaptive soft de-mapper 133 connected in a turbo loop similar to the one in which the adaptive soft de-mapper 124 is connected in FIG. 15. The digital subtractor 135, the de-interleaver 136 for interleaving of soft bits, the SISO decoder 137 for LDPC coding, the digital subtractor 138 and the bit-interleaver 139 in the FIG. 18 turbo loop connection of adaptive soft de-mapper 133 correspond to the digital subtractor 125, the de-interleaver 106 for interleaving of soft bits, the SISO decoder 107 for LDPC coding, the digital subtractor 126 and the bit-interleaver 127 respectively in the FIG. 15 turbo loop connection of adaptive soft de-mapper 124.

FIG. 18 also shows the adaptive soft de-mapper 133 connected in a turbo loop similar to the one in which the adaptive soft de-mapper 124 is connected in FIG. 15. The digital subtractor 140, the de-interleaver 141 for interleaving of soft bits, the SISO decoder 142 for LDPC coding, the digital subtractor 143 and the bit-interleaver 144 in the FIG. 18 turbo loop connection of adaptive soft de-mapper 134 correspond to the digital subtractor 125, the de-interleaver 106 for interleaving of soft bits, the SISO decoder 107 for LDPC coding, the digital subtractor 126 and the bit-interleaver 127 respectively in the FIG. 15 turbo loop connection of adaptive soft de-mapper 124.

FIG. 18 depicts a survivor selection unit 38 having a first input port connected for receiving a priori information from memory within the adaptive soft de-mapper 133 and having a second input port connected for receiving a priori information from memory within the adaptive soft de-mapper 134. The survivor selection unit 38 has a first output port connected for updating at selected times the memory within the adaptive soft de-mapper 133. The survivor selection unit 38 has a second output port connected for updating at selected times the memory within the adaptive soft de-mapper 134. The survivor selection unit 38 is dormant at the times LDPC coding is being decoded by the turbo loop connection of the adaptive soft mapper 133 and the SISO decoder 137. The survivor selection unit 38 is dormant at the times LDPC coding is being decoded by the turbo loop connection of the adaptive soft de-mapper 134 and the SISO decoder 142. Typically, LDPC coding is decoded concurrently by the two turbo loops. The LDPC coding is iterated a few times—e.g. seven times—during each successive period that the survivor selection unit 38 is dormant. Then, the survivor selection unit 38 compares the likelihood of error in each pair of correspondingly timed soft bits from the FEC coding block temporarily stored in the memory within the adaptive soft de-mapper 133 and from the FEC coding block temporarily stored in the memory within the adaptive soft de-mapper 134, respectively. If and only if the bit from the de-mapper 133 has very little likelihood of being in error, but the bit from the de-mapper 134 has a considerably greater likelihood of being in error, the survivor selection unit 38 will write over the bit temporarily stored in the de-mapper 134 memory so as to conform to the bit from the de-mapper 133. If and only if the bit from the de-mapper 134 has very little likelihood of being in error, but the bit from the de-mapper 133 has a considerably greater likelihood of being in error, the survivor selection unit 38 will write over the bit temporarily stored in the de-mapper 133 memory so as to conform to the bit from the de-mapper 134. If neither of the foregoing conditions obtains, the survivor selection unit 38 does not over-write either one of the pair of bits respectively stored in the memories of de-mappers 133 and 134. After the FEC blocks stored in the memories of de-mappers 133 and 134 have been completely scanned and selectively updated, the survivor selection unit 38 is returned to a dormant condition, and iterative decoding of LDPC coding in the turbo loops including the SISO decoders 137 and 142 is resumed.

Figure 19:
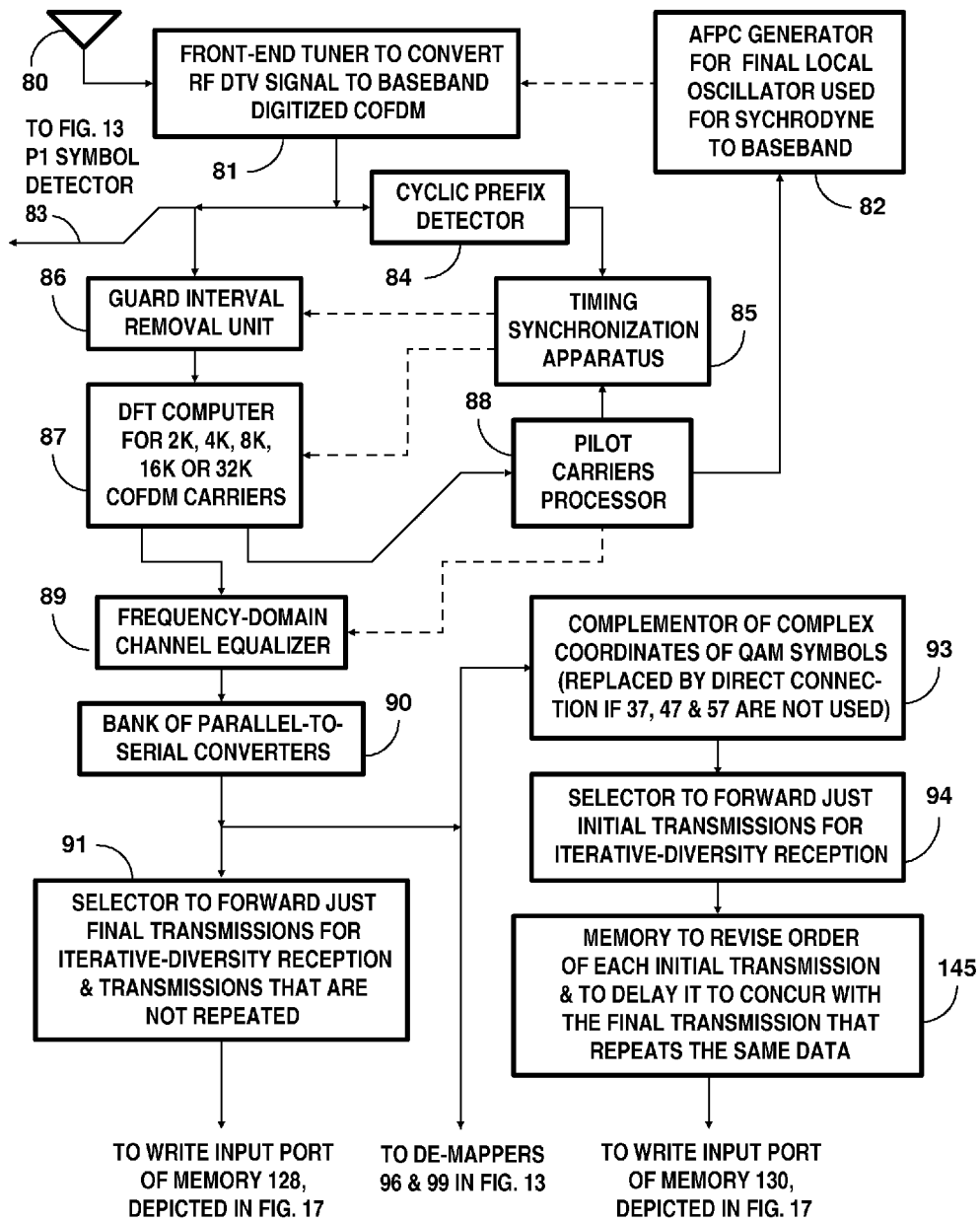
FIG. 19 is a schematic diagram of a modification of the FIG. 16 portion of the COFDM receiver apparatus further depicted in FIGS. 13 and 17, which COFDM receiver apparatus as so modified embodies further aspects of the invention.

FIG. 19 depicts a modification of the FIG. 16 portion of the COFDM receiver apparatus further depicted in FIGS. 13 and 17. In FIG. 19 as in FIG. 15, the frequency-domain channel equalizer 89 weights each of respective sets of complex coordinates for QPSK or QAM symbol constellations of respective OFDM carriers received in parallel at its input port. The channel equalizer 89 supplies the weighted responses in parallel from its output port to the respective input ports of a bank 90 of parallel-to-series converters. The output port of the bank 90 of parallel-to-series converters is connected for supplying complex QPSK or QAM symbol map coordinates to the input port of the selector 91. The selector 91 selectively reproduces at its output port complex QPSK or QAM symbol map coordinates just for transmissions that are not subsequently repeated and for transmissions repeated for iterative-diversity reception.

The bank 92 of parallel-to-series converters arranged so as in effect to de-rotate the circular DFT components computed by the DFT computer 87 is dispensed with in FIG. 19. The output port of the bank 90 of parallel-to-series converters is connected for supplying complex QPSK or QAM symbol map coordinates to the input port of a complementor 93 for those coordinates. The output port of the complementor 93 connects to the write input port of a memory 145. If the COFDM transmitter apparatus does not complement the complex coordinates of QAM symbols that are to be sent in the initial transmissions for iterative-diversity reception, but does not complement the complex coordinates of QAM symbols that are to be sent in the final transmissions, the complementor 93 is replaced by direct connection of the output port of the bank 90 of parallel-to-series converters to the write input port of a memory 145. The output port of the memory 145 connects to the memory 130 depicted in FIG. 17. The memory 145 depicted in FIG. 19 replaces the memory 129 depicted in FIG. 16, which memory 129 simply delays initial transmissions of the complex coordinates of QAM symbol constellations to concur in time with corresponding final transmissions of those complex coordinates. The memory 145 is configured to revise the order of the complex coordinates of QAM symbol constellations in initial transmissions for iterative-diversity reception and to delay them as read to the write input port of the memory 130 in FIG. 17, so as to concur in time with the complex coordinates of modulation symbol constellations in corresponding final transmissions applied to the write input port of the memory 128 in FIG. 17. That is, there is an offset between the write addressing and the read addressing of locations in memory 145 for temporarily storing those complex coordinates of modulation symbol constellations that in effect provides for de-rotating the circular DFT specifying those complex coordinates. This de-rotation is complementary to the rotation of circular DFT performed in one of the memory units 36, 46, 56 etc. in the FIG. 2 portion of the COFDM transmitter depicted in FIGS. 1-4.

Figure 20B:
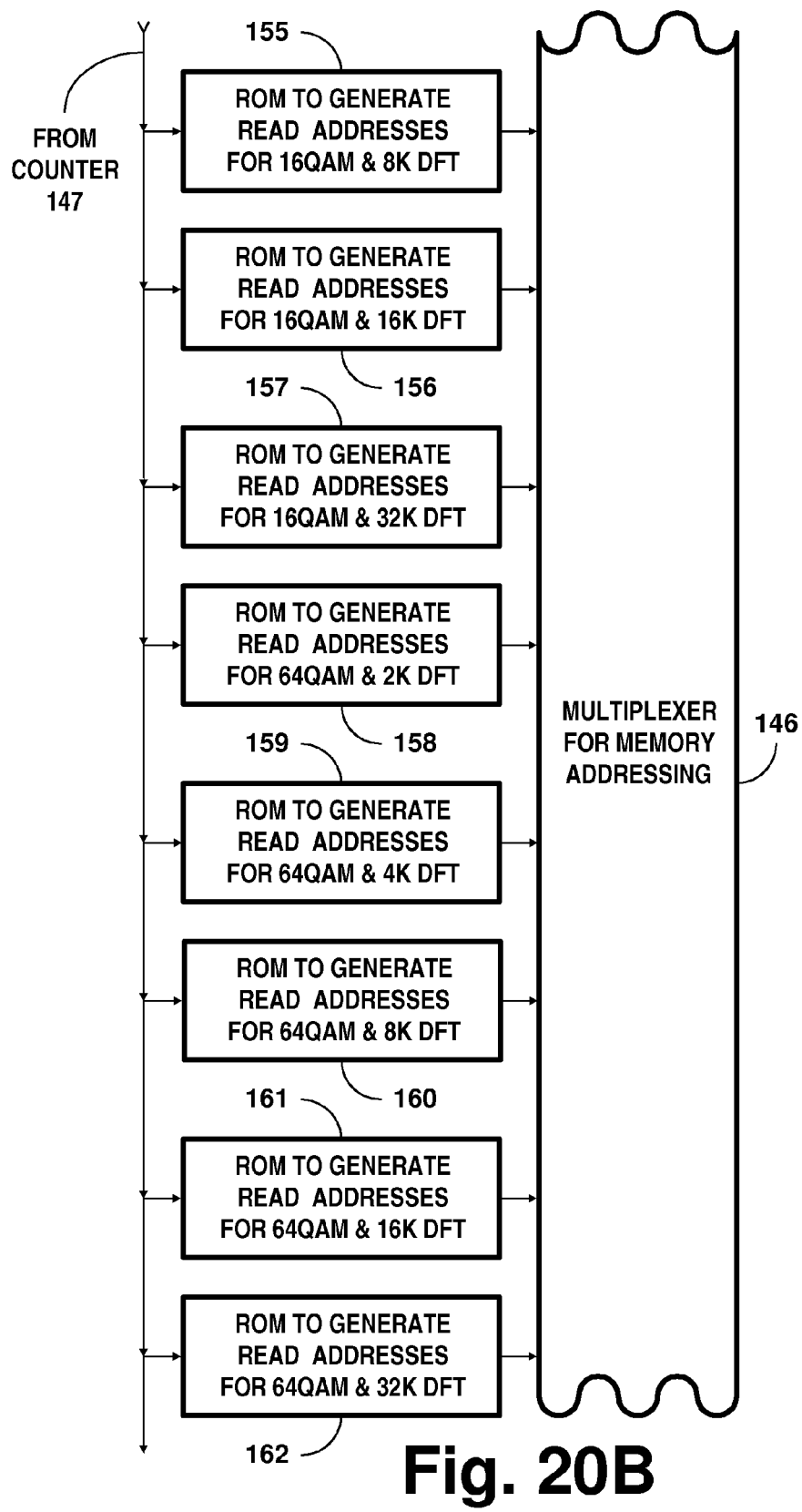
Figure 20C:
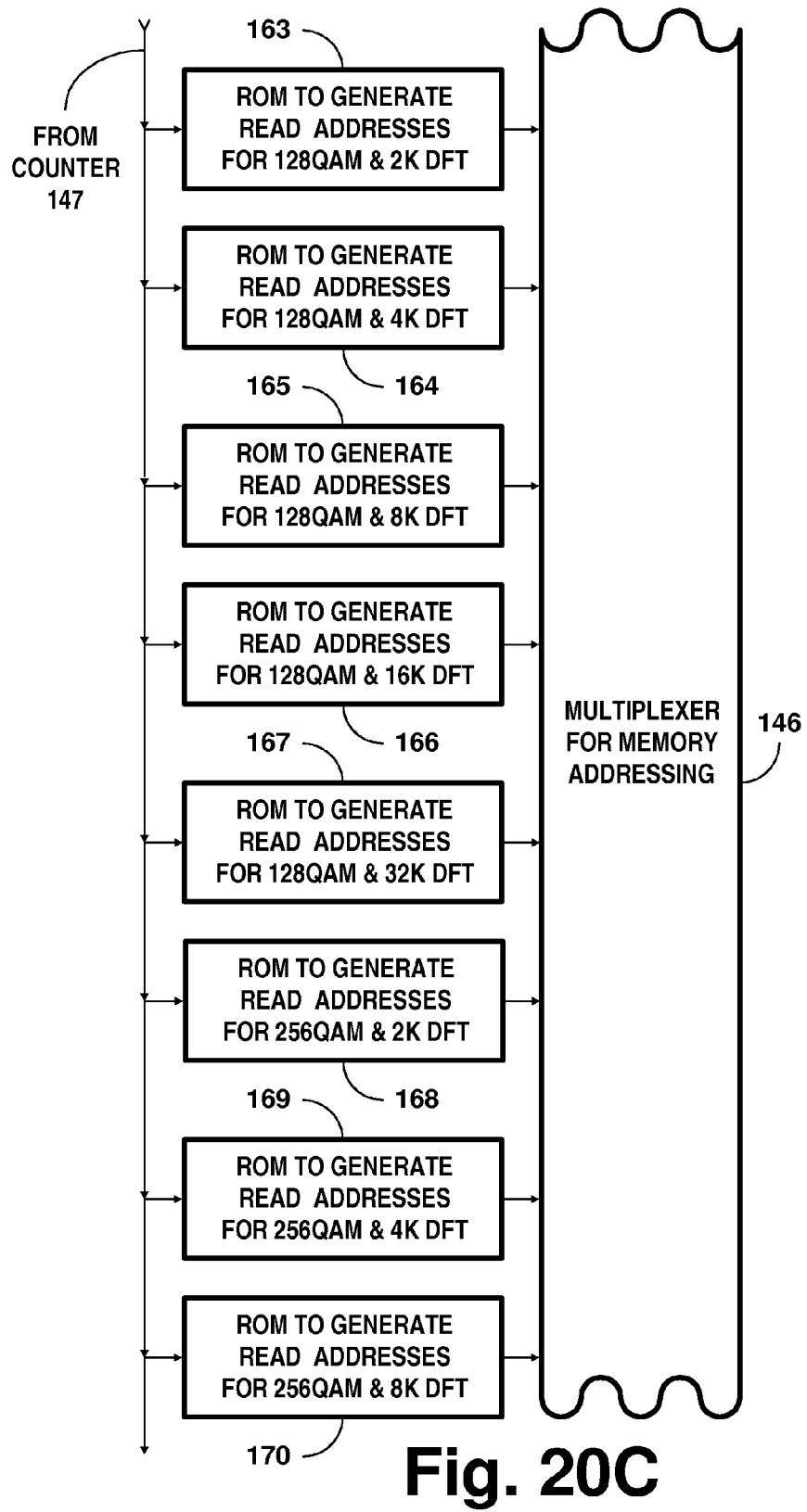
Figure 20D:
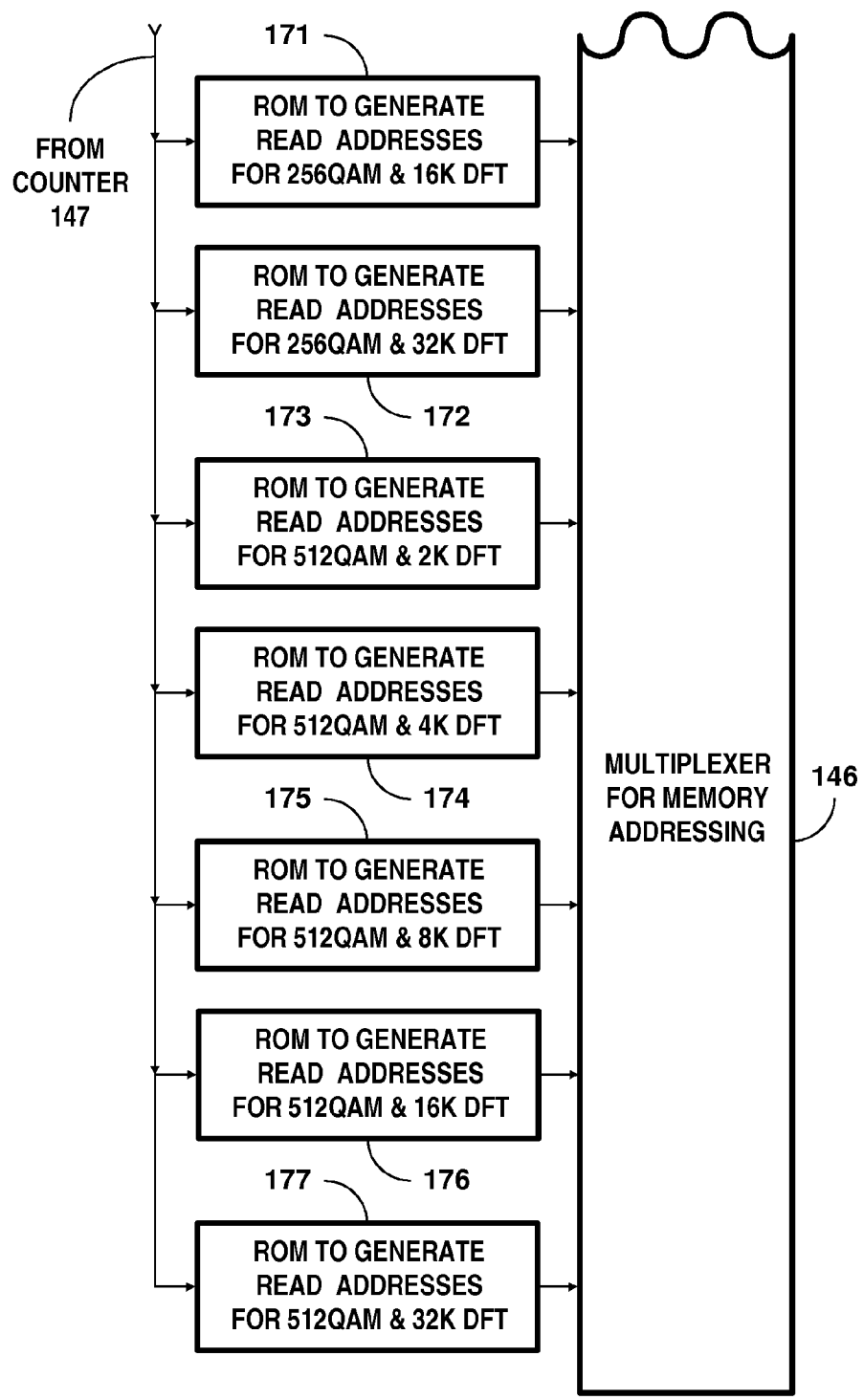
Figure 21A:
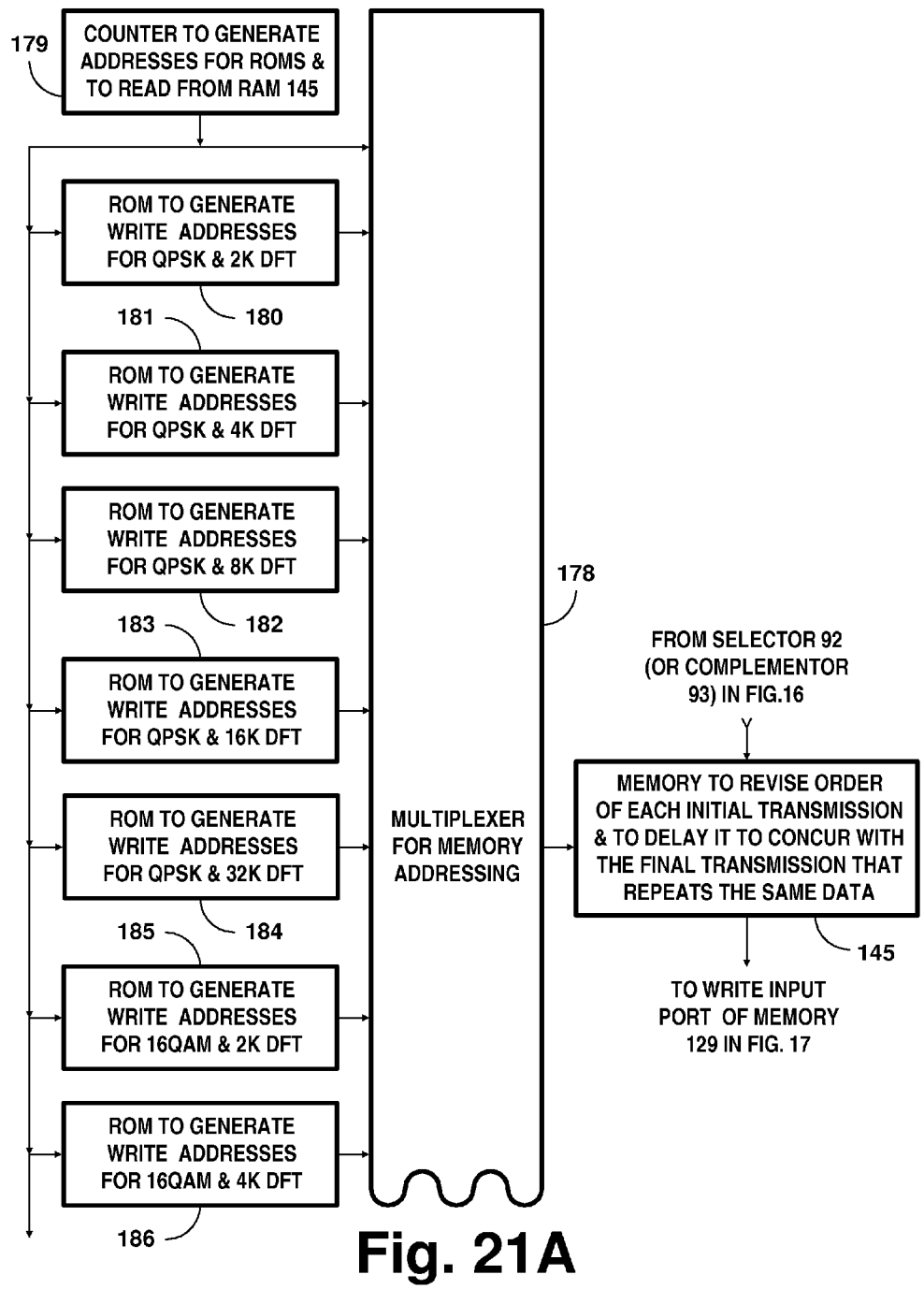
FIGS. 21A, 21B, 21C and 21D together form FIG. 20, which is a detailed schematic diagram showing an alternative arrangement for addressing memory within the FIG. 19 portion of COFDM receiver apparatus.
Figure 21B:
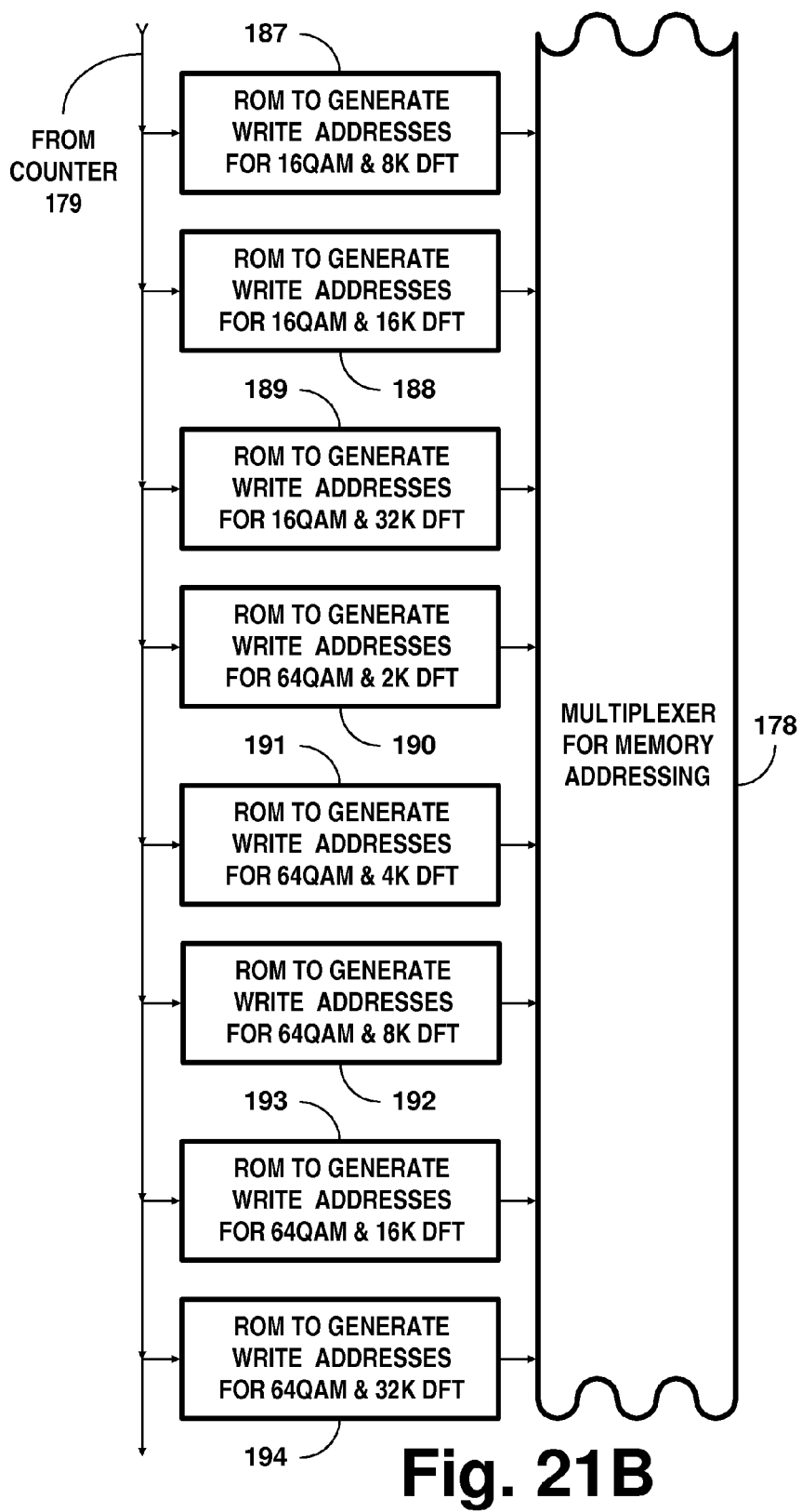
Figure 21C:
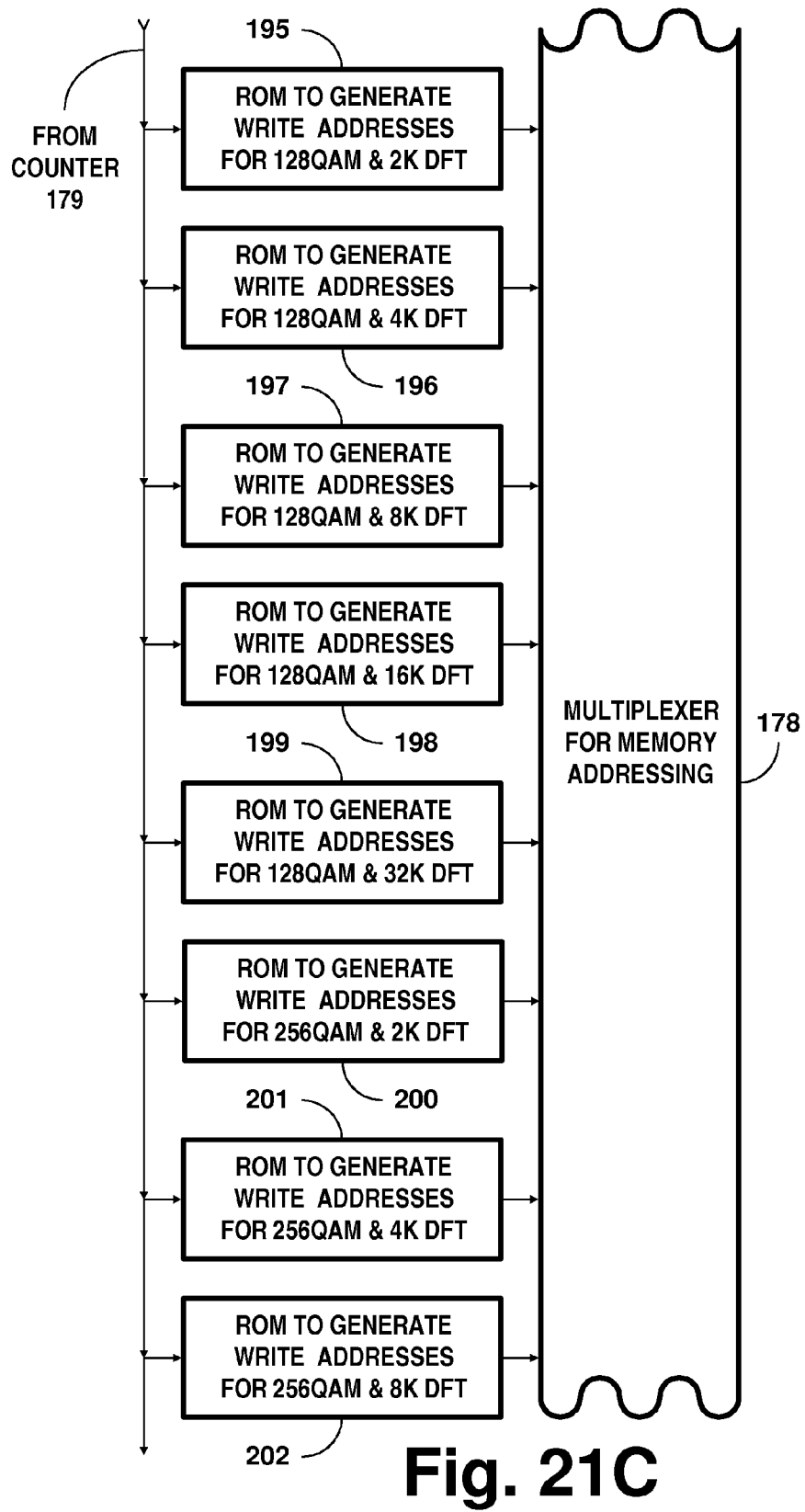
Figure 21D:
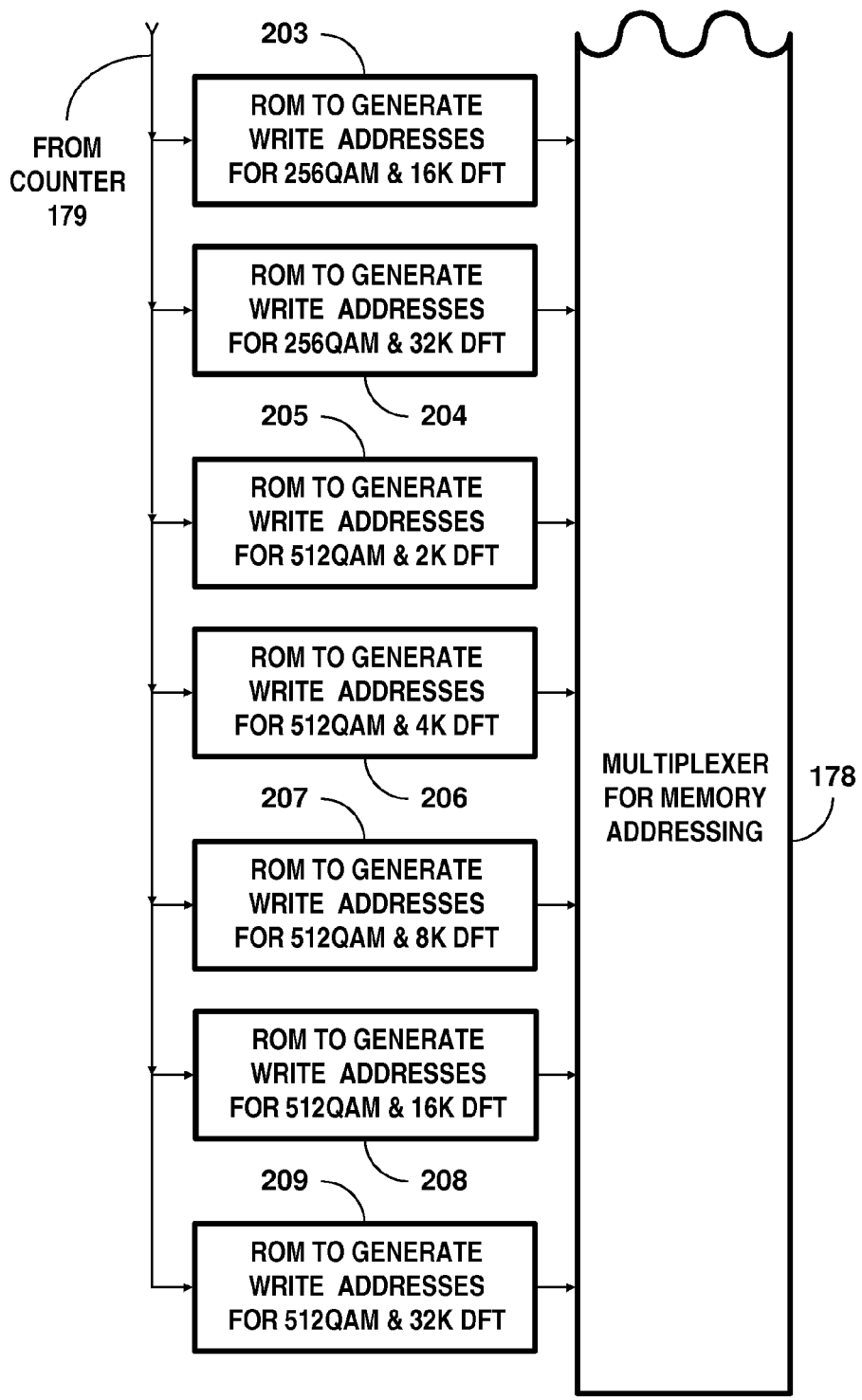
Figure 26:
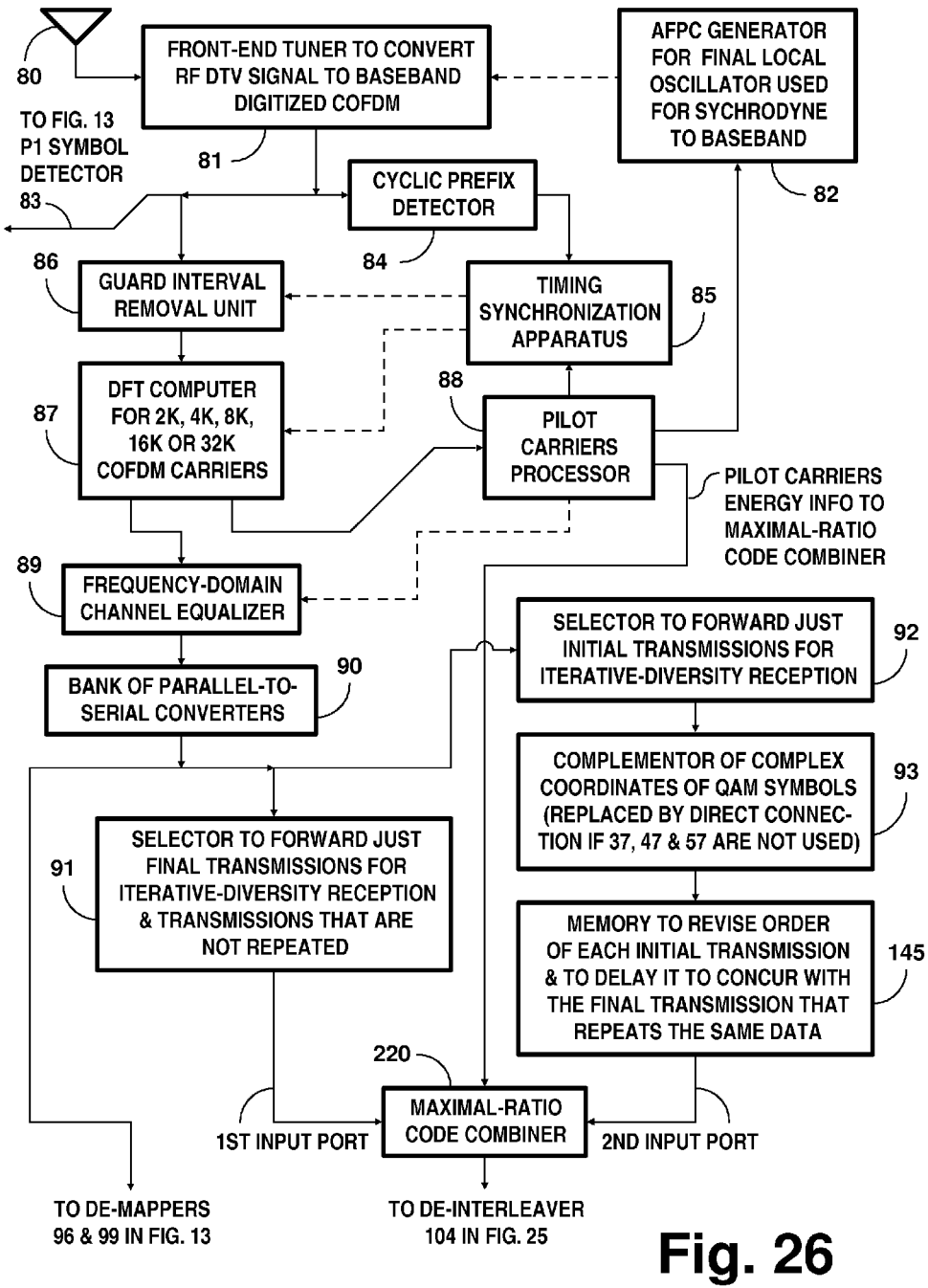
FIGS. 26, 27 and 28 are schematic diagrams of respective modifications of the FIG. 24 portion of the COFDM receiver apparatus further depicted in FIGS. 13 and 25, which COFDM receiver apparatuses as so modified embody various aspects of the invention.
Figure 28:
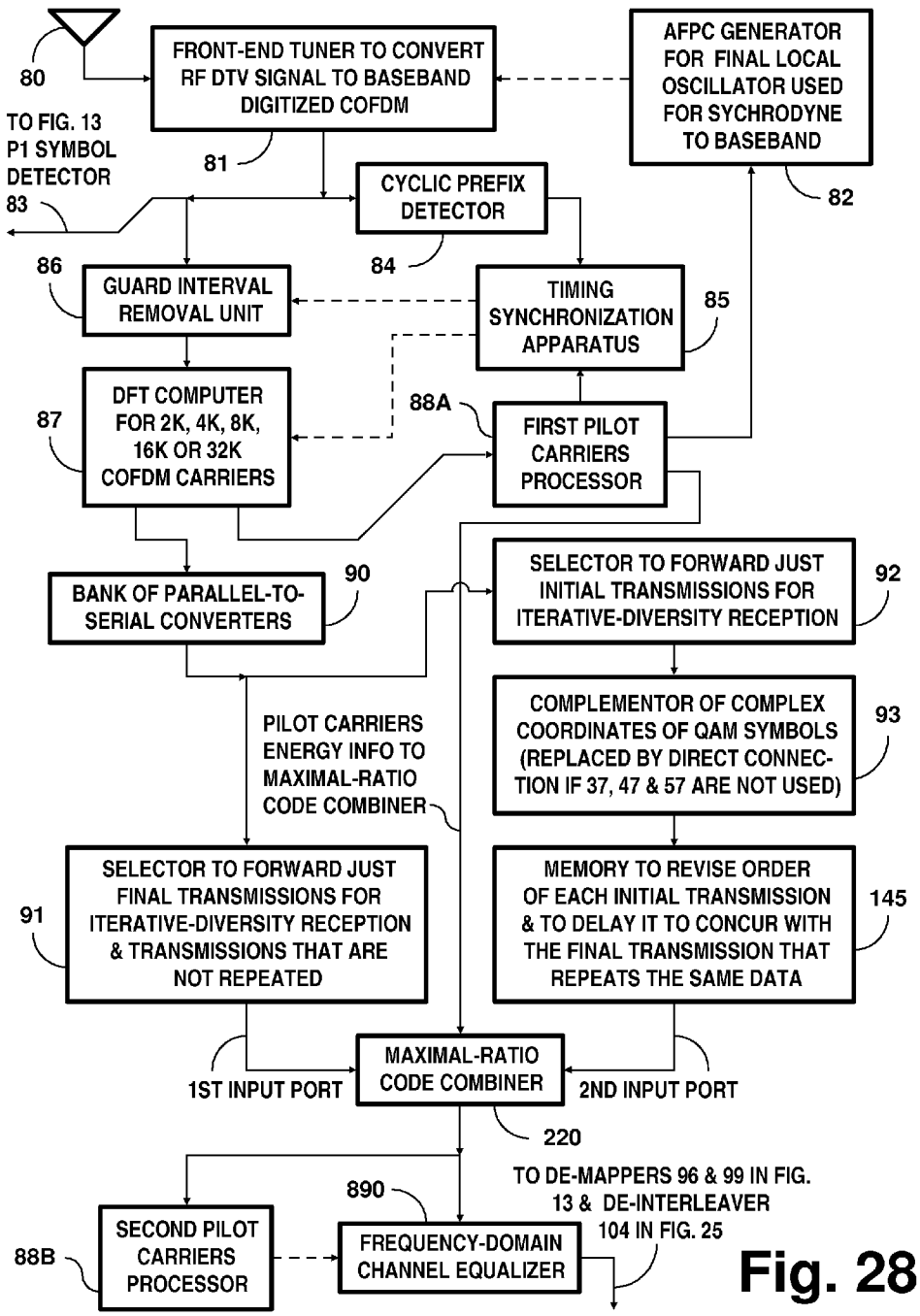

FIGS. 20A, 20B, 20C and 20D together form FIG. 20, which depicts in some detail an arrangement for addressing the memory 145 also depicted in the FIG. 19, FIG. 26 and FIG. 28 portions of COFDM receiver apparatus. The output port of a multiplexer 146 is connected for applying selected addressing to the memory 145. A counter 147 counts the bit epochs of successive complex coordinates of modulation symbols, supplying that bit count to a first input port of the multiplexer 146 to be selectively reproduced at the output port of the multiplexer 146 as write addressing for the RAM 145. The counter 147 is capable of counting all the bits in the successive COFDM symbols of any time-slice and is reset to zero count at the beginning of each time-slice. The number of bits in the successive COFDM symbols of a time-slice differs for different time-slices, depending on the size of the DFT and the type of modulation symbol constellation used in the time-slice.

The bit count from the counter 147 is further applied as input addressing to each one of a plurality of read-only memories 148-177, each of which large ROMs generates possible read addressing for the RAM 145 at its output port. The output ports of the ROMs 148-177 connect to respective ones of second through thirty-first input ports of the multiplexer 146 to be selectively reproduced at the output port of the multiplexer 146 as read addressing for the RAM 145.

The ROMs 148-152 generate read addressing for the RAM 145 when 2K, 4K, 8K, 16K and 32K OFDM carriers respectively generate DFTs and the COFDM symbols are based on QPSK modulation symbol constellations. Separate ROMs 148-151 are dispensed with in a modification of the arrangement for addressing the memory 145 depicted in FIG. 20A, the functions of the ROMs 148-151 being provided by curtailed input addressing of the ROM 152.

The ROMs 153-157 generate read addressing for the RAM 145 when 2K, 4K, 8K, 16K and 32K OFDM carriers respectively generate DFTs and the COFDM symbols are based on 16QAM modulation symbol constellations. Separate ROMs 153-156 are dispensed with in a modification of the arrangement for addressing the memory 145 depicted in FIG. 20A, the functions of the ROMs 153-156 being provided by curtailed input addressing of the ROM 157.

The ROMs 158-162 generate read addressing for the RAM 145 when 2K, 4K, 8K, 16K and 32K OFDM carriers respectively generate DFTs and the COFDM symbols are based on 64QAM modulation symbol constellations. Separate ROMs 158-161 are dispensed with in a modification of the arrangement for addressing the memory 145 depicted in FIG. 20A, the functions of the ROMs 158-161 being provided by curtailed input addressing of the ROM 162.

The ROMs 163-167 generate read addressing for the RAM 145 when 2K, 4K, 8K, 16K and 32K OFDM carriers respectively generate DFTs and the COFDM symbols are based on 128QAM modulation symbol constellations. Separate ROMs 163-166 are dispensed with in a modification of the arrangement for addressing the memory 145 depicted in FIG. 20A, the functions of the ROMs 163-166 being provided by curtailed input addressing of the ROM 167.

The ROMs 168-172 generate read addressing for the RAM 145 when 2K, 4K, 8K, 16K and 32K OFDM carriers respectively generate DFTs and the COFDM symbols are based on 256QAM modulation symbol constellations. Separate ROMs 168-171 are dispensed with in a modification of the arrangement for addressing the memory 145 depicted in FIG. 20A, the functions of the ROMs 168-171 being provided by curtailed input addressing of the ROM 172.

The ROMs 173-177 generate read addressing for the RAM 145 when 2K, 4K, 8K, 16K and 32K OFDM carriers respectively generate DFTs and the COFDM symbols are based on 512QAM modulation symbol constellations. Separate ROMs 173-176 are dispensed with in a modification of the arrangement for addressing the memory 145 depicted in FIG. 20A, the functions of the ROMs 173-176 being provided by curtailed input addressing of the ROM 177.

FIGS. 21A, 21B, 21C and 21D together form FIG. 20, which depicts in some detail an alternative arrangement for addressing the memory 145 depicted in the FIG. 19, FIG. 26 and FIG. 28 portions of COFDM receiver apparatus. The output port of a multiplexer 178 is connected for applying selected addressing to the memory 145. A counter 179 counts the bit epochs of successive complex coordinates of modulation symbols, supplying that bit count to a first input port of the multiplexer 178 to be selectively reproduced at the output port of the multiplexer 178 as read addressing for the RAM 145. The counter 179 is capable of counting all the bits in the successive COFDM symbols of any time-slice and is reset to zero count at the beginning of each time-slice. The number of bits in the successive COFDM symbols of a time-slice differs for different time-slices, depending on the size of the DFT and the type of modulation symbol constellation used in the time-slice.

The bit count from the counter 179 is further applied as input addressing to each one of a plurality of read-only memories 180-209, each of which large ROMs generates possible write addressing for the RAM 212 at its output port. The output ports of the ROMs 180-209 connect to respective ones of second through thirty-first input ports of the multiplexer 178 to be selectively reproduced at the output port of the multiplexer 178 as write addressing for the RAM 145.

The ROMs 180-184 generate write addressing for the RAM 145 when 2K, 4K, 8K, 16K and 32K OFDM carriers respectively generate DFTs and the COFDM symbols are based on QPSK modulation symbol constellations. Separate ROMs 180-183 are dispensed with in a modification of the arrangement for addressing the memory 145 depicted in FIG. 21A, the functions of the ROMs 180-183 being provided by curtailed input addressing of the ROM 184.

The ROMs 185-189 generate write addressing for the RAM 145 when 2K, 4K, 8K, 16K and 32K OFDM carriers respectively generate DFTs and the COFDM symbols are based on 16QAM modulation symbol constellations. Separate ROMs 185-188 are dispensed with in a modification of the arrangement for addressing the memory 145 depicted in FIG. 21A, the functions of the ROMs 185-188 being provided by curtailed input addressing of the ROM 189.

The ROMs 190-194 generate write addressing for the RAM 145 when 2K, 4K, 8K, 16K and 32K OFDM carriers respectively generate DFTs and the COFDM symbols are based on 64QAM modulation symbol constellations. Separate ROMs 190-193 are dispensed with in a modification of the arrangement for addressing the memory 145 depicted in FIG. 21A, the functions of the ROMs 190-193 being provided by curtailed input addressing of the ROM 194.

The ROMs 195-199 generate write addressing for the RAM 145 when 2K, 4K, 8K, 16K and 32K OFDM carriers respectively generate DFTs and the COFDM symbols are based on 128QAM modulation symbol constellations. Separate ROMs 195-198 are dispensed with in a modification of the arrangement for addressing the memory 145 depicted in FIG. 21A, the functions of the ROMs 195-198 being provided by curtailed input addressing of the ROM 199.

The ROMs 200-204 generate write addressing for the RAM 145 when 2K, 4K, 8K, 16K and 32K OFDM carriers respectively generate DFTs and the COFDM symbols are based on 256QAM modulation symbol constellations. Separate ROMs 200-203 are dispensed with in a modification of the arrangement for addressing the memory 145 depicted in FIG. 21A, the functions of the ROMs 200-203 being provided by curtailed input addressing of the ROM 204.

The ROMs 205-209 generate write addressing for the RAM 145 when 2K, 4K, 8K, 16K and 32K OFDM carriers respectively generate DFTs and the COFDM symbols are based on 512QAM modulation symbol constellations. Separate ROMs 205-208 are dispensed with in a modification of the arrangement for addressing the memory 145 depicted in FIG. 21A, the functions of the ROMs 205-208 being provided by curtailed input addressing of the ROM 209.

Figure 22:
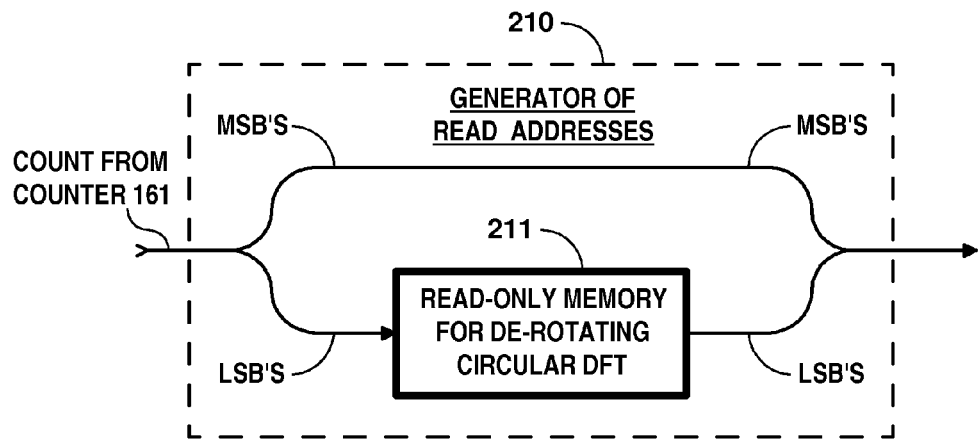
FIG. 22 is a schematic diagram of a respective form that is taken by replacements for read-only memories used as read address generators within the portions of COFDM receiver apparatus depicted in 20A, 20B, 20C and 20D.

FIG. 22 is a schematic diagram of a structure 210 for each one of respective replacements for read-only memories 148-177 used as read address generators within the portions of COFDM receiver apparatus depicted in FIGS. 20A, 20B, 20C and 20D. The less significant bits of the count from the counter 147 that describe RAM 145 addressing for each successive COFDM symbol with rotated circular DFT are applied as input addressing to a read-only memory 211 within this structure 210. The ROM 211 responds to its input addressing to generate revised less significant bits descriptive of each successive COFDM symbol with one-half revolution de-rotation of its circular DFT. The more significant bits of the count from the counter 147 that specify the position of each successive COFDM symbol in their serial ordering bypass the ROM 211 to be joined with the revised less significant bits from the output port of the ROM 211 to generate read addresses for the RAM 145 that condition the RAM 145 for reading from its output port successive COFDM symbols with non-rotated circular DFTs. The ROM 211 in any structure 210 is many times smaller than the one of the ROMs 148-177 replaced by that structure 210. A preferred arrangement for addressing the RAM 145 is a modification of the FIG. 20 arrangement that dispenses with the ROMs 148-151, the ROMs 153-156, the ROMs 158-161, the ROMs 163-166, the ROMs 168-171 and the ROMs 173-176 and that replaces the ROMs 152, 157, 162, 167, 145 and 177 with respective read-address generators each having structure 210 as depicted in FIG. 22.

Figure 23:
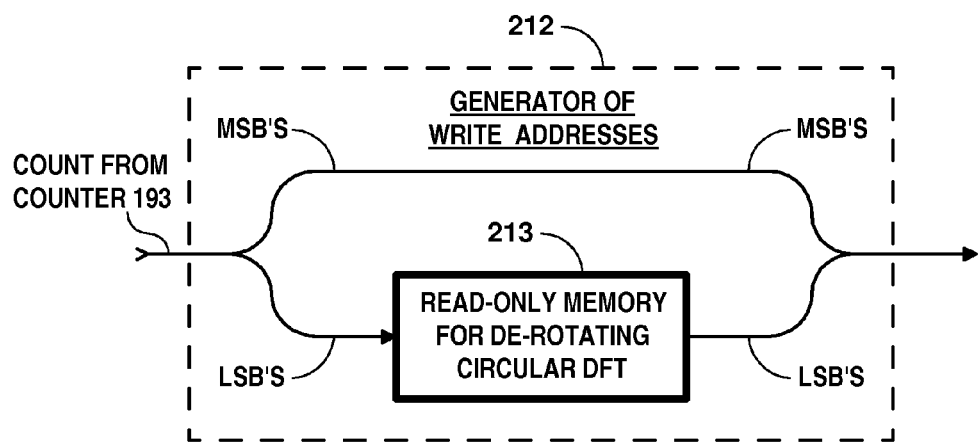
FIG. 23 is a schematic diagram of a respective form that is taken by replacements for read-only memories used as write address generators within the portions of COFDM receiver apparatus depicted in FIGS. 21A, 21B, 21C and 21D.

FIG. 23 is a schematic diagram of a structure 212 for each one of respective replacements for read-only memories 180-209 used as write address generators within the portions of COFDM receiver apparatus depicted in FIGS. 21A, 21B, 21C and 21D. The less significant bits of the count from the counter 179 that describe RAM 145 addressing for each successive COFDM symbol with non-rotated circular DFT are applied as input addressing to a read-only memory 213 within this structure 212. The ROM 213 responds to its input addressing to generate revised less significant bits descriptive of each successive COFDM symbol with one-half revolution de-rotation of its circular DFT. The more significant bits of the count from the counter 179 that specify the position of each successive COFDM symbol in their serial ordering bypass the ROM 213 to be joined with the revised less significant bits from the output port of the ROM 213 to generate write addresses for the RAM 145 that condition the RAM 145 for temporarily storing successive COFDM symbols written thereto with no rotation of their circular DFTs. Subsequent reading from the ROM 145 using the count from the counter 179 as read addressing will supply a stream of COFDM symbols without rotation of their circular DFTs, suitable for code-combining with a stream of COFDM symbols supplied from the output port of the selector. The ROM 213 in any structure 212 is many times smaller than the one of the ROMs 180-209 replaced by that structure 212. A preferred arrangement for addressing the RAM 145 is a modification of the FIG. 21 arrangement that dispenses with the ROMs 180-183, the ROMs 185-188, the ROMs 190-193, the ROMs 195-198, the ROMs 200-203 and the ROMs 205-209 and that replaces the ROMs 184, 189, 194, 199, 204 and 209 with respective write-address generators each having structure 212 as depicted in FIG. 23.

Figure 24:
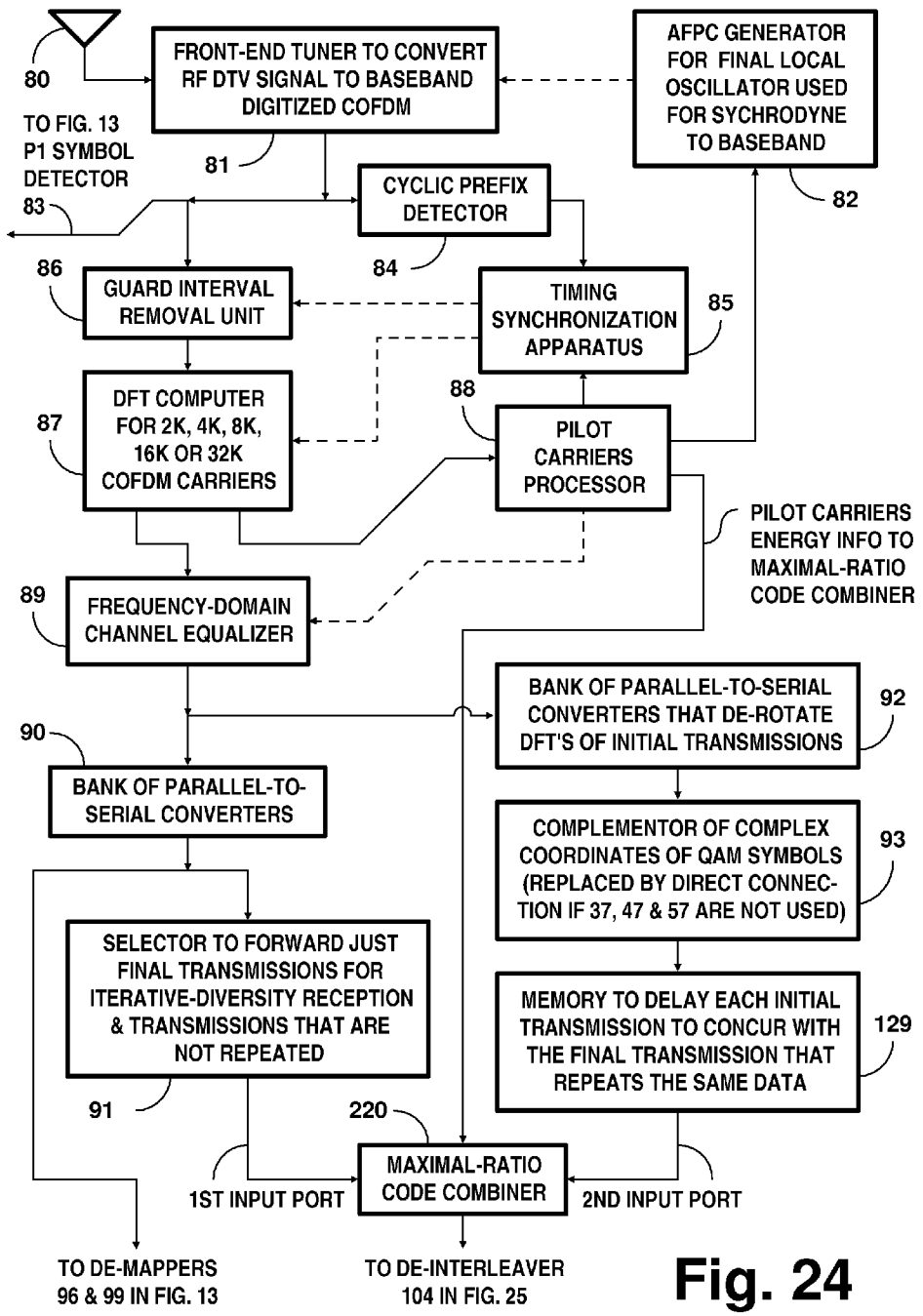
FIGS. 24 and 25 together with FIG. 13 form a schematic diagram of COFDM receiver apparatus configured for iterative-diversity reception of COFDM signals, which receiver apparatus embodies aspects of the invention and employs maximal-ratio code combining of LDPC coding that is transmitted twofold.

FIGS. 24 and 25 together with FIG. 13 show another COFDM receiver apparatus. It employs maximal-ratio code combining of LDPC coding that is transmitted twofold. Elements 80-82, 84-93 in FIG. 24 are similar in construction and interconnection to the similarly numbered elements shown in FIG. 12 and in FIG. 16, except for the following differences.

Figure 29:
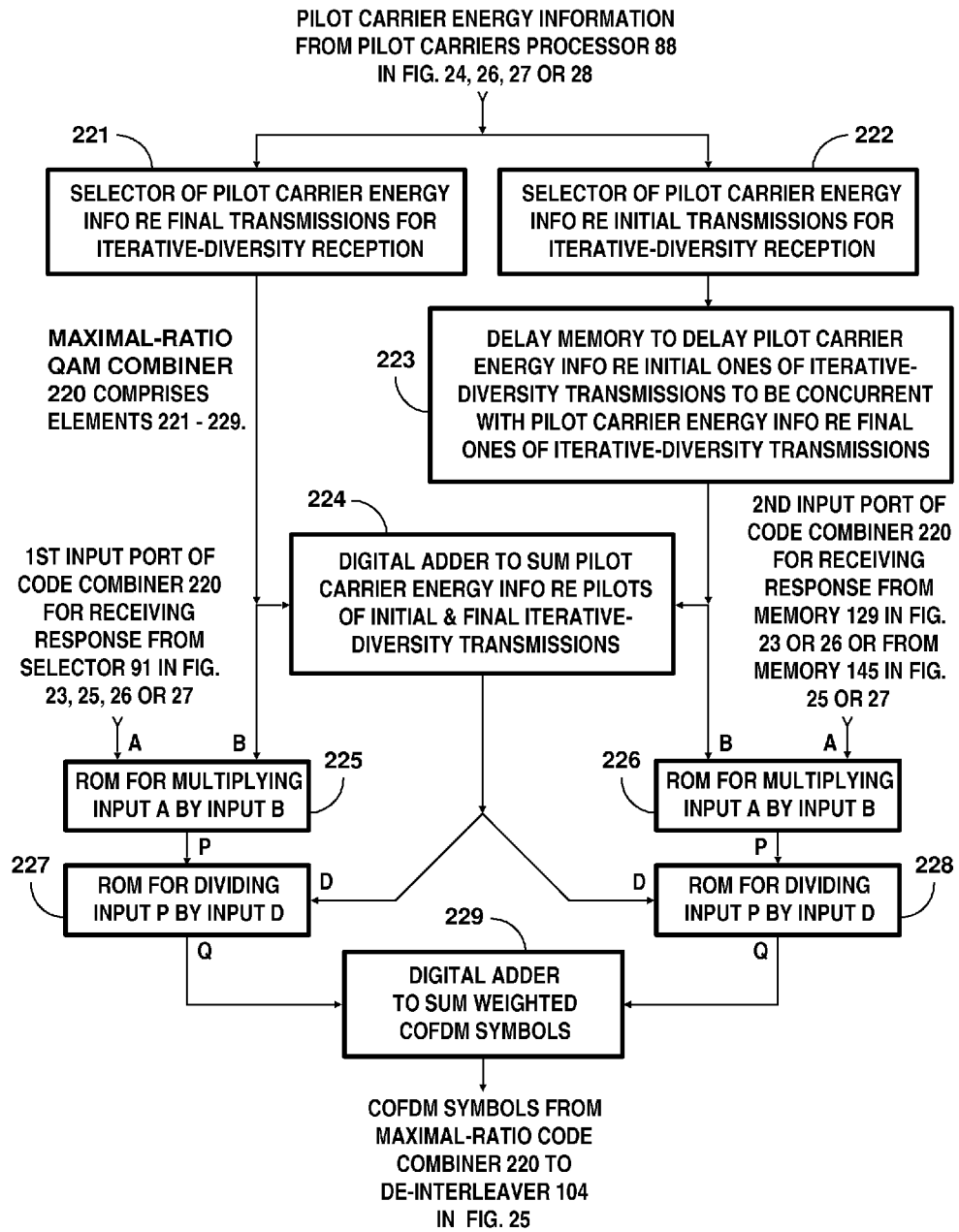
FIG. 29 is a detailed schematic diagram of the maximal-ratio code combiner depicted in FIG. 24, FIG. 26, FIG. 27 and FIG. 28 portions of COFDM receiver apparatuses.
Figure 30:
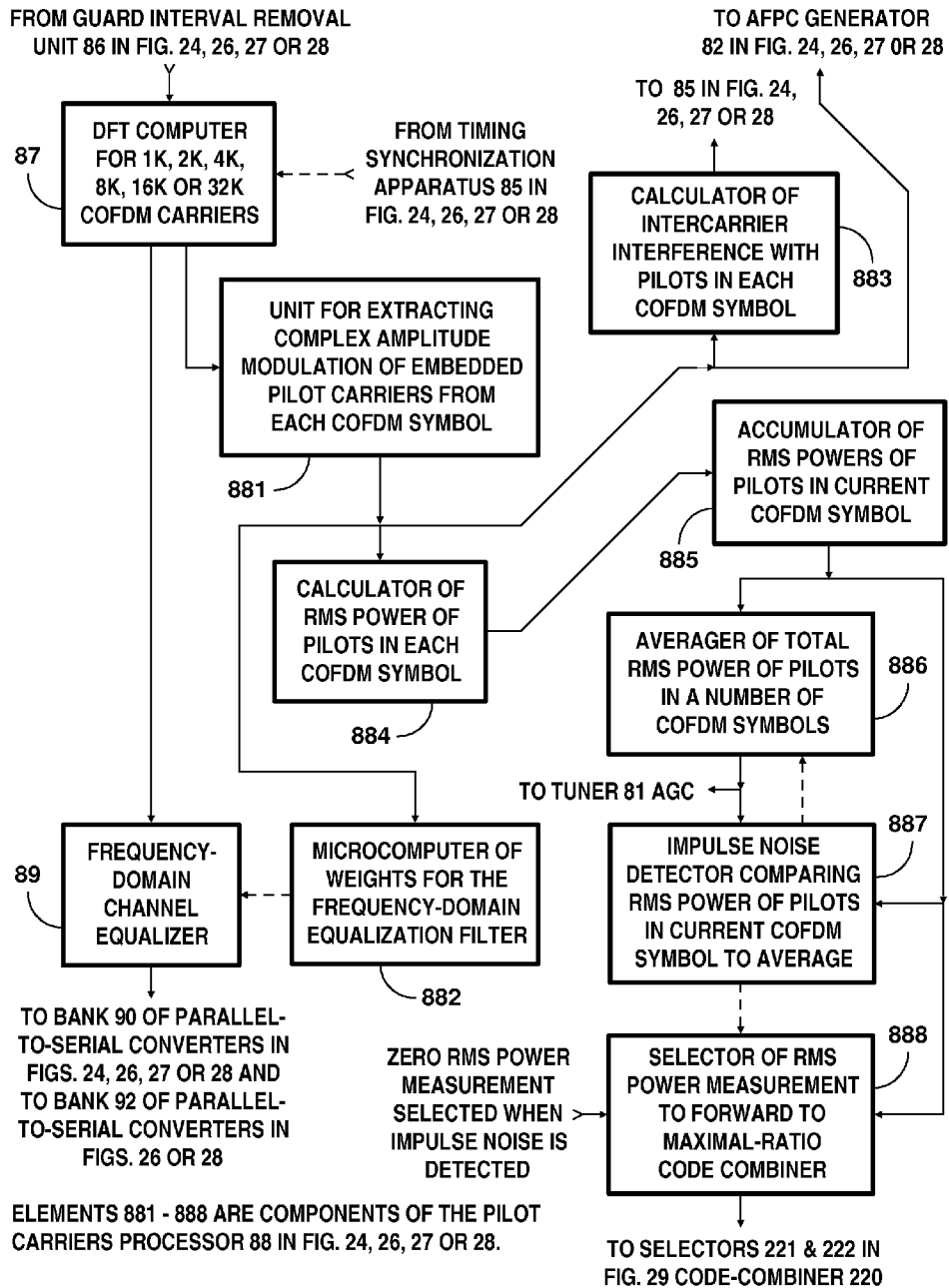
FIG. 30 is a detailed schematic diagram of portions of the pilot carriers processor as shown in FIG. 24, FIG. 26, FIG. 27 or FIG. 28, which portions generate measurements of the total RMS power of pilot carriers for controlling the maximal-ratio code combiner also depicted in that figure of the drawing.

A fourth output port of the pilot carriers processor 88 is explicitly shown in FIG. 24 as being connected to supply information concerning the respective energies of unmodulated pilot carriers to a maximal-ratio code combiner 220 shown at the foot of FIG. 24 and in more detail in FIG. 29. The code combiner 220 is more fully described further on in this specification with reference to drawing FIG. 29, which shows that the code combiner 220 comprises elements 221, 222, 223, 224, 225, 226, 227, 228 and 229. The portions of the pilot carriers processor 88 for generating information concerning the respective energies of unmodulated pilot carriers are shown in FIG. 30 and are described in more detail further on in this specification.

The FIG. 24 portion of DTV receiver apparatus does not include the selector 94 shown in FIG. 12. In FIG. 24 the response of the bank 90 of parallel-to-series converters is supplied to the input port of a selector 91 of transmissions that are not repeated and of the final transmissions that have been retransmitted to support iterative-diversity reception. In FIG. 24, as in FIGS. 12 and 16, the response of the bank 90 of parallel-to-series converters is supplied directly to a de-mapper 96 of FEC-coded L1-pre signaling and to a de-mapper 99 of FEC-coded L1-post signaling, which elements are depicted in FIG. 13. The selector 91 selectively reproduces at its output port complex QPSK, 16QAM, 32QAM, 64QAM, 128QAM, 256QAM or 512QAM symbol map coordinates just for selected ones of those transmissions that are not repeated or for selected final ones of those transmissions that are repeated for iterative-diversity reception. The output port of the selector 91 is connected to a first of two input ports of the maximal-ratio code combiner 220.

In FIG. 24 the output port of the complementor 93 connects to the write-input port of a memory 129 that is conditioned to be written just with the complex QPSK or QAM symbol map coordinates conveyed by the initial transmissions for diversity reception. If the transmitter apparatus is not modified per FIG. 8, the complementor 93 is omitted, being replaced by a direct connection from the output port of the bank 92 of parallel-to-series converters to the write-input port of the memory 129, to be written just with the complex QPSK or QAM symbol map coordinates in the initial transmissions for diversity reception. The memory 129 is configured to be read so as to delay the complex QPSK or QAM symbol map coordinates conveyed by the initial transmissions for diversity reception that the memory 129 temporarily stores. Preferably, the delay is for an odd number of COFDM symbol intervals. This facilitates the memory 129 temporarily storing just the alternate COFDM symbols conveying initial transmissions of data, being written with alternate COFDM symbols during odd COFDM symbol intervals and being read from during even COFDM symbol intervals. The delay introduced by the memory 129 can be prescribed fixed delay or, alternatively, can be programmable responsive to delay specified by bits in L1-pre signaling. Were it not for corruption caused by noise and fading, the QPSK or QAM symbol map coordinates read from the memory 129 to the second input port of the code combiner 220 would concur with the QPSK or QAM symbol map coordinates supplied by the selector 91 to the first input port of the code combiner 220.

The memory 129 simply provides delay and is not used for de-rotating components from rotated circular DFT. So, supposing the memory 129 is a random-access memory, its read addressing can be generated simply by adding a constant offset to its write addressing, which is generally provided from a counter with one or more of ZEROes prepended to the count. That is, the addressing of a random-access memory 129 as configured for FIG. 24 is simpler to provide than is the addressing of a random-access memory configured not only to delay the COFDM symbols of initial transmissions of the DTV data but also to de-rotate them, as required of the memory 145 depicted in FIG. 19, in FIG. 27 and in FIG. 28. The delay afforded by the memory 129 is such that complex QPSK or QAM symbol map coordinates conveyed by the initial transmissions for diversity reception, as read from the memory 129 to the second input port of the code combiner 220 concur temporally with corresponding complex QPSK or QAM symbol map coordinates conveyed by the final transmissions for diversity reception, as selected by the selector 91 for application to the first input port of the code combiner 220.

The maximal-ratio code combiner 220 combines symbol-map coordinates of delayed QPSK or QAM constellations from earlier transmissions of time-slices with symbol-map coordinates of QPSK or QAM constellations from later transmissions of the same time-slices. The combining is done in ratio determined by the relative root-mean-square (RMS) energies of the unmodulated pilot carriers that respectively accompany the earlier transmissions of the QPSK or QAM constellations and the later transmissions of the same constellations. The output port of the code combiner 220 is connected for supplying complex coordinates of QPSK or QAM symbol constellations to a de-interleaver 104 for counteracting the interleaving of those constellations within FEC blocks, which de-interleaver 104 is depicted in FIG. 25. The maximal-ratio code combiner 220 differs from the ordinary maximal-ratio code-combiner used to combine coding recovered from separate receivers of COFDM signals. An ordinary maximal-ratio code-combiner combines one-dimensional, real-only codes obtained from separately de-mapping paired QAM constellation maps. The maximal-ratio code combiner 220 is a special type of code-combiner, which combines the two-dimensional complex symbol-map coordinates of paired QPSK or QAM constellation maps to synthesize respective single QPSK or QAM constellation maps for de-mapping. When both the earlier transmissions of the QPSK or QAM constellations and the later transmissions of the same constellations are received in strength, the maximal-ratio combining of the two-dimensional coordinates of paired QPSK or QAM constellation maps permits improvement of coordinates estimation in the presence of additive white Gaussian noise (AWGN). This is because the coordinates of the paired QPSK or QAM constellation maps should be correlated, while the AWGN is uncorrelated. Accordingly, errors in de-mapping are less likely to occur, as well as gaps in reception tending to be filled. Maximal-ratio code combining after de-mapping QAM symbol constellations tends to fill gaps in reception, but does not improve coordinates estimation of the paired QAM constellation maps in the presence of AWGN. FIG. 29 described further on in this specification depicts the maximal-ratio code combiner 220 in more detail, as comprising elements 221-229.

FIG. 25 depicts a de-interleaver 104 for deshuffling the QAM constellations shuffled by the interleavers 35, 45, 55 etc. in the FIG. 2 portion of a DTV transmitter. The controller 95 of decoding operations depicted in FIG. 13 supplies the de-interleaver 104 instructions as to how to parse the successive complex coordinates of 16QAM, 32QAM, 64QAM, 128QAM, 256QAM or 512QAM symbol constellations supplied to its input port from the output port of the maximal-ratio code combiner 220 shown in FIG. 24. E.g., the controller 95 generates these instructions responsive to the contents of the 3-bit PLP_MOD field in the L1-post signaling prescribed in the DVB-T2 standard. Performing de-shuffling of QAM symbol constellations prior to the de-mapper 105 can be done without regard to the size of the QAM symbol constellations and so is preferred over the alternative of de-shuffling data sequences in de-mapping results. De-shuffling data sequences in de-mapping results is complicated by the need for performing the de-shuffling differently for each size of QAM symbol constellations. Furthermore, de-shuffling data sequences in de-mapping results introduces further complication in iterative decoding procedures in which soft results of decoding LDPC coding from the decoder 107 are bit-interleaved and fed back to the de-mapper 105, a procedure not specifically illustrated in FIG. 25.

FIG. 25 further depicts a de-mapper 105 for successive complex coordinates of 16QAM, 32QAM, 64QAM, 128QAM, 256QAM or 512QAM symbol constellations as supplied to its input port from the output port of the de-interleaver 104. Responsive to the contents of the 3-bit PLP-_MOD field in the L1-post signaling prescribed in the DVB-T2 standard, the controller 95 of decoding operations activates an appropriate section of the de-mapper 105 when L1-post signaling and any extension thereof are determined to have been completed. The de-mapper 105 responds to the complex QAM coordinates descriptive of successive 16QAM symbol constellations to recover four soft bits of FEC coding from each constellation. Alternatively, the de-mapper 105 responds to the soft complex QAM coordinates descriptive of successive 32QAM symbol constellations to recover five soft bits of FEC coding from each constellation. Alternatively, the de-mapper 105 responds to the soft complex QAM coordinates descriptive of successive 64QAM symbol constellations to recover six soft bits of FEC coding from each constellation. Alternatively, the de-mapper 105 responds to the soft complex QAM coordinates descriptive of successive 128QAM symbol constellations to recover seven soft bits of FEC coding from each constellation, to the soft complex QAM coordinates descriptive of successive 256QAM symbol constellations to recover eight soft bits of FEC coding from each constellation, or to the soft complex QAM coordinates descriptive of successive 512QAM symbol constellations to recover nine soft bits of FEC coding from each constellation. In any one of these six cases, the de-mapper 105 supplies the soft bits of FEC coding from its output port to the input port of a de-interleaver 106 of the interleaving of those soft bits, introduced by the bit interleavers 33, 43, 53 etc. in the FIG. 2 or FIG. 7 portion of the DTV transmitter. The output port of the de-interleaver 106 connects to the input port of a soft-input/soft-output decoder 107 for decoding LDPC coding. The output port of the SISO decoder 107 is connected for supplying soft bits of BCH coding to the input port of a decoder 108 for decoding BCH coding. In practice, the de-mapper 105 is apt to be replaced by a soft de-mapper 124 in turbo connection with the SISO decoder 107, as described in detail supra with reference to FIG. 15. Preferably, the decoder 105 responds to soft bits in the SISO decoder 107 response, to gain more information for bit-error correction than available from just hard bits in the SISO decoder 107 response.

FIG. 25 shows the output port of the BCH decoder 108 connected to the input port of a baseband-frame (BBFRAME) descrambler 109, the output port of which connects to the input port of an IP packet parser 214. The IP packet parser 214 locates the start of the first IP packet that begins in a BBFRAME responsive to indications in the BBFRAME header and then locates the start of any further IP packet that begins in the same BBFRAME by daisy-chaining from indications in the header of the immediately preceding IP packet. Also, daisy-chaining from indications in the header of the immediately preceding IP packet can be used to verify the location of the start of the first IP packet that begins in a BBFRAME.

FIG. 25 shows the output port of the IP packet parser 214 connected to supply IP packets to the input port of a packet sorter 120 for sorting them according to their packet identification sequences (PIDs). FIG. 25 shows a first output port of the IP packet sorter 120 connected for supplying video data packets to the input port of apparatus 121 for utilizing video data packets, which apparatus typically includes a video-data-packet decoder at the outset thereof. FIG. 25 shows a second output port of the IP packet sorter 120 connected for supplying audio data packets to the input port of apparatus 122 for utilizing audio data packets, which apparatus typically includes an audio-data-packet decoder at the outset thereof. FIG. 25 shows a third output port of the IP packet sorter 120 connected for supplying ancillary data packets to the input port of apparatus 123 for utilizing ancillary data packets, which apparatus typically includes an ancillary-data-packet decoder at the outset thereof. In practice, the packet sorter 120 is likely to be subsumed within respective packet-selection input circuitry of the apparatus 121 for utilizing video data packets, of the apparatus 122 for utilizing audio data packets and of the apparatus 123 for utilizing ancillary data packets.

The IP packets supplied from the IP packet parser 214 include CRC-8 coding in their headers. This CRC-8 coding could be decoded before the IP packets are sorted according to their PIDs, thus to determine whether or not each IP packet reproduced at the output port of the IP packet parser 214 is presumably free of error. In usual designs, however, this CRC-8 coding is decoded within the apparatus 121 for utilizing video data packets, within the apparatus 122 for utilizing audio data packets, and within the apparatus 123 for utilizing ancillary data packet decoders. Such decoding of CRC-8 coding confirms whether or not each IP packet was properly sorted to the apparatus 121, to the apparatus 122 or to the apparatus 123.

FIG. 26 shows a modification of the FIG. 24 portion of the COFDM receiver apparatus further depicted in FIGS. 13 and 25, which modification differs from what FIG. 24 depicts in the following ways. FIG. 26 omits the bank 92 of parallel-to-serial converters used to de-rotate the DFTs of COFDM symbols as initially transmitted. The output port of the bank 90 of parallel-to-serial converters is connected to the write-input port of a memory 145. This connection is a direct one if the COFDM transmitter apparatus does not complement the FEC coded data before initially transmitting it. However, if the COFDM transmitter apparatus does complement the FEC coded data before initially transmitting it, this connection is via a complementor 93 of the complex coordinates of QAM symbols. That is, the output port of the bank 90 of parallel-to-serial converters connects to the input port of the complementor 93, and the output port of the complementor 93 connects to the write-input port of the memory 145. The memory 145 is configured to revise the order of the complex coordinates of QAM symbol constellations in initial transmissions for iterative-diversity reception and to delay them as applied to the second input port of the maximal-ratio code combiner 220, so as to concur in time with the complex coordinates of modulation symbol constellations in corresponding final transmissions applied to the first input port of the maximal-ratio code combiner 220.

Figure 27:
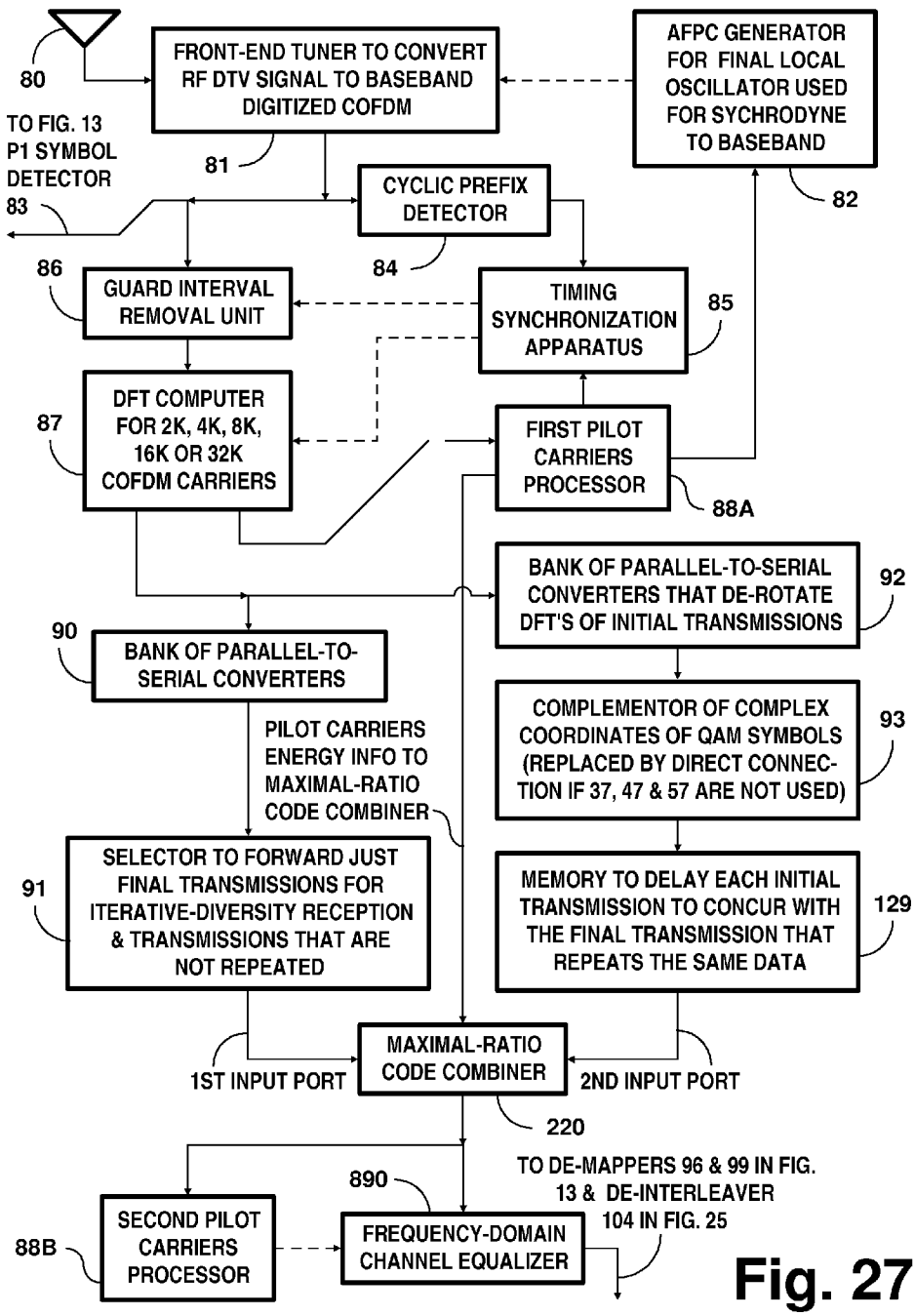

FIG. 27 shows a modification of the FIG. 24 portion of the COFDM receiver apparatus further depicted in FIGS. 13 and 25, which modification differs from what FIG. 24 depicts in the following ways. The pilot carriers processor 88 is replaced by a first pilot carriers processor 88A and a second pilot carriers processor 88B. FIG. 26 shows the first output port of the DFT computer 87 pilot carriers processor connected to the input port of the first pilot carriers processor 88A. The first pilot carriers processor 88A performs all the functions performed by the pilot carriers processor 88 of FIG. 24, except for computing weighting coefficients for the frequency-domain channel equalizer 89, which the second pilot carriers processor 88B does.

FIG. 27 shows the second output port of the DFT computer 87 connected directly to the input port of the bank 90 of parallel-to-serial converters and to the input port of the bank 92 of parallel-to-serial converters, rather than to the input port of the frequency-domain channel equalizer 89. Frequency-domain channel equalization is performed by frequency-domain channel equalizer 890 later in the processing of the complex coordinates of QPSK or QAM symbol constellations. The frequency-domain channel equalizer 890 performs equalization on a serial stream of those complex coordinates, so its structure differs from the structure of the channel equalizer 89 that performs equalization on parallel streams of complex coordinates. FIG. 27 shows the output port of the maximal-ratio code combiner 220 connected to the input port of the second pilot carriers processor 88B and to the input port of the frequency-domain channel equalizer 890. FIG. 27 indicates that the output port of the frequency-domain channel equalizer 890 connects to the input ports of the de-mappers 96 and 99 shown in FIG. 12 and to the de-interleaver 104 shown in FIG. 24. FIG. 27 shows the output port of the second pilot carriers processor 88B connected for supplying weighting coefficients to the frequency-domain channel equalizer 890.

FIG. 28 shows a modification of the FIG. 26 portion of the COFDM receiver apparatus further depicted in FIGS. 13 and 25, which modification differs from what FIG. 26 depicts in the following ways. The pilot carriers processor 88 is replaced by the first pilot carriers processor 88A and the second pilot carriers processor 88B. FIG. 28 shows the first output port of the DFT computer 87 connected to the input port of the first pilot carriers processor 88A. FIG. 28 shows the second output port of the DFT computer 87 connected directly to the input ports of the banks 90 and 91 of parallel-to-serial converters, rather than to the input port of the frequency-domain channel equalizer 89.

FIG. 28 like FIG. 27 shows a frequency-domain channel equalizer 890 later in the processing of the complex coordinates of QAM symbol constellations. FIG. 28 shows the output port of the maximal-ratio code combiner 220 connected to the input port of the second pilot carriers processor 88B and to the input port of the frequency-domain channel equalizer 890. FIG. 28 indicates that the output port of the frequency-domain channel equalizer 890 connects to the input ports of the de-mappers 96 and 99 shown in FIG. 13 and to the de-interleaver 104 shown in FIG. 25. FIG. 28 shows the output port of the second pilot carriers processor 88B connected for supplying weighting coefficients to the frequency-domain channel equalizer 890.

Both FIGS. 27 and 28 indicate that the input port of the de-interleaver 104 in FIG. 25 is connected for receiving complex coordinates of QPSK or QAM symbols from the output port of the frequency-domain equalizer 890, rather than the output port of the maximal-ratio code combiner 220 connecting directly to the input port of the de-interleaver 104 as in FIGS. 24 and 26. Both FIGS. 27 and 28 indicate that the input port of the de-mapper 96 in FIG. 13 is connected for receiving complex coordinates of BPSK symbols from the output port of the frequency-domain equalizer 890, rather than from the output port of the bank 90 of parallel-to-serial converters as in FIGS. 24 and 26. However, in modifications of each of the receiver portions depicted in FIGS. 27 and 28 the input port of the de-mapper 96 in FIG. 13 is connected for receiving complex coordinates of BPSK symbols from the output port of the bank 90 of parallel-to-serial converters just as in FIGS. 24 and 26. Both FIGS. 27 and 28 indicate that the input port of the de-mapper 99 in FIG. 13 is connected for receiving complex coordinates of BPSK symbols from the output port of the frequency-domain equalizer 890, rather than from the output port of the bank 90 of parallel-to-serial converters as in FIGS. 24 and 26. However, in modifications of each of the receiver portions depicted in FIGS. 27 and 28 the input port of the de-mapper 99 in FIG. 13 is connected for receiving complex coordinates of QPSK or QAM symbols from the output port of the bank 90 of parallel-to-serial converters just as in FIGS. 24 and 26.

Code combining the respective soft complex coordinates of QAM symbol constellations from the two transmissions of the same coded data before channel equalization tends to "fill in" nulls in the transmissions attributable to frequency-selective fading. Accordingly, there is less tendency for noise to be boosted by channel equalization than if the respective soft complex coordinates of QAM symbol constellations from the two transmissions of the same coded data are code combined after channel equalization. The avoidance of noise being boosted in the soft complex coordinates of QAM symbol constellations tends to reduce error in the two-dimensional data-slicing of those coordinates that is part of the procedure for de-mapping those QAM symbol constellations. Receiver configurations in which code combining is done before channel equalization are preferred for somewhat better performance when frequency selective fading affects DTV signal reception. However, receiver configurations in which code combining is done after channel equalization are simpler to implement and may impose slightly less drain on battery power.

FIG. 29 shows in detail the basic structure of the maximal-ratio code combiner 220 depicted in FIG. 24, in FIG. 25, in FIG. 26 and in FIG. 28. The code combiner 220 is connected for receiving pilot-carrier-energy information from the pilot carriers processor 88 shown in FIG. 24, in FIG. 25, in FIG. 26 and in FIG. 28. The pilot carriers processor 88 squares the real and imaginary terms of each unmodulated pilot carrier, sums the resulting squares and square-roots the sum to determine the root-mean-square (RMS) energy of that unmodulated pilot carrier. This procedure can be carried out for each pilot carrier using read-only memory addressed by the real and imaginary terms of each successively considered unmodulated pilot carrier. The RMS energies of the pilot carriers are then summed by an accumulator, which determines the total RMS energy of the pilot carriers for each OFDM symbol epoch.

The value of the total RMS energy supplied from the pilot carriers processor 88 is applied to the respective input ports of selectors 221 and 222 in the maximal-ratio code combiner 220 as shown in FIG. 29. The selector 221 selectively reproduces at its output port the total energy of the pilot carriers during those transmissions that are not repeated and the final ones of those transmissions repeated for iterative-diversity reception. The selector 222 selectively reproduces at its output port the total energy of the pilot carriers during the initial ones of those transmissions repeated for iterative-diversity reception. These operations of the selectors 221 and 222 are controlled responsive to indications conveyed in the L1 signaling. These operations support the complex coordinates of QPSK or QAM symbols from transmissions that are not repeated, which coordinates are supplied to a first of the two input ports of the code combiner 220, being reproduced without modification from its output port.

A delay memory 223 is connected for delaying the selector 222 response to supply a delayed selector 222 response that is concurrent with the selector 221 response. The delay memory 223 is preferably a random-access memory (RAM) with write addressing and read addressing configuring the RAM to provide delay. The length of delay afforded by the delay memory 223 is essentially the same as the length of delay afforded by the memory 129 depicted in FIG. 24 and in FIG. 27 or the length of delay that would be afforded by the memory 145 depicted in FIG. 26 and in FIG. 28 were it not relied upon to de-rotate DFT components.

A digital adder 224 is connected for adding the selector 221 response and the delayed selector 222 response read from the delay memory 223. The sum output response from the adder 224 combines the total energies of the initial and final transmissions for iterative-diversity reception, to be used for normalizing the weighting of the selector 220 response and the weighting of the delayed selector 222 response read from the RAM 223. A read-only memory 225 is connected for multiplying soft complex QAM coordinates in the response from the selector 220 by the total energy of a final transmission for iterative-diversity reception. A read-only memory 226 is connected for multiplying the soft complex QAM coordinates read from the RAM 223 by the total energy of the corresponding initial transmission for iterative-diversity reception.

The soft complex product from the ROM 225 is a weighted response to soft complex QAM coordinates in transmissions that are not repeated and in the final ones of those transmissions repeated for iterative-diversity reception. FIG. 29 indicates final transmissions for iterative-diversity reception are received from the selector 91 in FIG. 24, FIG. 25, FIG. 26 or FIG. 27. A read-only memory 227 is connected for normalizing this weighted response with respect to the total energies of the initial and final transmissions for iterative-diversity reception, by dividing the complex product from the ROM 225 by the sum output response from the adder 224.

The soft complex product from the ROM 226 is a weighted response to soft complex QAM coordinates in the initial ones of those transmissions subsequently repeated for iterative-diversity reception. FIG. 29 indicates initial transmissions for iterative-diversity reception are received from the memory 129 in FIG. 24 or FIG. 26, or from the memory 145 in FIG. 25 or FIG. 27. A read-only memory 228 is connected for normalizing this weighted response with respect to the total energies of the initial and final transmissions for iterative-diversity reception, by dividing the complex product from the ROM 226 by the sum output response from the adder 224.

A digital complex adder 229 is connected for summing the respective complex quotients from the ROMs 227 and 228 to synthesize soft-decision COFDM symbols that are the maximal-ratio code combiner 220 response supplied to the input port of the de-interleaver 104. One skilled in digital design is apt to perceive that, alternatively, normalization of the coefficients for weighting of the selector 221 response and for weighting of the inverted-in-polarity and delayed selector 222 response read from the delay memory 224 can be performed before such weighting, rather than after. A single read-only memory can be designed to perform the combined functions of the ROMs 225 and 227; and a single read-only memory can be designed to perform the combined functions of the ROMs 226 and 88. Alternatively, the ROMs 225, 226, 227 and 228 could be combined with the complex adder 229 in a very large ROM. The computations can be performed by digital circuitry other than ROMs, but problems with proper timing are considerably more difficult.

The operation of the maximal-ratio code combiner 220 following a change in RF channel or sub-channel is of interest. Following such a change, a DTV receiver as described supra will not have foregoing initial transmissions for iterative-diversity reception temporarily stored in its RAM 226. Accordingly, the DTV receiver bulk-erases the contents of storage locations in the RAM 223. The pilot carriers processor 88 will not have supplied the maximal-ratio code combiner 220 with information concerning the RMS-energy of pilot carriers accompanying the foregoing initial transmissions for iterative-diversity reception. Accordingly, the DTV receiver erases the contents of the delay memory 223 within the code combiner 220 that stores such information. This erasure conditions the maximal-ratio code combiner 220 for single-transmission reception until the delay memory 223 therein refills with information concerning the RMS-energy of pilot carriers accompanying the foregoing initial transmissions for iterative-diversity reception. During this delay in the code combiner 220 beginning iterative-diversity reception, the storage locations in the RAM 226 fill with complex coordinates of modulation symbol constellations in initial transmissions for iterative-diversity reception. These complex coordinates are supplied with delay to the second input port of the code combiner 220 when iterative-diversity reception begins.

FIG. 30 depicts more specifically elements 881-888 in a representative embodiment of the pilot carriers processor 88 as shown in each of FIGS. 24 and 26. The first output port of the DFT computer 87 connects to the input port of a unit 881 for extracting complex amplitude-modulation components of pilot carriers embedded in each successive COFDM symbol according to one of a number of prescribed patterns. The unit 881 comprises a plurality of parallel-to-serial converters for converting to serial format the complex amplitude-modulation components of pilot carriers available in parallel from the DFT computer 87 according to respective ones of those prescribed patterns. This implements a procedure referred to as "embedded signal recovery" in some of the technical literature concerning DVB-T and DVB-T2 practices. The complex components of the amplitude modulation of pilot carriers are supplied in serial format from a selected one of the parallel-to-serial converters in the unit 881 to the AFPC generator 82 as shown in FIGS. 24 and 26. The AFPC generator 82 multiplies the imaginary coordinates of the pilot carriers by their real coordinates and averages the resulting products to provide a basis for developing automatic frequency and phase control (AFPC) of the final local oscillator in the front-end tuner 81 shown in FIGS. 24 and 26. Also, the complex components of the amplitude modulation of pilot carriers are supplied in serial format from that selected one of the parallel-to-serial converters in the unit 881 to a microcomputer 882 of weighting coefficients for the frequency-domain channel equalizer 89. Furthermore, the complex components of the amplitude modulation of pilot carriers are supplied in serial format from that selected one of the parallel-to-serial converters in the unit 881 to a calculator 883 of intercarrier interference with pilot carriers caused by proximate data-modulated OFDM carriers. The calculator 883 accumulates intercarrier interference measurements for all the pilot carriers in each COFDM symbol and transmits the total from an output port thereof to the timing synchronization apparatus 85, there to implement fine adjustment of the DFT window positioning in time in a feedback loop that attempts to minimize the total intercarrier interference from data-modulated OFDM carriers.

ETSI standard EN 302 755 V1.3.1 prescribes eight different patterns of scattered pilots. The number and location of continual pilots depends both on the FFT size and on the scattered pilot pattern in use. The continual pilot locations are taken from one or more of six "CP groups" depending on the FFT mode. So the unit 881 for extracting complex amplitude-modulation components of pilot carriers embedded in each successive COFDM symbol according to each combination of patterns of pilot carriers prescribed by EN 302 755 V1.3.1 contains a considerable number of parallel-to-serial converters for processing single-time transmissions or the final transmissions for iterative-diversity reception. The patterns of scattered pilots prescribed by EN 302 755 V1.3.1 may be modified by the rotation of circular DFT by one-half revolution in the initial transmissions for iterative-diversity reception, so another considerable number of parallel-to-serial converters must be included in the unit 881 for processing the pilots in the initial transmissions.

It should be possible to design patterns of pilot carriers for an improved broadcast standard that, except for edge pilots, stay the same whether or not the circular DFT is rotated half a revolution. Besides reducing the number of parallel-to-serial converters needed in the pilot carriers processor 88, such patterns of pilot carriers better facilitate receiver apparatuses as depicted in FIG. 19, FIG. 26 and FIG. 28 that select initial transmissions and final transmissions from the response of the same bank 90 of parallel-to-serial converters.

A function of the pilot carriers processor 88 that is of principal concern is the generation of measurements of the total RMS power of pilot carriers that the maximal-ratio code combiner 220 depicted in FIG. 29 utilizes to control combining the results of demodulating initial and final transmissions of COFDM signals during iterative-diversity reception. Man-made noise (MMN) generated close to the DTV reception site tends to cause interference within a radio-frequency channel selected for reception, which interference is apt to be many times larger than the DTV signal sought after. If only one of the similar initial and final transmissions of the coded DTV signal transmitted for iterative-diversity reception is corrupted by the MMN, it is desirable to keep the corrupted transmission from generating measurements of the total RMS power of pilot carriers that will condition the maximal-ratio code-combiner 220 to respond primarily to that corrupted transmission rather than responding primarily to the other of the initial and late transmissions that is not corrupted by MMN. This avoids the stronger MMN capturing the results of the combining procedures owing to its greater signal strength.

It is preferable that reception of the coded DTV signal relies exclusively on the transmission uncorrupted by strong MMN.

Complex amplitude-modulation components of pilot carriers embedded in each successive COFDM symbol are supplied in serial format to a calculator 884 from parallel-to-serial converters in the unit 881 for extracting those components. The calculator 884 calculates the RMS power of the pilot carriers in each COFDM symbol. In effect the calculator 884 squares the real and imaginary components of each pilot carrier, sums the squares and then square roots the sum to calculate the root-mean-square (RMS) power of that particular pilot carrier. The calculator 884 can be replaced by read-only memory addressed by the real and imaginary amplitude-modulation components of each pilot carrier for supplying the RMS power of that particular pilot carrier in shorter time than required for real-time calculation. Since the DFT-window-adjustment feedback loop including the timing synchronization apparatus 85 seeks to minimize the imaginary amplitude-modulation components of each pilot carrier, being aided by the AFPC feedback loop including the AFPC generator 82, the real amplitude-modulation components of pilot carriers can be considered by themselves to provide sufficient description of the RMS powers of the pilot carriers. In any case, indications of the RMS powers of the pilot carriers are supplied to the input port of an accumulator 885 that generates a summation of the RMS powers of pilot carriers in each successive COFDM symbol being currently considered, which summation is supplied from an output port of the accumulator 885 to the respective input ports of elements 886-888 of the pilot carriers processor 88 as depicted in FIG. 30.

The total RMS power of pilot carriers in each successive COFDM symbol, as supplied from an output port of the accumulator 885, is supplied to a first of two input ports of a selector 886 of the RMS power measurement to be supplied from an output port of that selector 886. FIG. 30 shows the second input port of the selector 886 connected to receive a zero RMS power measurement, which the selector 886 is to select when impulse noise is detected that would cause the calculation of the total RMS power of pilot carriers in the current COFDM symbol to be erroneous. FIG. 30 indicates that the output port of the selector 886 connects to the input ports of the selectors 221 and 222 of the maximal-ratio code combiner 220 depicted in FIG. 29. The selection of which of the RMS power measurements supplied to the two input ports of the selector 886 is reproduced at its output port is controlled by indications supplied to the selector 886 from the output port of an impulse noise detector 887.

The energy in MMN or impulse noise is wide-spectrum in nature insofar as the 6-MHz-wide to 8-MHz-wide radio-frequency (RF) channel is concerned, containing all frequencies within the channel. The respective phasings of those frequency components are random in nature. Large-energy noise components close in frequency to pilot carriers combine with the pilot carriers to cause the imaginary coordinates ascribed to those pilot carriers by the DFT computer 227 to be greatly increased from their usual low values. Ideally, these imaginary coordinates would be zero-valued, since the binary phase-shift-keying (BPSK) of the pilot carriers is real-only. In actual practice, Johnson noise will cause these imaginary coordinates to have some values that are low compared to the real coordinates ascribed to those pilot carriers by the DFT computer 227. The impulse noise detector 887 generates an indication of MMN or impulse noise only when the summed absolute values of the imaginary coordinates ascribed to each of the pilot carriers in the currently considered COFDM symbol exceeds a threshold value. This threshold value is greater than the summed absolute values of the imaginary coordinates ascribed to each of the pilot carriers in a COFDM symbol when receiving additive white Gaussian noise (AWGN) at the largest levels at which data-slicing of the complex coordinates of the pilot carriers is still valid.

When the impulse noise detector 887 generates an indication that MMN or impulse noise corrupts the current COFDM symbol, this indication conditions the selector 886 to reproduce at its output port the zero RMS power measurement that FIG. 30 shows applied to its second input port. Absent the impulse noise detector 887 generating such indication, the selector 886 is conditioned to reproduce at its output port the RMS power measurement supplied to its first input port from the output port of the accumulator 885. When the selector 886 reproduces the zero RMS power measurement for application to the input ports of the selectors 221 and 222 of the maximal-ratio code combiner 220 depicted in FIG. 29, the complex coordinates of QAM symbol constellations from the current COFDM symbol will be disregarded in the code combining performed by the code combiner 220. Accordingly, the complex coordinates of QAM symbol constellations supplied from the code combiner 220 will not be affected by MMN or impulse noise.

The total RMS power of pilot carriers in each successive COFDM symbol, as supplied from an output port of the accumulator 885, is supplied to the input port of an averager 888 that averages the total RMS power of pilot carriers for a number of COFDM symbols. FIG. 30 indicates that the output port of the averager 888 supplies this averaged total RMS power of pilot carriers to the front-end tuner 81 for use in automatic gain control (AGC) of amplifiers therein. FIG. 30 shows a connection from the impulse noise detector 887 to the averager 888, which connection is used for supplying the averager 888 with indications of the occurrence of MMN or impulse noise. Such indications are used by the averager 888 to exclude the total RMS power of pilot carriers in the current COFDM symbol from being included in its running average of the total RMS power of pilot carriers in number of COFDM symbols. Although not shown in FIG. 30, the impulse noise detector 887 preferably has connections to the AFPC generator 82 and to the calculator 883 for providing them with indications of the occurrence of MMN or impulse noise. These indications allow the AFPC generator 82 and the calculator 883 to modify their respective operations so as to avoid, at least in substantial degree, adverse effects of MMN or impulse noise on those operations.

Impulse noise accompanying COFDM signals can be detected in the frequency domain by other methods. Hosein Asjadi discloses one such alternative method in U.S. Pat. No. 7,418,026 issued 26 Aug. 2008 and titled "Receiver for a multi-carrier modulated symbol". Hosein Asjadi discloses another alternative method in U.S. Pat. App. US-2010-0246726-A1 published 30 Sep. 2010 and titled "Receiver and method of receiving". Alternatively, impulse noise accompanying COFDM signals can be detected in the time domain rather than in the frequency domain. U.S. Pat. App. Ser. No. 61/760 filed for A. L. R. Limberg on 4 Feb. 2013 and titled "COFDM broadcasting of DTV signals twice in different ordering of frequency spectra" is incorporated herein by reference. That patent application describes detecting impulse noise starting with peak detection of intermediate-frequency COFDM signals in the front-end tuner of the DTV receiver.

Thusfar in this specification, processing of the complex coordinates of modulation symbol constellations has been described as being performed using a single bit stream that alternates in-phase coordinates with quadrature-phase coordinates. In practice, alternative embodiments of the DTV receiver apparatus are apt to be used that process the in-phase coordinates and quadrature-phase coordinates of two-dimensional modulation symbol constellations in parallel in respective bit streams. These alternative embodiments of DTV receiver apparatus are to be considered as embodying aspects of the invention disclosed herein. Also, alternative embodiments of the DTV transmitter apparatus are apt to be used that process the in-phase coordinates and quadrature-phase coordinates of two-dimensional modulation symbol constellations in parallel in respective bit streams. These alternative embodiments of DTV transmitter apparatus are to be considered as embodying aspects of the invention disclosed herein. These alternative embodiments are to be considered to be equivalents included within the scopes of claims accompanying this specification in accordance with the court-established doctrine of equivalency.

The COFDM transmitter apparatuses depicted in FIGS. 1, 3, 4 and 2, 7 or 9 are modified in respect to FIGS. 2, 7 and 9, respectively in other COFDM transmitter apparatuses embodying the invention in certain of its aspects. In these other COFDM transmitter apparatuses the interleavers 35, 45, 55 etc. shuffle the order of QAM symbol constellations only within COFDM symbols. This facilitates simplification of the COFDM receivers in which the deshuffling of QAM symbol constellations is accomplished by appropriate connections between the DFT computer 87 and the bank 90 of parallel-to-serial converters and, where applicable, also by appropriate connections between the DFT computer 87 and the bank 90 of parallel-to-serial converters. The COFDM receiver depicted in FIGS. 12, 13 and 14 is then simplified by omitting the memory 104 and connecting the output ports of the selectors 91 and 94 directly to the input port of the de-mapper 105. The COFDM receiver depicted in FIGS. 13, 16 and 17 is then simplified by (a) replacing the memory 128 with a direct connection of the output port of the selector 91 to the first input port of the PISO detector 131 and (b) replacing the memory 130 with a direct connection of the read output port of the memory 129 to the second input port of the PISO detector 131. The COFDM receiver depicted in FIGS. 13, 19 and 17 is then simplified by (a) replacing the memory 128 with a direct connection of the output port of the selector 91 to the first input port of the PISO detector 131 and (b) replacing the memory 130 with a direct connection of the read output port of the memory 145 to the second input port of the PISO detector 131. The COFDM receiver depicted in FIGS. 13, 24 and 25 is then simplified by omitting the memory 104 and connecting the output port of the maximal-ratio code combiner 150 directly to the input port of the de-mapper 105. The COFDM receiver depicted in FIGS. 13, 26 and 25 is then simplified by omitting the memory 104 and connecting the output port of the maximal-ratio code combiner 150 directly to the input port of the de-mapper 105. The COFDM receiver depicted in FIGS. 13, 27 and 25 is then simplified by omitting the memory 104 and connecting the output port of the channel equalizer 890 directly to the input port of the de-mapper 105. The COFDM receiver depicted in FIGS. 13, 28 and 25 is then simplified by omitting the memory 104 and connecting the output port of the channel equalizer 890 directly to the input port of the de-mapper 105. These replacements of the memories 104, 128 and 130 by direct connections conserve some power otherwise required for operating these memories, and latent delays in the COFDM receivers are reduced.

The QPSK, 16QAM, 32QAM, 64QAM, 128QAM, 256QAM and 512QAM symbol constellations are representative of two-dimensional modulation symbol constellations that can be used in DTV systems embodying the invention. Non-uniform QAM symbol constellations can be used in DTV systems embodying the invention. Over time, only certain ones of these types of modulation symbol constellations may find widespread usage. Single-time retransmission may allow still larger modulation symbol constellations to be used, such as 1024QAM or possibly 4096 QAM. High-order PSK modulation symbol constellations that employ plural rings of lattice points are also feasible if there be single-time retransmission of those constellations.

The DTV systems described supra may be modified to replace LDPC block coding with LDPC convolutional coding. The DTV systems described supra may be modified to include further error correction coding. LDPC coding is known that does not need to be combined with BCH coding to suppress error floors, and such LDPC coding accommodates the BCH coding being replaced by CRC coding to detect when LDPC coding has eliminated errors. The DTV systems described supra may be modified so the DTV transmitter does not include interleavers for shuffling the order of the QPSK or QAM symbols within each FEC block. Just the differential rotation between corresponding COFDM symbols in initial and final transmissions of the same data would be relied on to implement cyclic delay diversity. DTV receivers could then be simplified omitting the memory required for deshuffling QPSK or QAM symbols to restore them to their original sequential order. Less preferred DTV systems that embody some of the aspects of the invention modify the DTV systems described supra to omit rotation of the DFT of COFDM symbols during single-time retransmissions. Such modifications sacrifice capability to overcome severe frequency-selective fading, but preserve capability to overcome man-made-noise (MMN) and drop-outs in received signal strength that span the full frequency spectrum of the RF channel. Persons skilled in the art of designing DTV systems are apt to discern that various other modifications and variations can be made in the specifically described apparatus without departing from the spirit or scope of the invention in some of its aspects. Accordingly, it is intended that these modifications and variations of the specifically described apparatus be considered to result in further embodiments of the invention, which are included within the scope of the appended claims and their equivalents.

In the appended claims, the word "said" rather than the word "the" is used to indicate the existence of an antecedent basis for a term being provided earlier in the claims. The word "the" is used for purposes other than to indicate the existence of an antecedent basis for a term appearing earlier in the claims, the usage of the word "the" for other purposes being consistent with customary grammar in the American English language.

What is claimed is:

1. A method for preparing packets of digital data to be transmitted by a COFDM broadcast transmitter so as to facilitate iterative-diversity reception by COFDM broadcast receivers of suitable design, said method comprising steps of:

forward-error-correction coding successive frames of digital data to generate respective low-density parity-check codewords, each having the same prescribed number of bits;

mapping the bits of each said low-density parity-check codeword to modulation symbol constellations to generate digital coordinates descriptive of successive ones of said modulation symbol constellations arranged in normal time-sequential order;

writing said digital coordinates descriptive of said modulation symbol constellations to temporary storage locations within a digital memory to be temporarily stored therein for a number at least one of COFDM symbol intervals;

twice reading said digital coordinates descriptive of successive ones of said modulation symbol constellations from said temporary storage locations within said digital memory, initially reading said digital coordinates descriptive of said modulation symbol constellations in each of successive CODM symbols in a first time-sequential order from said temporary storage locations, and finally reading said digital coordinates descriptive of said modulation symbol constellations in each of successive CODM symbols in a second time-sequential order from said temporary storage locations some time after their being initially read, said first time-sequential order differing from said second time-sequential order in that initial and final portions of each COFDM symbol in said initial reading thereof are in reverse order from their order in said final reading thereof; and generating a modulated carrier wave responsive to said digital coordinates descriptive of successive ones of said modulation symbol constellations as twice read from said temporary storage locations within said digital memory, said modulated carrier wave to be transmitted by said broadcast transmitter.

2. The claim 1 method for preparing packets of digital data to be transmitted by a broadcast transmitter, wherein said substeps of finally reading said digital coordinates descriptive of said modulation symbol constellations in each of successive CODM symbols occur within a few COFDM symbol intervals of said substeps of initially reading said digital coordinates descriptive of the same said modulation symbol constellations.

3. The claim 1 method for preparing packets of digital data to be transmitted by a broadcast transmitter, wherein said substeps of finally reading said digital coordinates descriptive of said modulation symbol constellations in each of successive CODM symbols occur at least a few tenths second after said substeps of initially reading said digital coordinates descriptive of the same said modulation symbol constellations.

4. The claim 1 method for preparing packets of digital data to be transmitted by a broadcast transmitter, wherein said step of generating a modulated carrier wave comprises substeps of:

generating a digital orthogonal-frequency-division-modulation (OFDM) signal responsive to OFDM symbol blocks derived from said digital coordinates descriptive of successive ones of said modulation symbol constellations, as twice read from said temporary storage locations within said digital memory;

inserting guard intervals and cyclic prefixes into said digital OFDM signal;

converting said digital OFDM signal with guard intervals and cyclic prefixes inserted therein to an analog OFDM signal; and up-converting said analog OFDM signal to radio frequencies transmitted by said broadcast transmitter.

5. The claim 1 method for preparing packets of digital data to be transmitted by a broadcast transmitter, wherein said step of generating a modulated carrier wave comprises substeps of:

generating a digital orthogonal-frequency-division-modulation (OFDM) signal responsive to OFDM symbol blocks derived from said digital coordinates descriptive of successive ones of said modulation symbol constellations, as initially read from said temporary storage locations within said digital memory and complemented for rotating said symbol constellations essentially one half revolution, and as finally read from said temporary storage locations within said digital memory and not complemented;

inserting guard intervals and cyclic prefixes into said digital OFDM signal;

converting said digital OFDM signal with guard intervals and cyclic prefixes inserted therein to an analog OFDM signal; and up-converting said analog OFDM signal to radio frequencies transmitted by said broadcast transmitter.

6. A receiver for iterative-diversity reception of a selected one of modulated radio-frequency carrier waves each comprising in time-division multiplex COFDM symbols of initial coded orthogonal frequency-division multiplexed (COFDM) transmissions of modulated subcarriers conveying low-density parity-check (LDPC) coded digital signals in rotate-circular-DFT-by-essentially-half-a-revolution time-sequential order followed a prescribed time interval later by respective further COFDM symbols of final COFDM transmissions of modulated subcarriers conveying the same LDPC-coded digital signals in normal time-sequential order, said receiver comprising:

a tuner for receiving and demodulating said selected one of said modulated radio-frequency carrier waves to generate a baseband digitized COFDM signal;

a unit for removing the guard interval from said baseband digitized COFDM signal;

a computer for computing the discrete Fourier transform (DFT) of said baseband digitized COFDM signal from which said guard interval thereof has been removed;

a frequency-domain channel equalizer connected for equalizing components of said DFT to counteract irregularities in the response of the transmission channel to these respective components, thereby to generate equalized components of said DFT;

a first parallel-to-serial converter connected for generating a first serial response to said equalized components of said DFT, said first serial response including a respective succession of complex coordinates of modulation symbol constellations of respective ones of said modulated subcarriers in normal time-sequential order from each of said time-slices of final COFDM transmissions of modulated subcarriers conveying repeated said coded digital signals;

a second parallel-to-serial converter for generating a second serial response to said equalized components of said DFT, said second serial response including a respective succession of complex coordinates of modulation symbol constellations of respective ones of said modulated subcarriers in normal time-sequential order from each of said time-slices of initial COFDM transmissions of modulated subcarriers conveying said coded digital signals;

apparatus for de-mapping said modulation symbol constellations described by said complex coordinates of modulation symbol constellations of respective ones of said modulated subcarriers in normal time-sequential order from time-interleaved said time-slices of initial COFDM transmissions of modulated subcarriers conveying said coded digital signals and said time-slices final COFDM transmissions of modulated subcarriers conveying said coded digital signals, thereby to reproduce interleaved soft bits of forward-error-correction (FEC) coding;

a de-interleaver for de-interleaving said interleaved soft bits of FEC coding;

decoder apparatus for decoding said FEC coding responsive to said soft bits of FEC coding after their being de-interleaved, thereby to reproduce scrambled bits of baseband frames of digital data packets;

a de-scrambler for said scrambled bits of baseband frames further reproduced by said decoder apparatus, thus to recover said baseband frames of digital data packets with bits in de-scrambled order;

a first selector for supplying a selective response reproducing just those of said baseband frames of digital data packets with bits in de-scrambled order derived from each of said time-slices of final COFDM transmissions of modulated subcarriers conveying repeated said coded digital signals;

a second selector for supplying a selective response reproducing just those of said baseband frames of digital data packets with bits in de-scrambled order derived from each of said time-slices of initial COFDM transmissions of modulated subcarriers conveying repeated said coded digital signals;

a delay memory for temporarily storing said selective response to said selective response from said second selector, said delay memory configured for delaying said selective response from said second selector temporarily stored therein during subsequent reading out of delayed said baseband frames of digital data packets with bits in de-scrambled order derived from each of said time-slices of initial COFDM transmissions of modulated subcarriers conveying repeated said coded digital signals, so as to be concurrent with corresponding said baseband frames of digital data packets with bits in de-scrambled order derived from each of said time-slices of final COFDM transmissions of modulated subcarriers conveying repeated said coded digital signals in said selective response from said first selector; and apparatus for generating a succession of digital data packets, each of which reproduces a digital data packets chosen from one of the current said selective response of said first selector and the delayed said selective response of said second selector as currently read from said delay memory, each said digital data packet thus reproduced being chosen so as to maximize the number of correct digital data packets generated in said succession of digital data packets.

7. A receiver as set forth in claim 6, said receiver further comprising:

a complementor connected for complementing said second serial response to said equalized components of said DFT generated by said second parallel-to-serial converter and supplying said second serial response as so complemented to said apparatus for de-mapping.

8. A receiver as set forth in claim 6, wherein said apparatus for de-mapping said modulation symbol constellations comprises:

a memory configured for deshuffling said modulation symbol constellations as deshuffled prior to their transmission to said receiver.

9. A receiver as set forth in claim 6, wherein said decoder apparatus for decoding said FEC coding comprises:

a soft-input decoder for low-density parity-check (LDPC) coding.

10. A receiver as set forth in claim 9, wherein said apparatus for de-mapping said modulation symbol constellations comprises:

an adaptive soft demapper for de-mapping said modulation symbol constellations to generate soft bits of interleaved FEC coding in logarithmic-likelihood-ratio (LLR) soft-bit format;

an interleaver for interleaving said soft bits derived from decoding results from soft-input decoder for LDPC coding;

at least one digital subtractor for soft bits; and an arrangement of said adaptive soft de-mapper and said soft-input decoder for LDPC coding in turbo connection for iterative de-mapping of said modulation symbol constellations and iterative decoding of said LDPC coding, said turbo connection further including said de-interleaver, said interleaver and said at least one digital subtractor for soft bits.

11. A receiver for iterative-diversity reception of a selected one of modulated radio-frequency carrier waves each comprising in time-division multiplex COFDM symbols of initial coded orthogonal frequency-division multiplexed (COFDM) transmissions of modulated subcarriers conveying forward-error-correction (FEC) coded digital signals in rotate-circular-DFT-by-essentially-half-a-revolution time-sequential order followed a prescribed time interval later by respective further COFDM symbols of final COFDM transmissions of modulated subcarriers conveying the same FCC-coded digital signals in normal time-sequential order, said receiver comprising:

a tuner for receiving and demodulating said selected one of said modulated radio-frequency carrier waves to generate a baseband digitized COFDM signal;

a unit for removing the guard interval from said baseband digitized COFDM signal;

a computer for computing the discrete Fourier transform (DFT) of said baseband digitized COFDM signal from which said guard interval thereof has been removed;

apparatus for delaying said DFT regarding time-slices of initial COFDM transmissions of modulated subcarriers conveying FEC-coded digital signals so as to appear in normal time sequential order concurrent with said DFT regarding time-slices of final COFDM transmissions of modulated subcarriers conveying repeated said FEC-coded digital signals; and digital signal reproduction apparatus for reproducing digital signals responsive both to said repeated FEC-coded digital signals conveyed by said DFT regarding time-slices of final COFDM transmissions of modulated subcarriers and to said FEC-coded digital signals conveyed by said DFT regarding time-slices of initial COFDM transmissions of modulated subcarriers as delayed to appear in normal time sequential order concurrent with said DFT regarding time-slices of final COFDM transmissions of modulated subcarriers.

12. A receiver as set forth in claim 11, wherein said apparatus for delaying components of said DFT regarding time-slices of initial COFDM transmissions of modulated subcarriers conveying FEC-coded digital signals, so as to appear in normal time sequential order concurrent with said DFT regarding time-slices of final COFDM transmissions of modulated subcarriers conveying repeated said FEC-coded digital signals, is further configured for complementing said complex coordinates of modulation symbol constellations in said delayed initial transmissions.

13. A receiver as set forth in claim 11, said receiver further comprising:

a frequency-domain channel equalizer connected for equalizing components of said DFT as supplied from said computer to counteract irregularities in the response of the transmission channel to these respective components, said frequency-domain channel equalizer further connected for supplying connected for supplying equalized components of said DFT to said apparatus for delaying equalized components of said DFT regarding time-slices of initial COFDM transmissions of modulated subcarriers conveying coded digital signals so as to appear in normal time sequential order concurrent with equalized components of said DFT regarding time-slices of final COFDM transmissions of modulated subcarriers conveying repeated said coded digital signals.

14. A receiver as set forth in claim 13, wherein said apparatus for delaying apparatus for delaying DFT regarding time-slices of initial COFDM transmissions of modulated subcarriers conveying FEC-coded digital signals so as to appear in normal time sequential order concurrent with said DFT regarding time-slices of final COFDM transmissions of modulated subcarriers conveying repeated said FEC-coded digital signals comprises:

a first parallel-to-serial converter connected for generating a first serial response to components of said DFT supplied from said frequency-domain channel equalizer, said first serial response including a respective succession of complex coordinates of modulation symbol constellations of respective ones of said modulated subcarriers in normal time-sequential order from each of said time-slices of final COFDM transmissions of modulated subcarriers conveying repeated said coded digital signals;

a second parallel-to-serial converter for generating a second serial response to said components of said DFT supplied from said frequency-domain channel equalizer, said second serial response including a respective succession of complex coordinates of modulation symbol constellations of respective ones of said modulated subcarriers in normal time-sequential order from each of said time-slices of initial COFDM transmissions of modulated subcarriers conveying said coded digital signals;

a selector for supplying said digital signal reproduction apparatus a selective response to said first serial response, said selective response from said selector reproducing each said succession of complex coordinates of modulation symbol constellations of respective ones of said modulated subcarriers in normal time-sequential order from each of said time-slices of final COFDM transmissions of modulated subcarriers conveying repeated said coded digital signals; and a delay memory for supplying a delayed selective response to said second serial response, said delayed selective response from said memory reproducing each said succession of complex coordinates of modulation symbol constellations of respective ones of said modulated subcarriers in normal time-sequential order from each of said time-slices of initial COFDM transmissions of modulated subcarriers conveying said coded digital signals.

15. A receiver as set forth in claim 14, wherein said digital signal reproduction apparatus comprises:

a plural-input/single-output detection apparatus, configured for de-mapping said modulation symbol constellations of said modulated subcarriers in said selective response from said selector thus to generate first recovered FEC-coded digital signals, further configured for de-mapping said modulation symbol constellations of said modulated subcarriers in said delayed selective response from said delay memory thus to generate second recovered FEC-coded digital signals, and further configured for decoding LDPC coding from combined said first recovered FEC-coded digital signals and said second recovered FEC-coded digital signals, thereby to reproduce scrambled bits of baseband frames of digital data packets; and a de-scrambler for said scrambled bits of baseband frames reproduced by said plural-input/single-output detection apparatus, thus to recover said baseband frames of digital data packets with bits in de-scrambled order.

16. A receiver as set forth in claim 14, wherein said digital signal reproduction apparatus comprises:

means for de-shuffling modulation symbol constellations of said modulated subcarriers in said selective response from said selector;

means for de-shuffling modulation symbol constellations of said modulated subcarriers in said delayed selective response from said delay memory;

a plural-input/single-output detection apparatus, configured for de-mapping said de-shuffled modulation symbol constellations of said modulated subcarriers in said selective response from said selector thus to generate first recovered FEC-coded digital signals, further configured for de-mapping de-shuffled said modulation symbol constellations of said modulated subcarriers in said delayed selective response from said delay memory thus to generate second recovered FEC-coded digital signals, and further configured for decoding LDPC coding from combined said first recovered FEC-coded digital signals and said second recovered FEC-coded digital signals, thereby to reproduce scrambled bits of baseband frames of digital data packets; and a de-scrambler for said scrambled bits of baseband frames reproduced by said plural-input/single-output detection apparatus, thus to recover said baseband frames of digital data packets with bits in de-scrambled order.

17. A receiver as set forth in claim 14, wherein said digital signal reproduction apparatus comprises:

a maximal-ratio code combiner connected for generating a response both (a) to said components of said DFT regarding time-slices of final COFDM transmissions of modulated subcarriers supplied from said selector and (b) to said concurrent components of said DFT regarding delayed time-slices of initial COFDM transmissions supplied from said delay memory, said response of said maximal-ratio code combiner composed of complex coordinates of modulation symbol constellations in a combined DFT;

apparatus for de-mapping modulation symbol constellations specified by said equalized complex coordinates of said modulation symbol constellations in said combined DFT, thereby to reproduce interleaved soft bits of forward-error-correction (FEC) coding;

a de-interleaver for de-interleaving said interleaved soft bits of FEC coding;

decoding apparatus for decoding said de-interleaved soft bits of FEC coding to generate decoding results supplied therefrom; and a de-scrambler for scrambled bits of baseband frames in said decoding results supplied from said decoding apparatus, thus to recover said baseband frames of digital data packets with bits in de-scrambled order.

18. A receiver as set forth in claim 17, wherein said decoder apparatus for decoding said de-interleaved soft bits of FEC coding comprises:

a soft-input decoder for low-density parity-check (LDPC) coding.

19. A receiver as set forth in claim 18, wherein said apparatus for de-mapping said modulation symbol constellations comprises:
- an adaptive soft demapper for de-mapping said modulation symbol constellations to generate soft bits of interleaved FEC coding in logarithmic-likelihood-ratio (LLR) soft-bit format;
- an interleaver for interleaving said soft bits derived from decoding results from soft-input decoder for LDPC coding;
- at least one digital subtractor for soft bits; and
- an arrangement of said adaptive soft de-mapper and said soft-input decoder for LDPC coding in turbo connection for iterative de-mapping of said modulation symbol constellations and iterative decoding of said LDPC coding, said turbo connection further including said de-interleaver, said interleaver and said at least one digital subtractor for soft bits.

20. A receiver as set forth in claim 13, wherein said apparatus for delaying apparatus for delaying DFT regarding time-slices of initial COFDM transmissions of modulated subcarriers conveying FEC-coded digital signals so as to appear in normal time sequential order concurrent with said DFT regarding time-slices of final COFDM transmissions of modulated subcarriers conveying repeated said FEC-coded digital signals comprises:
- a first parallel-to-serial converter connected for generating a first serial response to components of said DFT supplied from said computer, said first serial response including a respective succession of complex coordinates of modulation symbol constellations of respective ones of said modulated subcarriers in normal time-sequential order from each of said time-slices of final COFDM transmissions of modulated subcarriers conveying repeated said coded digital signals;
- a second parallel-to-serial converter for generating a second serial response to said components of said DFT supplied from said computer, said second serial response including a respective succession of complex coordinates of modulation symbol constellations of respective ones of said modulated subcarriers in normal time-sequential order from each of said time-slices of initial COFDM transmissions of modulated subcarriers conveying said coded digital signals;
- a selector for supplying said digital signal reproduction apparatus a selective response to said first serial response, said selective response from said first selector reproducing each said succession of complex coordinates of modulation symbol constellations of respective ones of said modulated subcarriers in normal time-sequential order from each of said time-slices of final COFDM transmissions of modulated subcarriers conveying repeated said coded digital signals; and
- a delay memory for supplying a delayed selective response to said second serial response, said delayed selective response from said memory reproducing each said succession of complex coordinates of modulation symbol constellations of respective ones of said modulated subcarriers in normal time-sequential order from each of said time-slices of initial COFDM transmissions of modulated subcarriers conveying said coded digital signals.

21. A receiver as set forth in claim 20, wherein said digital signal reproduction apparatus comprises:
- a maximal-ratio code combiner connected for generating a response both (a) to said components of said DFT regarding time-slices of final COFDM transmissions of modulated subcarriers supplied from said selector and (b) to said concurrent components of said DFT regarding delayed time-slices of initial COFDM transmissions supplied from said delay memory, said response of said maximal-ratio code combiner composed of complex coordinates of modulation symbol constellations in a combined DFT;
- a frequency-domain channel equalizer for equalizing components of said combined DFT to counteract irregularities in the response of the transmission channel to these respective components and for supplying equalized complex coordinates of modulation symbol constellations of said combined DFT;
- apparatus for de-mapping modulation symbol constellations specified by said equalized complex coordinates of said modulation symbol constellations of said combined DFT, thus to reproduce interleaved soft bits of forward-error-correction (FEC) coding;
- a de-interleaver for de-interleaving said interleaved soft bits of FEC coding;
- decoding apparatus for decoding said interleaved soft bits of FEC coding to generate decoding results supplied therefrom; and
- a de-scrambler for scrambled bits of baseband frames in said decoding results supplied from said decoding apparatus, thus to recover said baseband frames of digital data packets with bits in de-scrambled order.

22. A receiver as set forth in claim 21, wherein said decoder apparatus for decoding said de-interleaved soft bits of FEC coding comprises:
- a soft-input decoder for low-density parity-check (LDPC) coding.

23. A receiver as set forth in claim 22, wherein said apparatus for de-mapping said modulation symbol constellations comprises:
- an adaptive soft demapper for de-mapping said modulation symbol constellations to generate soft bits of interleaved FEC coding in logarithmic-likelihood-ratio (LLR) soft-bit format;
- an interleaver for interleaving said soft bits derived from decoding results from soft-input decoder for LDPC coding;
- at least one digital subtractor for soft bits; and
- an arrangement of said adaptive soft de-mapper and said soft-input decoder for LDPC coding in turbo connection for iterative de-mapping of said modulation symbol constellations and iterative decoding of said LDPC coding, said turbo connection further including said de-interleaver, said interleaver and said at least one digital subtractor for soft bits.

24. A receiver as set forth in claim 13, wherein said apparatus for delaying apparatus for delaying DFT regarding time-slices of initial COFDM transmissions of modulated subcarriers conveying FEC-coded digital signals so as to appear in normal time sequential order concurrent with said DFT regarding time-slices of final COFDM transmissions of modulated subcarriers conveying repeated said FEC-coded digital signals comprises:
- a parallel-to-serial converter for generating a serial response to components of said DFT supplied from said frequency-domain channel equalizer, said serial response including a respective succession of complex coordinates of modulation symbol constellations of respective ones of said modulated subcarriers in normal time-sequential order from each of said time-slices of final COFDM transmissions of modulated subcarriers conveying repeated said coded digital signals;

a selector for supplying said digital signal reproduction apparatus a selective response to said serial response from said parallel-to-serial converter, said selective response from said selector reproducing each said succession of complex coordinates of modulation symbol constellations of respective ones of said modulated subcarriers in normal time-sequential order from each of said time-slices of final COFDM transmissions of modulated subcarriers conveying repeated said coded digital signals; and a memory for temporarily storing portions of said serial response from said parallel-to-serial converter that include said initial transmissions of complex coordinates of modulation symbol constellations of respective ones of said modulated subcarriers, as supplied from said parallel-to-serial converter in rotate-circular-DFT-by-essentially-half-a-revolution time-sequential order, said memory configured for revising the rotate-circular-DFT-by-essentially-half-a-revolution time-sequential order of said initial transmissions of complex coordinates of modulation symbol constellations temporarily stored therein during subsequent read out of delayed said initial transmissions of complex coordinates of modulation symbol constellations in normal time-sequential order so as to be concurrent with corresponding said final transmissions of complex coordinates of modulation symbol constellations in normal time-sequential order selectively reproduced in said response from said selector.

25. A receiver as set forth in claim 24, wherein said digital signal reproduction apparatus comprises:

a plural-input/single-output detection apparatus, configured for de-mapping said modulation symbol constellations of said modulated subcarriers in said selective response from said selector thus to generate first recovered FEC-coded digital signals, further configured for de-mapping said modulation symbol constellations of said modulated subcarriers in said delayed selective response from said delay memory thus to generate second recovered FEC-coded digital signals, and further configured for decoding LDPC coding from combined said first recovered FEC-coded digital signals and said second recovered FEC-coded digital signals, thereby to reproduce scrambled bits of baseband frames of digital data packets; and a de-scrambler for said scrambled bits of baseband frames reproduced by said plural-input/single-output detection apparatus, thus to recover said baseband frames of digital data packets with bits in de-scrambled order.

26. A receiver as set forth in claim 24, wherein said digital signal reproduction apparatus comprises:

means for de-shuffling modulation symbol constellations of said modulated subcarriers in said selective response from said selector;

means for de-shuffling modulation symbol constellations of said modulated subcarriers in said delayed selective response from said delay memory;

a plural-input/single-output detection apparatus, configured for de-mapping said de-shuffled modulation symbol constellations of said modulated subcarriers in said selective response from said selector thus to generate first recovered FEC-coded digital signals, further configured for de-mapping de-shuffled said modulation symbol constellations of said modulated subcarriers in said delayed selective response from said delay memory thus to generate second recovered FEC-coded digital signals, and further configured for decoding LDPC coding from combined said first recovered FEC-coded digital signals and said second recovered FEC-coded digital signals, thereby to reproduce scrambled bits of baseband frames of digital data packets; and a de-scrambler for said scrambled bits of baseband frames reproduced by said plural-input/single-output detection apparatus, thus to recover said baseband frames of digital data packets with bits in de-scrambled order.

27. A receiver as set forth in claim 24, wherein said digital signal reproduction apparatus comprises:

a maximal-ratio code combiner connected for generating a response both (a) to said components of said DFT regarding time-slices of final COFDM transmissions of modulated subcarriers supplied from said selector and (b) to said concurrent components of said DFT regarding delayed time-slices of initial COFDM transmissions supplied from said delay memory, said response of said maximal-ratio code combiner composed of complex coordinates of modulation symbol constellations in a combined DFT;

apparatus for de-mapping modulation symbol constellations specified by said equalized complex coordinates of said modulation symbol constellations in said combined DFT, thereby to reproduce interleaved soft bits of forward-error-correction (FEC) coding;

a de-interleaver for de-interleaving said interleaved soft bits of FEC coding;

decoding apparatus for decoding said de-interleaved soft bits of FEC coding to generate decoding results supplied therefrom; and a de-scrambler for scrambled bits of baseband frames in said decoding results supplied from said decoding apparatus, thus to recover said baseband frames of digital data packets with bits in de-scrambled order.

28. A receiver as set forth in claim 27, wherein said decoder apparatus for decoding said de-interleaved soft bits of FEC coding comprises:

a soft-input decoder for low-density parity-check (LDPC) coding.

29. A receiver as set forth in claim 28, wherein said apparatus for de-mapping said modulation symbol constellations comprises:

an adaptive soft demapper for de-mapping said modulation symbol constellations to generate soft bits of interleaved FEC coding in logarithmic-likelihood-ratio (LLR) soft-bit format;

an interleaver for interleaving said soft bits derived from decoding results from soft-input decoder for LDPC coding;

at least one digital subtractor for soft bits; and an arrangement of said adaptive soft de-mapper and said soft-input decoder for LDPC coding in turbo connection for iterative de-mapping of said modulation symbol constellations and iterative decoding of said LDPC coding, said turbo connection further including said de-interleaver, said interleaver and said at least one digital subtractor for soft bits.

30. A receiver as set forth in claim 13, wherein said apparatus for delaying apparatus for delaying DFT regarding time-slices of initial COFDM transmissions of modulated subcarriers conveying FEC-coded digital signals so as to appear in normal time sequential order concurrent with said DFT regarding time-slices of final COFDM transmissions of modulated subcarriers conveying repeated said FEC-coded digital signals comprises:

a parallel-to-serial converter for generating a serial response to components of said DFT supplied from said computer, said serial response including a respective succession of complex coordinates of modulation symbol constellations of respective ones of said modulated subcarriers in normal time-sequential order from each of said time-slices of final COFDM transmissions of modulated subcarriers conveying repeated said coded digital signals;
a selector for supplying said digital signal reproduction apparatus a selective response to said serial response from said parallel-to-serial converter, said selective response from said selector reproducing each said succession of complex coordinates of modulation symbol constellations of respective ones of said modulated subcarriers in normal time-sequential order from each of said time-slices of final COFDM transmissions of modulated subcarriers conveying repeated said coded digital signals; and
a memory for temporarily storing portions of said serial response from said parallel-to-serial converter that include said initial transmissions of complex coordinates of modulation symbol constellations of respective ones of said modulated subcarriers, as supplied from said parallel-to-serial converter in rotate-circular-DFT-by-essentially-half-a-revolution time-sequential order, said memory configured for revising the rotate-circular-DFT-by-essentially-half-a-revolution time-sequential order of said initial transmissions of complex coordinates of modulation symbol constellations temporarily stored therein during subsequent read out of delayed said initial transmissions of complex coordinates of modulation symbol constellations in normal time-sequential order so as to be concurrent with corresponding said final transmissions of complex coordinates of modulation symbol constellations in normal time-sequential order selectively reproduced in said response from said selector.

31. A receiver as set forth in claim 30, wherein said digital signal reproduction apparatus comprises:
a maximal-ratio code combiner connected for generating a response both (a) to said components of said DFT regarding time-slices of final COFDM transmissions of modulated subcarriers supplied from said selector and (b) to said concurrent components of said DFT regarding delayed time-slices of initial COFDM transmissions supplied from said delay memory, said response of said maximal-ratio code combiner composed of complex coordinates of modulation symbol constellations in a combined DFT;
a frequency-domain channel equalizer for equalizing components of said combined DFT to counteract irregularities in the response of the transmission channel to these respective components and for supplying equalized complex coordinates of modulation symbol constellations of said combined DFT;
apparatus for de-mapping modulation symbol constellations specified by said equalized complex coordinates of said modulation symbol constellations of said combined DFT, thus to reproduce interleaved soft bits of forward-error-correction (FEC) coding;
a de-interleaver for de-interleaving said interleaved soft bits of FEC coding;
decoding apparatus for decoding said interleaved soft bits of FEC coding to generate decoding results supplied therefrom; and
a de-scrambler for scrambled bits of baseband frames in said decoding results supplied from said decoding apparatus, thus to recover said baseband frames of digital data packets with bits in de-scrambled order.

32. A receiver as set forth in claim 31, wherein said decoder apparatus for decoding said de-interleaved soft bits of FEC coding comprises:
a soft-input decoder for low-density parity-check (LDPC) coding.

33. A receiver as set forth in claim 32, wherein said apparatus for de-mapping said modulation symbol constellations comprises:
an adaptive soft demapper for de-mapping said modulation symbol constellations to generate soft bits of interleaved FEC coding in logarithmic-likelihood-ratio (LLR) soft-bit format;
an interleaver for interleaving said soft bits derived from decoding results from soft-input decoder for LDPC coding;
at least one digital subtractor for soft bits; and
an arrangement of said adaptive soft de-mapper and said soft-input decoder for LDPC coding in turbo connection for iterative de-mapping of said modulation symbol constellations and iterative decoding of said LDPC coding, said turbo connection further including said de-interleaver, said interleaver and said at least one digital subtractor for soft bits.

* * * * *